(12) United States Patent
Yamamuro et al.

(10) Patent No.: US 9,489,872 B2
(45) Date of Patent: Nov. 8, 2016

(54) LABEL, PRINTING PAPER TOP LAYER FORMATION MATERIAL, INFORMATION-BEARING MEDIUM, WRISTBAND CLIP, AND CARBON DIOXIDE REDUCTION METHOD USING SAME

(75) Inventors: Hiromi Yamamuro, Tokyo (JP); Yoshihito Fujii, Tokyo (JP); Masamitsu Nagahama, Saitama (JP); Shigeru Kido, Kukushima (JP); Akira Sato, Noda (JP); Masahiko Abe, Noda (JP)

(73) Assignee: SATO HOLDINGS KABUSHIKI KAISHA (JP)

( * ) Notice: Subject to any disclaimer, the term of this patent is extended or adjusted under 35 U.S.C. 154(b) by 86 days.

(21) Appl. No.: 13/997,947

(22) PCT Filed: Dec. 27, 2011

(86) PCT No.: PCT/JP2011/007327
§ 371 (c)(1),
(2), (4) Date: Jun. 25, 2013

(87) PCT Pub. No.: WO2012/090498
PCT Pub. Date: Jul. 5, 2012

(65) Prior Publication Data
US 2013/0287986 A1 Oct. 31, 2013

(30) Foreign Application Priority Data

| Dec. 27, 2010 | (JP) | ................................ 2010-290974 |
| Feb. 3, 2011 | (JP) | ................................ 2011-021524 |
| Feb. 3, 2011 | (JP) | ................................ 2011-021525 |
| Sep. 15, 2011 | (JP) | ................................ 2011-201982 |

(51) Int. Cl.
*B01D 53/04* (2006.01)
*B01D 53/62* (2006.01)
(Continued)

(52) U.S. Cl.
CPC ............. *G09F 3/02* (2013.01); *B01D 53/0407* (2013.01); *B01D 53/62* (2013.01); *B41M 5/3377* (2013.01);
(Continued)

(58) Field of Classification Search
CPC ........... B41M 5/26–5/48; B41M 5/52; B41M 5/5218; B01D 53/04; B01D 53/0407; B01D 53/62; B01D 2253/106; Y02C 10/04; Y10T 428/249994
USPC ......... 503/200–226; 428/32.5, 320.2; 95/139
See application file for complete search history.

(56) References Cited

U.S. PATENT DOCUMENTS

| 5,989,714 A | 11/1999 | Drummond |
| 7,047,682 B2 | 5/2006 | Riley |

(Continued)

FOREIGN PATENT DOCUMENTS

| JP | 03-085265 A | 4/1991 |
| JP | 07-188487 | 7/1995 |

(Continued)

OTHER PUBLICATIONS

International Search Report dated Apr. 17, 2012 issued in corresponding international patent application No. PCT/JP2011/007327.
(Continued)

*Primary Examiner* — Bruce H Hess
(74) *Attorney, Agent, or Firm* — Ostrolenk Faber LLP

(57) ABSTRACT

Provided is one of labels 101, 120, 130 and 140, top layer materials formed on a printing medium 201, 246 and 266, information-bearing media 301, 330, 350 and 360, a solid fuel 401, and a wristband clip 510, having the function of absorbing carbon dioxide to which a new carbon dioxide absorbent is added. Provided are also carbon dioxide reduction methods of absorbing carbon dioxide by burning the same.

32 Claims, 49 Drawing Sheets

(51) Int. Cl.
*B41M 5/337* (2006.01)
*B41M 5/42* (2006.01)
*B41M 5/52* (2006.01)
*G09F 3/02* (2006.01)
*G09F 3/10* (2006.01)
*F16B 2/20* (2006.01)
*D21H 27/00* (2006.01)
*B01D 53/02* (2006.01)

(52) U.S. Cl.
CPC ............... *B41M 5/426* (2013.01); *B41M 5/52* (2013.01); *D21H 27/001* (2013.01); *F16B 2/20* (2013.01); *G09F 3/10* (2013.01); *B01D 53/02* (2013.01); *B01D 2253/106* (2013.01); *B01D 2259/4541* (2013.01); *G09F 2003/0282* (2013.01); *G09F 2003/0283* (2013.01); *Y02C 10/04* (2013.01); *Y02P 70/20* (2015.11); *Y02P 70/24* (2015.11); *Y10T 24/1394* (2015.01); *Y10T 428/14* (2015.01); *Y10T 428/249994* (2015.04); *Y10T 428/28* (2015.01); *Y10T 428/2848* (2015.01)

(56) References Cited

U.S. PATENT DOCUMENTS

| | | | | |
|---|---|---|---|---|
| 7,338,919 | B2* | 3/2008 | Kawahara et al. ........... | 503/201 |
| 7,902,117 | B2* | 3/2011 | Mathur et al. ............... | 503/200 |
| 2004/0099976 | A1 | 5/2004 | Otake et al. | |
| 2006/0257094 | A1* | 11/2006 | McEvoy et al. ............. | 385/147 |
| 2007/0220796 | A1 | 9/2007 | Riley et al. | |
| 2007/0259180 | A1 | 11/2007 | Sugimoto et al. ........... | 428/402 |
| 2012/0184656 | A1 | 7/2012 | Nagahama et al. | |

FOREIGN PATENT DOCUMENTS

| | | |
|---|---|---|
| JP | 7-188487 | 7/1995 |
| JP | 09-095063 | 4/1997 |
| JP | 9-95063 | 4/1997 |
| JP | 2000-500425 | 1/2000 |
| JP | 2000-355079 | 12/2000 |
| JP | 2001-026754 A | 1/2001 |
| JP | 2003-119120 A | 4/2003 |
| JP | 2005-160551 | 6/2005 |
| JP | 2006-170980 | 6/2006 |
| JP | 2006-224492 A | 8/2006 |
| JP | 2007-167190 | 7/2007 |
| JP | 2007-182686 | 7/2007 |
| JP | 2008-106171 | 5/2008 |
| JP | 2009-122048 | 6/2009 |
| JP | 2010-529492 | 8/2010 |
| JP | 2013-122020 | 6/2013 |
| WO | WO 97/17289 | 5/1997 |
| WO | WO 2006/060589 | 6/2006 |
| WO | WO 2008/150795 | 12/2008 |
| WO | WO 2011/037238 A1 | 3/2011 |

OTHER PUBLICATIONS

International Preliminary Examination Report dated May 13, 2013 issued in corresponding international patent application No. PCT/JP2011/007327.

Matsuda, C., Nikkei Monozukuri, (Feb. 3, 2009). Tokyo University of Science, Develops Olefin-Based Resin with Low CO2 Emissions. Retrieved from NIKKEI Technology Online http//techon.nikkeibp.co.jp/article/NEWS/20090203/165085/ with English translation.

Japanese Office Action dated Oct. 7, 2014 along with translation. (15 pages).

*SATO launches sales of "EcoNano©", the world's first label product that absorbs and reduces CO2 when burned*, [online], Sato Holdings Corporation, Nov. 9, 2011, [accessed on Sep. 26, 2014], URL, http://www.sato.co jp/topics/2011/11-09-co2-2.html.

*The world's first label product that absorbs and reduces CO2 at the time of incineration—Developed jointly by SATO and Acteiive, a venture company originated in Tokyo University of Science—*, [online], Sato Holdings Corporation, Feb. 18, 2011, [accessed on Sep. 26, 2014], URL, http://www.sato.co.jp/topics/2011/02-18-co2-1.html.

Search Report and Written Opinion dated Nov. 14, 2014 in corresponding Singapore Patent Application No. 2013049515 (12 pages).

Chinese Office Action issued Apr. 3, 2015 for the corresponding Chinese Patent Application. No. 201180062795.3 and its English translation.

The Further Examination Report issued May 16, 2016 for corresponding New Zealand Application No. 708917.

The First Examination Report issued May 16, 2016 for corresponding New Zealand Application No. 719446.

Office Action issued on May 23, 2016 in corresponding Korean Patent Application No. 10-2013-7016704 (with English translation).

\* cited by examiner

FIG.3
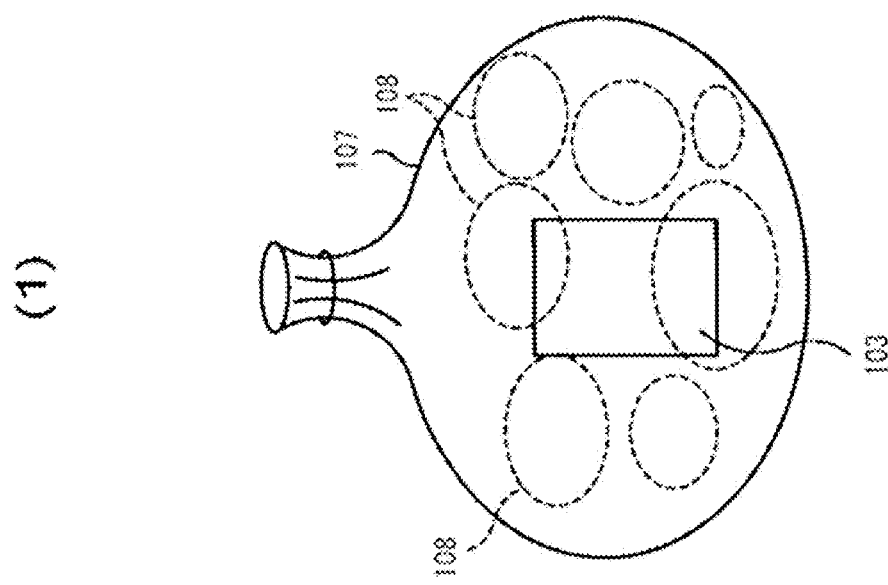
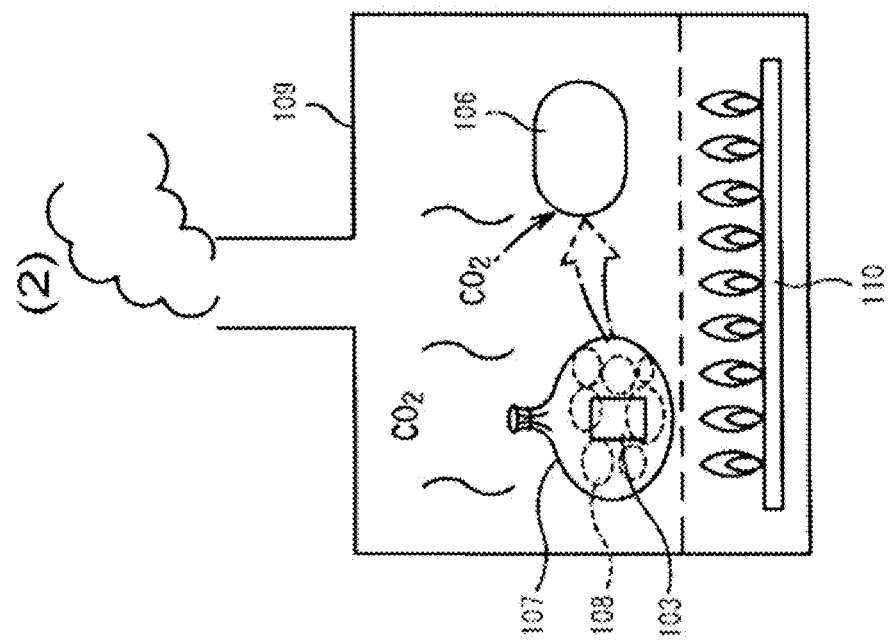

FIG.7

[CARBON DIOXIDE REDUCTION AMOUNT]

| SAMPLE (CONCENTRATION OF $CO_2$ REDUCING AGENT[%]) | RESIDUE AMOUNT [%] | DIFFERENCE IN RESIDUE AMOUNT [%] | $CO_2$ REDUCTION AMOUNT [%] |
|---|---|---|---|
| 0.00 | 8.24 | – | – |
| 0.01 | 10.21 | 1.97 | 33.68 |
| 0.05 | 11.43 | 3.19 | 51.99 |
| 0.10 | 11.71 | 3.47 | 56.20 |

FIG.34

[CARBON DIOXIDE REDUCTION AMOUNT]

| SAMPLE (CONCENTRATION OF $CO_2$ REDUCING AGENT[%]) | RESIDUE AMOUNT [%] | DIFFERENCE IN RESIDUE AMOUNT [%] | $CO_2$ REDUCTION AMOUNT [%] |
|---|---|---|---|
| NOT ADDED | 5.32 | — | — |
| 3.00 | 9.37 | 4.05 | 64.89 |

FIG.35

| NUMBER | CARBON DIOXIDE ABSORBENT | DISPERSION AID | RESIN | DISPERSION TREATMENT METHOD | | | EVALUATION RESULT | | | |
|---|---|---|---|---|---|---|---|---|---|---|
| | | | | SUPER CRITICAL FLUID TREATMENT | ULTRASONIC IRRADIATION TREATMENT | STIRRING TREATMENT | CARBON DIOXIDE EMISSION AMOUNT mg/g | TENSILE YIELD STRESS MPa | BENDING ELASTIC MODULUS MPa | IMPACT STRENGTH KJ/m² |
| EXAMPLE 1 | CALCIUM HYDROXIDE | CALCIUM 12-HYDROXYSTEARATE | LLDPE | ○ | | | 481 | 14 | 700 | NOT BROKEN |
| EXAMPLE 2 | CALCIUM OXIDE | CALCIUM 12-HYDROXYSTEARATE | LLDPE | ○ | | | 475 | 13 | 698 | NOT BROKEN |
| EXAMPLE 3 | AMORPHOUS ALUMINOSILICATE | CALCIUM 12-HYDROXYSTEARATE | LLDPE | ○ | | | 480 | 14 | 700 | NOT BROKEN |
| EXAMPLE 4 | BARIUM TITANATE | CALCIUM 12-HYDROXYSTEARATE | LLDPE | ○ | | | 473 | 14 | 698 | NOT BROKEN |
| EXAMPLE 5 | LITHIUM SILICATE | CALCIUM 12-HYDROXYSTEARATE | LLDPE | ○ | | | 477 | 12 | 698 | NOT BROKEN |
| EXAMPLE 6 | CALCIUM HYDROXIDE | PHOSPHATIDYLCHOLINE | LLDPE | ○ | | | 480 | 11 | 700 | NOT BROKEN |
| EXAMPLE 7 | CALCIUM HYDROXIDE | OLEFIN/MALEIC ACID COPOLYMER SODIUM SALT | LLDPE | ○ | | | 480 | 14 | 697 | NOT BROKEN |
| EXAMPLE 8 | AMORPHOUS ALUMINOSILICATE | PHOSPHATIDYLCHOLINE | LLDPE | ○ | | | 480 | 9 | 250 | 240 |
| EXAMPLE 9 | AMORPHOUS ALUMINOSILICATE | SODIUM POLYACRYLATE | LLDPE | ○ | | | 450 | 7 | 250 | 210 |
| EXAMPLE 10 | CALCIUM HYDROXIDE | POE30-10-ODES | LLDPE | ○ | | | 460 | 14 | 710 | NOT BROKEN |
| EXAMPLE 11 | CALCIUM HYDROXIDE | CALCIUM 12-HYDROXYSTEARATE | PET | ○ | | | 475 | 73 | 9120 | 3.8 |
| EXAMPLE 12 | CALCIUM HYDROXIDE | CALCIUM 12-HYDROXYSTEARATE | NYLON6 | ○ | | | 479 | 60 | 2500 | 19 |
| EXAMPLE 13 | CALCIUM HYDROXIDE | CALCIUM 12-HYDROXYSTEARATE | PVC | ○ | | | 482 | 58 | 3100 | 9.8 |
| EXAMPLE 14 | CALCIUM HYDROXIDE | CALCIUM 12-HYDROXYSTEARATE | PS | ○ | | | 480 | 59 | 2610 | 2.1 |
| EXAMPLE 15 | CALCIUM HYDROXIDE | CALCIUM 12-HYDROXYSTEARATE | LLDPE | | ○ | | 481 | 14 | 700 | NOT BROKEN |
| EXAMPLE 16 | AMORPHOUS ALUMINOSILICATE | PHOSPHATIDYLCHOLINE | LLDPE | | ○ | | 460 | 8 | 240 | 200 |
| EXAMPLE 17 | CALCIUM HYDROXIDE | CALCIUM 12-HYDROXYSTEARATE | LLDPE | | | ○ | 478 | 14 | 700 | NOT BROKEN |
| EXAMPLE 18 | AMORPHOUS ALUMINOSILICATE | PHOSPHATIDYLCHOLINE | LLDPE | | | ○ | 480 | 10 | 230 | 250 |
| EXAMPLE 19 | COCONUT MESOCARP FIBER | CALCIUM 12-HYDROXYSTEARATE | LLDPE | | | ○ | 476 | 13 | 680 | NOT BROKEN |

FIG.36

| NUMBER | CARBON DIOXIDE ABSORBENT | DISPERSION AID | RESIN | DISPERSION TREATMENT METHOD | | | EVALUATION RESULT | | | |
|---|---|---|---|---|---|---|---|---|---|---|
| | | | | SUPER CRITICAL FLUID TREATMENT | ULTRASONIC IRRADIATION TREATMENT | STIRRING TREATMENT | CARBON DIOXIDE EMISSION AMOUNT mg/g | TENSILE YIELD STRESS MPa | BENDING ELASTIC MODULUS MPa | IMPACT STRENGTH KJ/m² |
| COMPARATIVE EXAMPLE 1 | CALCIUM HYDROXIDE | CALCIUM 12-HYDROXYSTEARATE | LLDPE | - | - | - | 994 | 8 | 650 | 78 |
| COMPARATIVE EXAMPLE 2 | CALCIUM OXIDE | CALCIUM 12-HYDROXYSTEARATE | LLDPE | - | - | - | 1000 | 7 | 630 | 70 |
| COMPARATIVE EXAMPLE 3 | AMORPHOUS ALUMINOSILICATE | CALCIUM 12-HYDROXYSTEARATE | LLDPE | - | - | - | 1100 | 3 | 200 | 80 |
| COMPARATIVE EXAMPLE 4 | BARIUM TITANATE | CALCIUM 12-HYDROXYSTEARATE | LLDPE | - | - | - | 1050 | 8 | 640 | 75 |
| COMPARATIVE EXAMPLE 5 | LITHIUM SILICATE | CALCIUM 12-HYDROXYSTEARATE | LLDPE | - | - | - | 1025 | 6 | 610 | 72 |
| COMPARATIVE EXAMPLE 6 | CALCIUM HYDROXIDE | PHOSPHATIDYLCHOLINE | LLDPE | - | - | - | 1010 | 5 | 190 | 90 |
| COMPARATIVE EXAMPLE 7 | CALCIUM HYDROXIDE | OLEFIN/MALEIC ACID COPOLYMER SODIUM SALT | LLDPE | - | - | - | 995 | 8 | 650 | 80 |
| COMPARATIVE EXAMPLE 8 | AMORPHOUS ALUMINOSILICATE | PHOSPHATIDYLCHOLINE | LLDPE | - | - | - | 990 | 4 | 180 | 80 |
| COMPARATIVE EXAMPLE 9 | AMORPHOUS ALUMINOSILICATE | SODIUM POLYACRYLATE | LLDPE | - | - | - | 1000 | 4 | 220 | 100 |
| COMPARATIVE EXAMPLE 10 | CALCIUM HYDROXIDE | POE30-10-ODES | LLDPE | - | - | - | 995 | 8 | 660 | 89 |
| COMPARATIVE EXAMPLE 11 | CALCIUM HYDROXIDE | CALCIUM 12-HYDROXYSTEARATE | PET | - | - | - | 990 | 70 | 9000 | 3 |
| COMPARATIVE EXAMPLE 12 | CALCIUM HYDROXIDE | CALCIUM 12-HYDROXYSTEARATE | NYLON6 | - | - | - | 997 | 55 | 2300 | 16 |
| COMPARATIVE EXAMPLE 13 | CALCIUM HYDROXIDE | CALCIUM 12-HYDROXYSTEARATE | PVC | - | - | - | 989 | 47 | 2800 | 7.1 |
| COMPARATIVE EXAMPLE 14 | CALCIUM HYDROXIDE | CALCIUM 12-HYDROXYSTEARATE | PS | - | - | - | 1010 | 51 | 2450 | 1.7 |
| COMPARATIVE EXAMPLE 15 | SAME AS IN COMPARATIVE EXAMPLE 1 WITH RESPECT TO ALL ITEMS | | | | | | | | | |
| COMPARATIVE EXAMPLE 16 | SAME AS IN COMPARATIVE EXAMPLE 8 WITH RESPECT TO ALL ITEMS | | | | | | | | | |
| COMPARATIVE EXAMPLE 17 | SAME AS IN COMPARATIVE EXAMPLE 1 WITH RESPECT TO ALL ITEMS | | | | | | | | | |
| COMPARATIVE EXAMPLE 18 | SAME AS IN COMPARATIVE EXAMPLE 8 WITH RESPECT TO ALL ITEMS | | | | | | | | | |
| COMPARATIVE EXAMPLE 19 | COCONUT MESOCARP FIBER | CALCIUM 12HYDROXYSTEARATE | LLDPE | - | - | - | 990 | 7 | 610 | 70 |

FIG.38
(a)
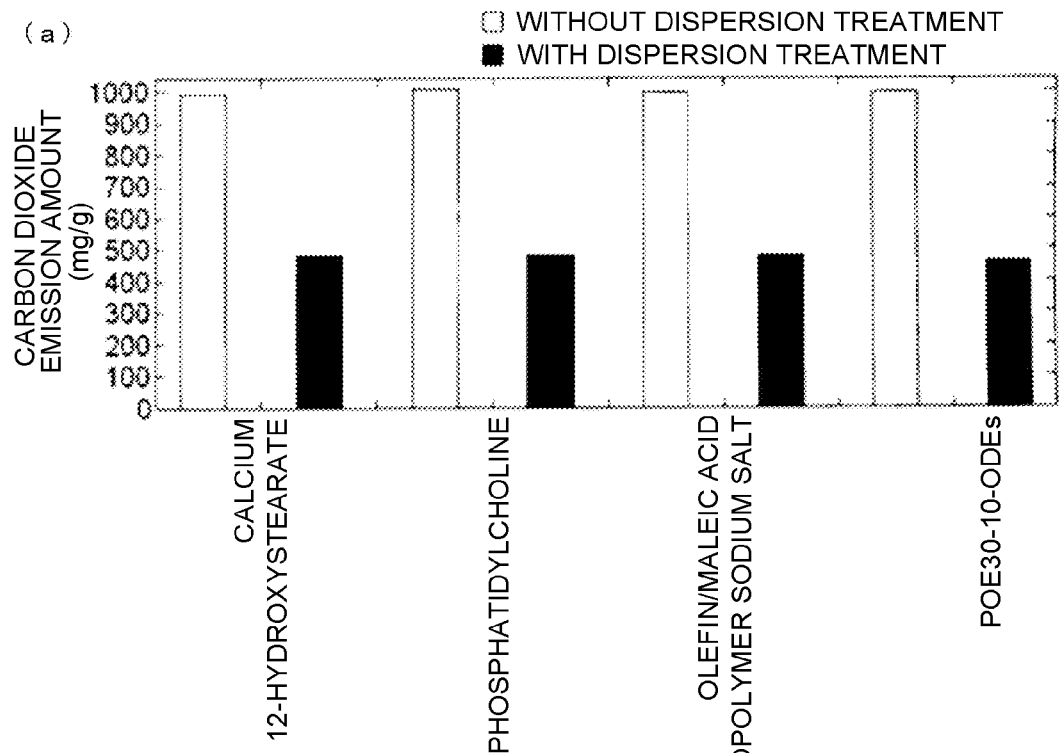
(b)
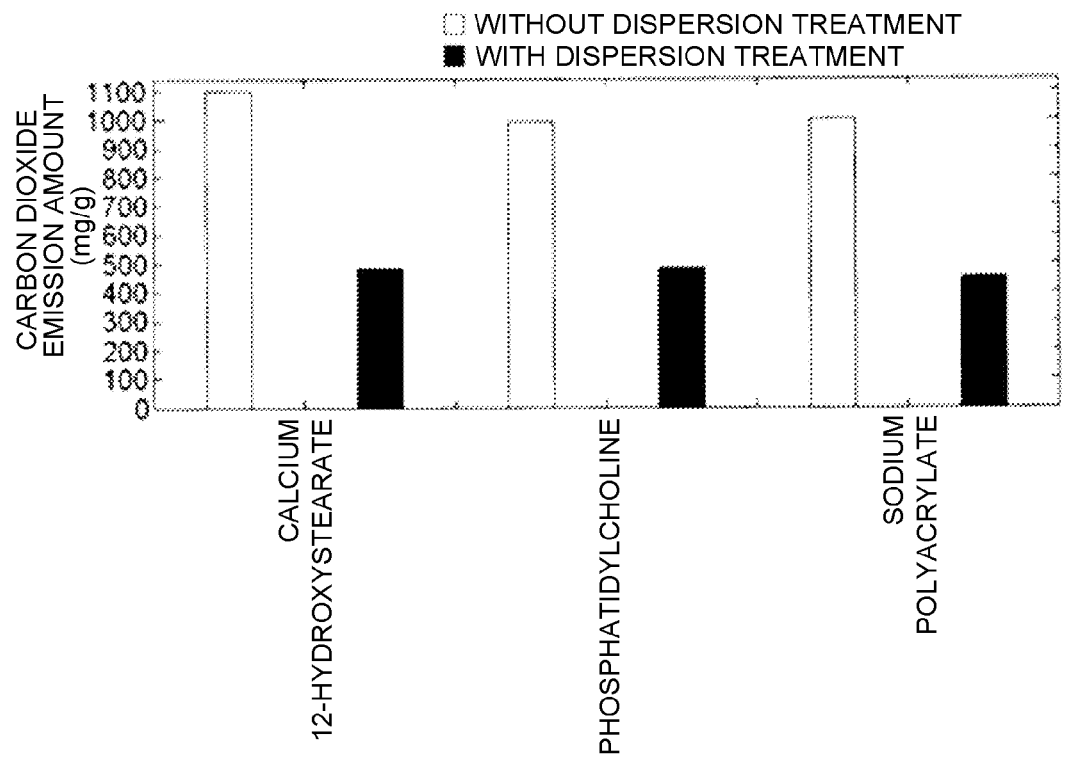

FIG.40
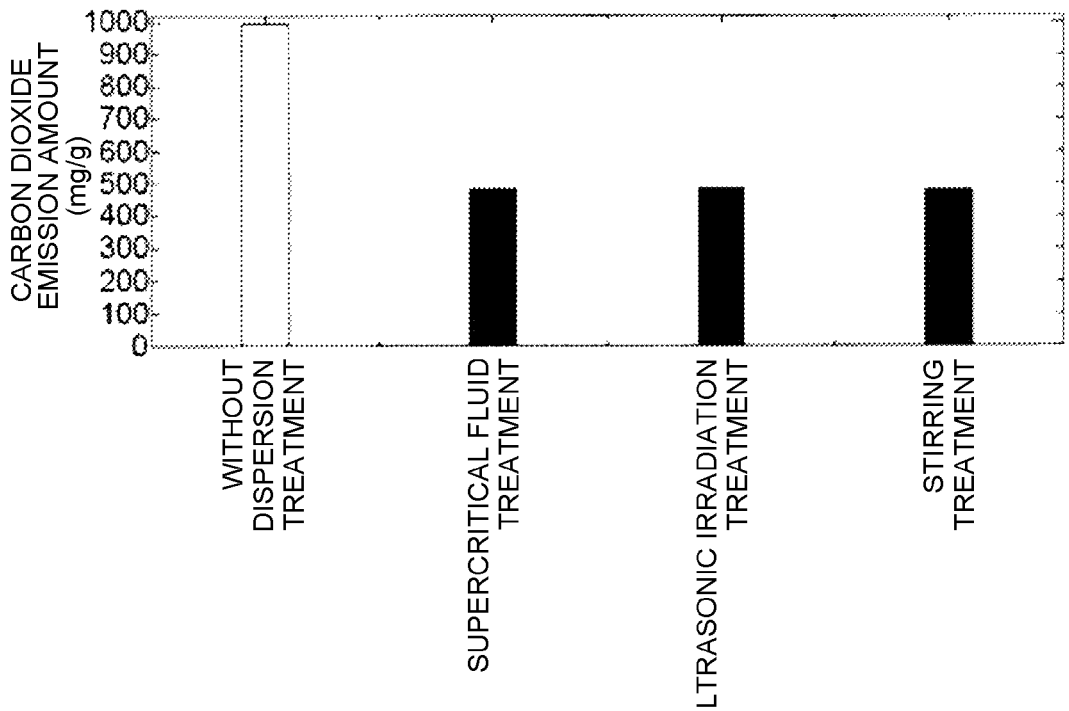
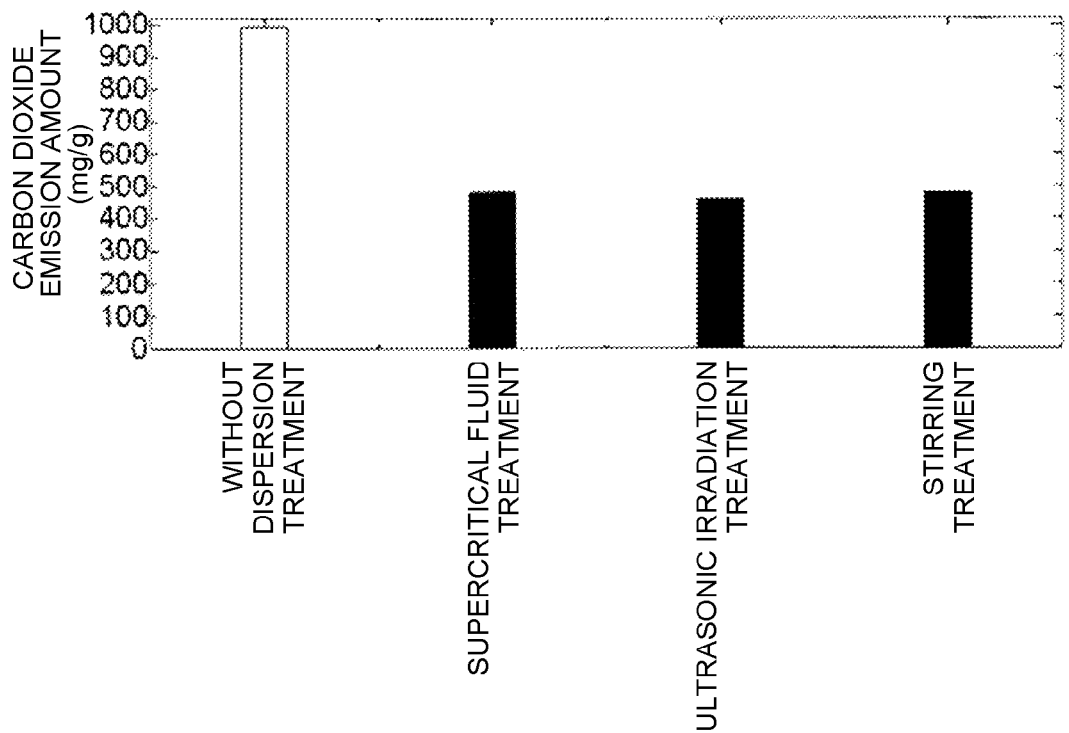

LABEL, PRINTING PAPER TOP LAYER FORMATION MATERIAL, INFORMATION-BEARING MEDIUM, WRISTBAND CLIP, AND CARBON DIOXIDE REDUCTION METHOD USING SAME

CROSS-REFERENCE TO RELATED APPLICATIONS

The present application is a 35 U.S.C. §§371 national phase conversion of PCT/JP2011/007327, filed Dec. 27, 2011, which claims priority of Japanese Patent Application No. 2010-290974, filed Dec. 27, 2010, Japanese Patent Application No. 2011-021524, filed Feb. 3, 2011, Japanese Patent Application No. 2011-021525, filed Feb. 3, 2011 and Japanese Patent Application No. 2011-201982, filed Sep. 15, 2011, the contents of which are incorporated by reference herein. The PCT International Application was published in the Japanese language.

TECHNICAL FIELD

The present invention relates to a label, a top layer material formed on a printing medium, an information-bearing medium, a solid fuel, a wristband clip, and carbon dioxide reduction methods using them.

More specifically, the present invention relates to a label for use in various applications in any fields, a top layer material formed on a printing medium for use in various applications in any fields (for example, ink or ink ribbon, various coating materials, and the like), an information-bearing medium for use in various applications in any fields, a solid fuel manufactured using industry waste such as various used paper and waste plastic materials as a raw material, a wristband clip for winding and clipping a wristband to be used with being annularly wound around a wrist, an ankle or the like of a patient and a visitor in the medical field and the playland field, and carbon dioxide reduction methods using them.

BACKGROUND ART

Various types of label materials or and sticker materials have been conventionally utilized in various applications in any fields, but these materials have no function of suppressing the generation of carbon dioxide at the time of being incinerated.

However, the label materials or and sticker materials are generally incinerated after use as they are or together with objects of pasting depending on various forms of usage including packaging boxes or packaging bags for commercial goods, and a problem is that carbon dioxide is generated with burning of such materials.

Furthermore, a backing paper (release paper) temporarily attached to the rear surfaces of labels is released upon the use of the labels and discarded, and there is another problem that carbon dioxide is generated with an incineration disposal of such paper.

Various types of printing materials have been conventionally utilized in various applications in any fields.

Printing materials include top layer formation materials represented by inks and ink ribbons (thermal transfer ink ribbons and the like) to be printed on the printing medium, various coating materials and so forth, as well as printing mediums such as label materials or sticker materials and tag materials that are made of paper or synthetic resin The top layer formation materials mean those that form a surface (top layer) with printing or coating on a printing medium, but the top layer formation materials have no function for suppressing the generation of carbon dioxide at the time of being incinerated.

However, the top layer formation materials are generally incinerated after use as they are or together with the printing medium. Furthermore, the top layer formation materials are generally incinerated together with packaging boxes and packaging bags for commercial goods to which the printing medium is pasted or attached and objects including various products to which the printing medium is pasted or attached depending on various forms of usage. Accordingly, a problem is that carbon dioxide is generated with burning of such materials.

Various types of information-bearing media have been conventionally utilized in various applications in any fields.

As information-bearing media, there are not only printing medium such as labels or stickers, tags, and tickets that are made of paper or synthetic resin, but there are also wristbands and various cards that are also made of paper or synthetic resin, and rewritable paper on which information can be rewritten a plurality of times are examples.

The information-bearing media mean those that indicate various information printed on a front surface or a rear surface or recorded on a magnetic layer or other functional layer, and that are attached to an object of pasting or object of attachment depending on the respective forms of usage, but the information-bearing media have no function of suppressing the generation of carbon dioxide at the time of being incinerated.

For example, while the labels, stickers and tags are used with price information and management information being indicated on objects of pasting or objects of attaching including food items, cloth items or the like, the labels, stickers and tags are incinerated and disposed of as domestic refuse after use. The tickets are also finally incinerated and disposed of after being used as admission tickets or the like.

While the wristbands are particularly used for identifying a patient or a visitor in a hospital, a playland or the like, the wristbands are also incinerated and disposed of as waste after use.

The cards mean those that indicate or bear necessary information by various systems such as a leuco system, a white opaque system, a thermal system or a magnetic system, or a system in which an IC chip is used, and the cards are also incinerated and disposed of as waste after use.

Similarly to the cards, the rewritable paper also means one that utilizes, for example, a method in which predetermined information can be rewritten by utilizing difference in heat-sensitive temperature, or other method, and the rewritable paper is finally incinerated and disposed of.

In short, the information-bearing media are generally incinerated after use as they are or together with the objects of pasting or the objects of attaching, and a problem is that carbon dioxide is generated with burning of such media.

Conventionally, used paper such as cardboard boxes and paper scraps, various waste plastic materials, and other flammables have been collected as industry waste by a recycle system and used as raw materials to manufacture solid fuels (R. P. F: Refuse Paper & Plastic Fuel), and the solid fuels have been utilized as a part of boiler fuels in paper-manufacturing companies, cement companies, chemical companies, and any other fields. Herein, as the industry waste, various labels and tags which are made of a paper material or a plastic material and used for printing variable information thereon, various stickers on which constant information is printed in advance, and other information-indicating media and information-bearing media are also collected from the viewpoint of holding confidential information.

However, the solid fuels naturally generate carbon dioxide when they are burned, and a problem is that the solid fuels have no function of suppressing the generation of carbon dioxide at the time of being burned.

Conventionally, the wristbands, on which identification data specific to an individual, such as department, name, age, and blood type of a patient, is printed and indicated, have been annularly and loosely wound to any extremity of a patient, such as a wrist, thereby ensuring the identification of a patient in a hospital or the like.

In general, the wristbands have a band shape and are used with being wound around a wrist or the like and being fastened by wristband clips on both ends thereof. The wristband clips are configured from a male clip portion and a female clip portion that are connected by a hinge, and a band hole insertion pin (boss) formed on the male clip portion is inserted into a band hole of the wristband and thereafter fitted into a pin hole (boss hole) formed on the female clip portion to thereby allow the wristbands to be annularly wound and clipped. The wristbands fastened by the clips are not easily unfixed and can be worn for several weeks.

However, the wristbands and the clips for fixing the wristbands are incinerated and disposed of as waste after the period of use. In other words, a problem is that carbon dioxide is generated by burning with such incineration.

Accordingly, for preventing global warming that is increasingly discussed worldwide, there is an urgent need for reduction in the occurrence of carbon dioxide, and a solution thereto is being sought.

SUMMARY OF INVENTION

Technical Problem

The present invention has been made in view of the above problems, and an object thereof is to provide a label having the function of absorbing carbon dioxide, and a carbon dioxide reduction method using the label.

In addition, an object of the present invention is to provide a label that is capable of absorbing carbon dioxide at the time of being incinerated, and a carbon dioxide reduction method using the label.

In addition, an object of the present invention is to provide a label that is capable of absorbing carbon dioxide by an incineration disposal together with an object of pasting, and a carbon dioxide reduction method using the label.

The present invention has been made in view of the above problems, and an object thereof is to provide a top layer material formed on a printing medium having the function of absorbing carbon dioxide, and a carbon dioxide reduction method using the top layer material formed on a printing medium.

In addition, an object of the present invention is to provide a top layer material formed on a printing medium that is capable of absorbing carbon dioxide at the time of being incinerated, and a carbon dioxide reduction method using the top layer material formed on a printing medium.

In addition, an object of the present invention is to provide a top layer material formed on a printing medium that is capable of absorbing carbon dioxide by incinerating the top layer material formed on a printing medium together with printing medium and an object of pasting or an object of attaching to the printing medium, and a carbon dioxide reduction method using the top layer material formed on a printing medium.

The present invention has been made in view of the above problems, and an object thereof is to provide an information-bearing medium having the function of absorbing carbon dioxide, and a carbon dioxide reduction method using the information-bearing medium.

In addition, an object of the present invention is to provide an information-bearing medium that is capable of absorbing carbon dioxide at the time of being incinerated, and a carbon dioxide reduction method using the information-bearing medium.

In addition, an object of the present invention is to provide an information-bearing medium that is capable of absorbing carbon dioxide by incinerating the information-bearing medium together with an object of pasting or an object of attaching thereto, and a carbon dioxide reduction method using the information-bearing medium.

The present invention has been made in view of the above problems, and an object thereof is to provide a solid fuel having the function of absorbing carbon dioxide, and a carbon dioxide reduction method using the solid fuel.

In addition, an object of the present invention is to provide a solid fuel that is capable of absorbing carbon dioxide at the time of being burned, and a carbon dioxide reduction method using the solid fuel.

In addition, an object of the present invention is to provide a solid fuel that is capable of absorbing carbon dioxide by being burned together with other fuel, and a carbon dioxide reduction method using the solid fuel.

The present invention has been made in view of the above problems, and an object thereof is to provide a wristband clip having the function of absorbing carbon dioxide, and a carbon dioxide reduction method using the wristband clip.

In addition, an object of the present invention is to provide a wristband clip that is capable of absorbing carbon dioxide at the time of being incinerated, and a carbon dioxide reduction method using the wristband clip.

In addition, an object of the present invention is to provide a wristband clip that is capable of absorbing carbon dioxide by incinerating the wristband clip together with an object of attaching such as a wristband, and a carbon dioxide reduction method using the wristband clip.

Solution to Problem

That is, the present invention has been made focusing on, in a manufacturing step of a label or a sticker, addition of a carbon dioxide absorbent to the material thereof or lamination of the carbon dioxide absorbent on the material. A first invention provides a label having a label substrate and an adhesive layer applied to the rear surface of the label substrate, wherein a carbon dioxide absorbent is added to at least any one of the label substrate and the adhesive layer.

A second invention provides a label having a label substrate and an adhesive layer applied to the rear surface of the label substrate, wherein a carbon dioxide absorbent layer is laminated on at least any one of the label substrate and the adhesive layer.

A third invention provides a label having a label substrate, an adhesive layer applied to the rear surface of the label substrate, and a backing paper temporarily attached to the adhesive layer, wherein a carbon dioxide absorbent is added to at least any one of the label substrate, the adhesive layer and the backing paper.

A fourth invention provides a carbon dioxide reduction method using a label, the method comprising: preparing a label having a label substrate and an adhesive layer applied to the rear surface of the label substrate, in which a carbon dioxide absorbent is added to at least any one of the label substrate and the adhesive layer; and incinerating the label to allow the carbon dioxide absorbent to absorb carbon dioxide.

A fifth invention provides a carbon dioxide reduction method using a label, the method comprising: preparing a label having a label substrate and an adhesive layer applied to the rear surface of the label substrate, in which a carbon dioxide absorbent layer is laminated on at least any one of the label substrate and the adhesive layer; and incinerating the label to allow a carbon dioxide absorbent of the carbon dioxide absorbent layer to absorb carbon dioxide.

A sixth invention provides a carbon dioxide reduction method using a label, the method comprising: preparing a label having a label substrate, an adhesive layer applied to the rear surface of the label substrate, and a backing paper temporarily attached to the adhesive layer, in which a carbon dioxide absorbent is added to at least any one of the label substrate, the adhesive layer and the backing paper; and incinerating at least any one of the label substrate, the adhesive layer and the backing paper to allow the carbon dioxide absorbent to absorb carbon dioxide.

The carbon dioxide absorbent can be particulate.

The carbon dioxide absorbent can be particulate to nanometer in size.

The carbon dioxide absorbent can be uniformly dispersed.

The present invention has been made focusing on, in a manufacturing step of a top layer formation material, adding to or laminating on the top layer formation material a carbon dioxide absorbent, and a seventh invention provides a top layer material formed on a printing medium which is represented by an ink or an ink ribbon, or various coating materials for performing printing on a printing medium, and to which a carbon dioxide absorbent is added.

An eighth invention provides a top layer material formed on a printing medium which is represented by an ink or an ink ribbon, or various coating materials for performing printing on a printing medium, and on which a carbon dioxide absorbent layer is laminated.

A ninth invention provides a carbon dioxide reduction method using a top layer material formed on a printing medium, the method comprising: preparing a top layer material which is represented by an ink or an ink ribbon, or various coating materials for performing printing on a printing medium, and to which a carbon dioxide absorbent is added; and incinerating the top layer material to allow the carbon dioxide absorbent to absorb carbon dioxide.

A tenth invention provides a carbon dioxide reduction method using a top layer material formed on a printing medium, the method comprising: preparing a top layer material which is represented by an ink or an ink ribbon, or various coating materials for performing printing on a printing medium, and on which a carbon dioxide absorbent layer is laminated; and incinerating the top layer material to allow a carbon dioxide absorbent of the carbon dioxide absorbent layer to absorb carbon dioxide.

The carbon dioxide absorbent can be particulate.

The carbon dioxide absorbent can be particulate to nanometer in size.

The carbon dioxide absorbent can be uniformly dispersed.

The top layer material can be a thermal transfer ink ribbon, and the carbon dioxide absorbent can be added to any layer of the thermal transfer ink ribbon.

The top layer material can be a thermal transfer ink ribbon, and the carbon dioxide absorbent layer can be laminated on any layer of the thermal transfer ink ribbon.

The present invention has been made focusing on adding to or laminating on a medium body formed from each of various configurations a carbon dioxide absorbent, and an eleventh invention provides an information-bearing medium having a medium body and capable of bearing information on the medium body, wherein a carbon dioxide absorbent is added to the medium body.

A twelfth invention provides an information-bearing medium having a medium body and capable of bearing information on the medium body, wherein a carbon dioxide absorbent layer is laminated on the medium body.

A thirteenth invention provides a carbon dioxide reduction method using an information-bearing medium, the method comprising: preparing an information-bearing medium in which a carbon dioxide absorbent is added to a medium body capable of bearing information; and incinerating the information-bearing medium to allow the carbon dioxide absorbent to absorb carbon dioxide.

A fourteenth invention provides a carbon dioxide reduction method using an information-bearing medium, the method comprising: preparing an information-bearing medium in which a carbon dioxide absorbent layer is laminated on a medium body capable of bearing information; and incinerating the information-bearing medium to allow a carbon dioxide absorbent of the carbon dioxide absorbent layer to absorb carbon dioxide.

The carbon dioxide absorbent can be particulate.

The carbon dioxide absorbent can be particulate to nanometer in size.

The carbon dioxide absorbent can be uniformly dispersed.

The medium body can have an at least two-layer structure, and the carbon dioxide absorbent can be added to at least any layer.

The medium body can have an at least two-layer structure, and the carbon dioxide absorbent layer can be laminated on at least any one of the layers.

The medium body can be a thermal paper.

The carbon dioxide absorbent can be added to a heat-sensitive color-forming layer of the thermal paper.

The carbon dioxide absorbent can be added to any of a dye, a developer or a stabilizer constituting the heat-sensitive color-forming layer.

The present invention has made focusing on adding a carbon dioxide absorbent to used paper, various waste plastic materials, labels or stickers, cardboard boxes, or other industry waste to manufacture a solid fuel, and a fifteenth invention provides a solid fuel manufactured using industry waste as a raw material, wherein a carbon dioxide absorbent is added to the industry waste.

A sixteenth invention provides a carbon dioxide reduction method using a solid fuel, the method comprising: preparing a solid fuel manufactured using industry waste as a raw material, to which a carbon dioxide absorbent is added; and burning the solid fuel to allow the carbon dioxide absorbent to absorb carbon dioxide.

The carbon dioxide absorbent can be added in a step of molding a chip obtained by sorting and grinding the industry waste.

The carbon dioxide absorbent can be particulate.

The carbon dioxide absorbent can be particulate to nanometer in size.

The carbon dioxide absorbent can be uniformly dispersed.

The industry waste can include a label having an adhesive layer.

The present invention has been made focusing on adding a carbon dioxide absorbent to a clip for fastening a wristband wound around a wrist, an ankle, or the like, and a seventeenth invention provides a wristband clip for fastening a wristband annularly wound, in which a plurality of band holes and setting holes are formed on both ends in the longitudinal direction at regular intervals, wherein a carbon dioxide absorbent is contained in the wristband clip.

An eighteenth invention provides a carbon dioxide reduction method using a wristband clip, the method comprising: preparing a wristband clip to which the carbon dioxide absorbent is added; and incinerating the wristband clip to allow the carbon dioxide absorbent to absorb carbon dioxide.

The wristband clip can include: a male clip on which a pair of bosses are formed corresponding to the intervals of the band holes of the wristband; and a female clip on which a pair of boss holes through which the pair of bosses are inserted are formed, wherein the bosses can be fitted into the boss holes via the band holes in the state where both ends of the wristband are overlaid each other, thereby fastening the wristband annularly wound, and the bosses and the boss holes can have a shape capable of joining the male clip and the female clip.

The boss can include: a shaft portion provided on the male clip in a protruding manner; a first radially-enlarged portion which is formed so as to radially protrude from the center shaft of the shaft portion; a second radially-enlarged portion which is formed on a tip of the boss and which has a smaller diameter than the first radially-enlarged portion; and a constricted portion which is formed between the first radially-enlarged portion and the second radially-enlarged portion, and has a smaller diameter than the first radially-enlarged portion and the second radially-enlarged portion.

The wristband clip can be formed from polyethylene.

The carbon dioxide absorbent can be particulate.

The carbon dioxide absorbent can be particulate to nanometer in size.

The carbon dioxide absorbent can be uniformly dispersed.

The carbon dioxide absorbent is preferably sodium aluminosilicate.

The sodium aluminosilicate is preferably encapsulated in a phospholipid.

The sodium aluminosilicate is preferably contained in a ribosome.

Advantageous Effects of Invention

In the label and the carbon dioxide reduction method using the label of the present invention, the carbon dioxide absorbent is added to or laminated on the material of the label or sticker, such as the label substrate, the adhesive layer or the backing paper, in the manufacturing step of the label or sticker. Therefore, the carbon dioxide absorbent can absorb carbon dioxide spreading and diffusing along with flowing of an air current not only at the time of incinerating the label alone but also at the time of incinerating the label together with various objects of pasting, thereby enabling to contribute to reduction in carbon dioxide.

In particular, according to the label of the first invention, since the carbon dioxide absorbent is added to at least any one of the label substrate and the adhesive layer, the carbon dioxide absorbent can absorb carbon dioxide at the time of the incineration disposal of the label.

In particular, according to the label of the second invention, since the carbon dioxide absorbent layer is laminated on at least any one of the label substrate and the adhesive layer, the carbon dioxide absorbent of the carbon dioxide absorbent layer can absorb carbon dioxide at the time of the incineration disposal of the label.

In particular, according to the label of the third invention, since the carbon dioxide absorbent is added to at least any one of the label substrate, the adhesive layer and the backing paper, the carbon dioxide absorbent can absorb carbon dioxide not only at the time of an incineration disposal together with to the label substrate and the object of pasting to the adhesive layer but also at the time of the incineration disposal of the backing paper alone.

In particular, according to the carbon dioxide reduction method using a label of the fourth invention, since the incineration disposal of the label of the first invention allows the carbon dioxide absorbent to absorb carbon dioxide, carbon dioxide can be reduced at the time of incinerating and discarding of the label as usually performed.

In particular, according to the carbon dioxide reduction method using a label of the fifth invention, since the incineration disposal of the label of the second invention allows the carbon dioxide absorbent to absorb carbon dioxide, carbon dioxide can be reduced at the time of incinerating and discarding of the label as usually performed.

In particular, according to the carbon dioxide reduction method using a label of the sixth invention, since the incineration disposal of the label of the third invention allows the carbon dioxide absorbent to absorb carbon dioxide, carbon dioxide can be reduced at the time of incinerating and discarding of the label as usually performed.

In the top layer material formed on a printing medium and the carbon dioxide reduction method using this of the present invention, since the carbon dioxide absorbent is added to or laminated on in the manufacturing step of the top layer material, the carbon dioxide absorbent can absorb carbon dioxide spreading and diffusing along with flowing of an air current not only at the time of incinerating the top layer material alone but also at the time of incinerating the top layer material together with the printing medium and the object of pasting or object of attaching used therewith, thereby enabling to contribute to reduction in carbon dioxide.

In particular, according to the top layer material formed on a printing medium of the seventh invention, since the carbon dioxide absorbent is added to the top layer material itself, the carbon dioxide absorbent can absorb carbon dioxide at the time of the incineration disposal of the top layer material formed on a printing medium.

In particular, according to the top layer material formed on a printing medium of the eighth invention, since the carbon dioxide absorbent layer is laminated on the top layer material, the carbon dioxide absorbent of the carbon dioxide absorbent layer can absorb carbon dioxide at the time of the incineration disposal of the top layer material formed on a printing medium.

In particular, according to the carbon dioxide reduction method using a top layer material formed on a printing medium of the ninth invention, since the incineration disposal of the top layer material formed on a printing medium of the first invention allows the carbon dioxide absorbent to absorb carbon dioxide, carbon dioxide can be reduced at the time of incinerating and discarding of the label as usually performed.

In particular, according to the carbon dioxide reduction method using a top layer material formed on a printing medium of the tenth invention, since the incineration disposal of the top layer material formed on a printing medium of the second invention allows the carbon dioxide absorbent to absorb carbon dioxide, carbon dioxide can be reduced at the time of incinerating and discarding of the label as usually performed.

In the information-bearing medium and the carbon dioxide reduction method using this of the present invention, since the carbon dioxide absorbent is added to or laminated on the medium body of the information-bearing medium, the carbon dioxide absorbent can absorb carbon dioxide spreading and diffusing along with flowing of an air current not only at the time of incinerating the information-bearing medium alone but also at the time of incinerating the information-bearing medium together with various objects of pasting or objects of attaching used therewith, thereby enabling to contribute to reduction in carbon dioxide.

In particular, according to the information-bearing medium of the eleventh invention, since the carbon dioxide absorbent is added to the medium body, the carbon dioxide absorbent can absorb carbon dioxide at the time of the incineration disposal of the information-bearing medium.

In particular, according to the information-bearing medium of the twelfth invention, since the carbon dioxide absorbent layer is laminated on the medium body, the carbon dioxide absorbent of the carbon dioxide absorbent layer can absorb carbon dioxide at the time of the incineration disposal of the information-bearing medium.

In particular, according to the carbon dioxide reduction method using an information-bearing medium of the thirteenth invention, since the incineration disposal of the information-bearing medium of the first invention allows the carbon dioxide absorbent to absorb carbon dioxide, carbon dioxide can be reduced at the time of incinerating and discarding of the label as usually performed.

In particular, according to the carbon dioxide reduction method using an information-bearing medium of the fourteenth invention, since the incineration disposal of the information-bearing medium of the second invention allows the carbon dioxide absorbent to absorb carbon dioxide, carbon dioxide can be reduced at the time of incinerating and discarding of the label as usually performed.

In the solid fuel and the carbon dioxide reduction method using this of the present invention, the carbon dioxide absorbent is added to industry waste to manufacture the solid fuel, the carbon dioxide absorbent can absorb carbon dioxide spreading and diffusing along with flowing of an air current at the time of burning the solid fuel, thereby enabling to contribute to reduction in carbon dioxide.

In particular, according to the solid fuel of the fifteenth invention, since the carbon dioxide absorbent is added to the solid fuel itself, heat energy can be ensured and the carbon dioxide absorbent can absorb carbon dioxide at the time of burning the solid fuel.

In particular, according to the carbon dioxide reduction method using a solid fuel of the sixteenth invention, since the solid fuel of the first invention is burned to allow the carbon dioxide absorbent to absorb carbon dioxide, heat energy can be ensured using the solid fuel as usually performed and carbon dioxide can be reduced.

In the wristband clip and the carbon dioxide reduction method using this of the present invention, since the carbon dioxide absorbent is added to the wristband clip, the carbon dioxide absorbent can absorb carbon dioxide spreading and diffusing along with flowing of an air current not only at the time of incinerating the wristband clip alone but also at the time of incinerating the wristband clip together with the object of attaching used therewith such as the wristband, thereby enabling to contribute to reduction in carbon dioxide.

In particular, according to the wristband clip of the seventeenth invention, since the carbon dioxide absorbent is contained in the wristband clip itself, the carbon dioxide absorbent can absorb carbon dioxide at the time of the incineration disposal of the wristband clip.

In particular, according to the carbon dioxide reduction method using a wristband clip of the eighteenth invention, since the incineration disposal of the wristband clip of the first invention allows the carbon dioxide absorbent to absorb carbon dioxide, carbon dioxide can be reduced at the time of incinerating and discarding of the clip as usually performed.

BRIEF DESCRIPTION OF DRAWINGS

FIG. 3 is an explanatory view illustrating a case in which a label strip is used as, for example, a refuse label, wherein Portion (1) in FIG. 3 is an explanatory view illustrating a state where refuse is put in a refuse bag and a label strip is pasted to the refuse bag, and Portion (2) in FIG. 3 is an explanatory view illustrating a state where the refuse along with the refuse bag is incinerated in an incinerator.

FIG. 7 is a table of a carbon dioxide reduction amount, showing experimental results for confirming an effect of reducing carbon dioxide by a carbon dioxide absorbent (Nano vesicle carbon dioxide reduction additive produced by Acteiive R&D).

FIG. 34 is a table of a carbon dioxide reduction amount, showing experimental results for confirming an effect of reducing carbon dioxide by a carbon dioxide absorbent (Nano vesicle carbon dioxide reduction additive produced by Acteiive R&D).

FIG. 35 shows evaluation results in Production Examples of a carbon dioxide absorbent according to the present invention.

FIG. 36 shows evaluation results of conventional resin compositions.

FIG. 38 gives a comparison of carbon dioxide emission amounts in Production Examples with those in Comparative Production Examples on types of dispersion aids.

FIG. 40 gives a comparison of carbon dioxide emission amounts on dispersion treatment methods.

DESCRIPTION OF EMBODIMENTS

First Embodiment to Fourth Embodiment

According to the present invention, since a carbon dioxide absorbent is added to or laminated on a material such as a label substrate, an adhesive layer or a backing paper, there have been realized a label in which the carbon dioxide absorbent can absorb carbon dioxide not only at the time of incinerating the label alone but also at the time of incinerating the label together with various objects of pasting used therewith to thereby contribute to reduction in carbon dioxide, and a carbon dioxide reduction method using this.

Figure 1:
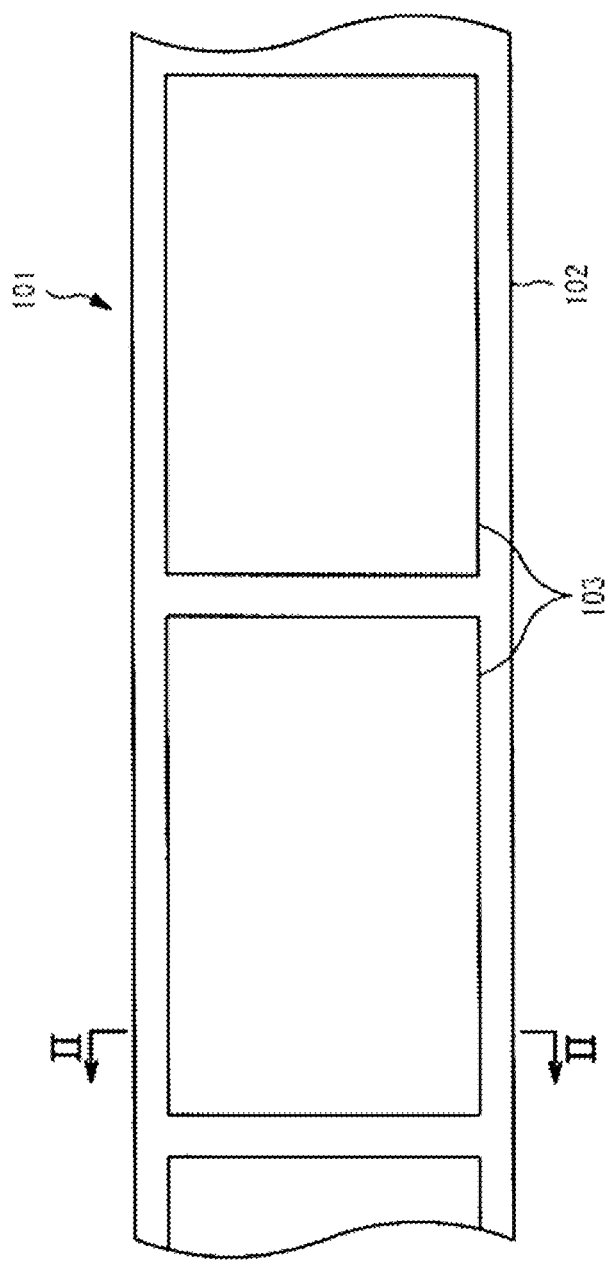
FIG. 1 is a plan view illustrating an example in which a label according to a first embodiment of the present invention is configured as a continuous label.
Figure 2:
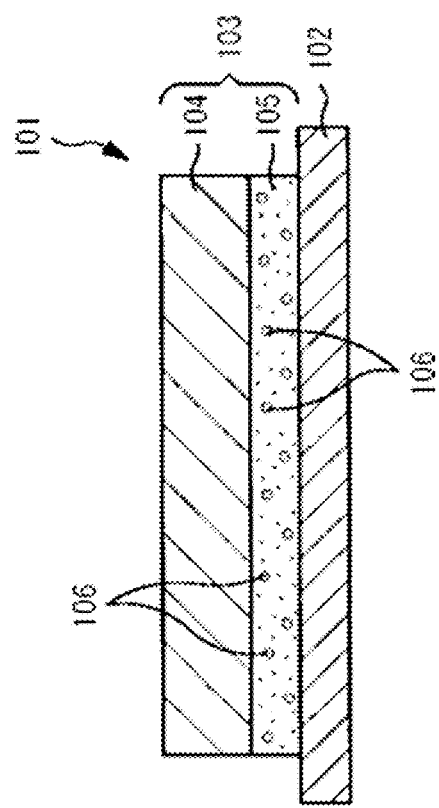
FIG. 2 is an enlarged cross-sectional view taken along line II-II of FIG. 1.

Then, a label 101 according to a first embodiment of the present invention and a carbon dioxide reduction method using this are described based on FIG. 1 to FIG. 3.

FIG. 1 is a plan view of a label configured as a continuous label, and FIG. 2 is an enlarged cross-sectional view taken along line II-II of FIG. 1.

The label 101 has a band-shaped backing paper 102, and a plurality of label strips 103 temporarily attached to the backing paper 102.

The backing paper 102 can be, for example, glassine paper. The backing paper 120 has a release agent layer on its surface and can temporarily attach each of the label strips 103 on the surface.

The label strip 103 has a label substrate 104 and an adhesive layer 105 applied to a rear surface of the label substrate 104.

The adhesive layer 105 is any type of adhesive layer, such as emulsion-type, solvent-type, or hot melt-type, to which a carbon dioxide absorbent 106 is added in a manufacturing step of the label 101.

It is desirable that the carbon dioxide absorbent 106 be constituted from, for example, an inorganic carbon dioxide absorbent, be particulate to the nanometer (nm=10-9 m) level, and be uniformly dispersed throughout the adhesive layer 105. For example, the particle size thereof can be, at least, less than 1 μm, more preferably about 10 to 100 nm.

As the carbon dioxide absorbent 106 particulate to nanometer in size, for example, a Nano vesicle carbon dioxide reduction additive produced by Acteiive R&D can be used.

The label 101 of such a configuration exerts a predetermined representational function, a security function, or the like, by releasing the label strip 103 after printing, if needed, from the backing paper 102 and pasting the label trip 103 to any object of pasting.

FIG. 3 is an explanatory view illustrating a case in which a label strip is used as, for example, a refuse label. Portion (1) in FIG. 3 is an explanatory view illustrating a state where refuse is put in a refuse bag and a label strip is pasted to the refuse bag, and Portion (2) in FIG. 3 is an explanatory view illustrating a state where the refuse along with the refuse bag is incinerated in an incinerator.

As illustrated in Portion (2) in FIG. 3, while the label strip 103 is incinerated together with a refuse bag 107 and refuse 108 in an incineration disposal by an incinerating burner 110 in an incinerator 109, carbon dioxide (CO2 gas) is generated due to burning by heating and is adsorbed to a carbon dioxide absorbent 106, and carbon dioxide generated from each of the refuse bag 107, the refuse 108 and the label strip 103 is absorbed by the portion of the carbon dioxide absorbent 106.

In particular, since the carbon dioxide absorbent 106 is particulate to nanometer in size (for example, about 10 to 100 nm) and also uniformly dispersed, it can effectively absorb carbon dioxide.

Also in the case where the label strip 103 is not used for the refuse bag 107, but pasted to a packaging box, a packaging bag (both being not illustrated) or the like for commercial goods as a price tag or a indicate tag for generally commercial goods, and incinerated and disposed of, the function of effectively absorbing carbon dioxide by the carbon dioxide absorbent 106 can be expected as in the above case.

In the present invention, the carbon dioxide absorbent 106 can be added to or laminated on any layer. That is, the carbon dioxide absorbent 106 may be added to at least any one of the label substrate 104, the adhesive layer 105 and the backing paper 102, or laminated on at least any one of these layers.

Figure 4:
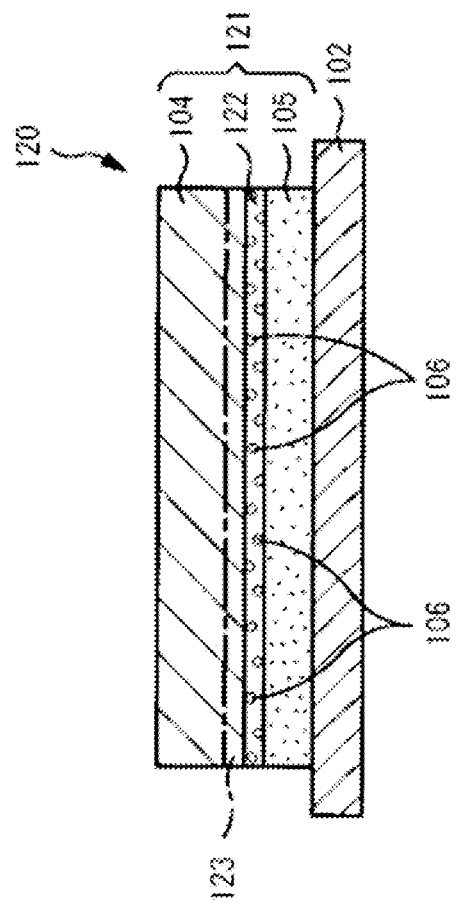
FIG. 4 is an enlarged cross-sectional view of a main part of a label according to a second embodiment of the present invention.

For example, FIG. 4 is an enlarged cross-sectional view of a main part of a label according to a second embodiment of the present invention. A label strip 121 of a label 120 has, in addition to the label substrate 104 and the adhesive layer 105, a carbon dioxide absorbent layer 122 laminated therebetween.

The carbon dioxide absorbent layer 122 is formed into a film in which the carbon dioxide absorbent 106 is uniformly dispersed, and a bonding adhesive layer 123 can also be provided between the layer 122 and the label substrate 104, if necessary.

The label 120 of such a configuration can also absorb carbon dioxide by incinerating it as in the case of the label 101 (FIG. 1, FIG. 2).

Figure 5:
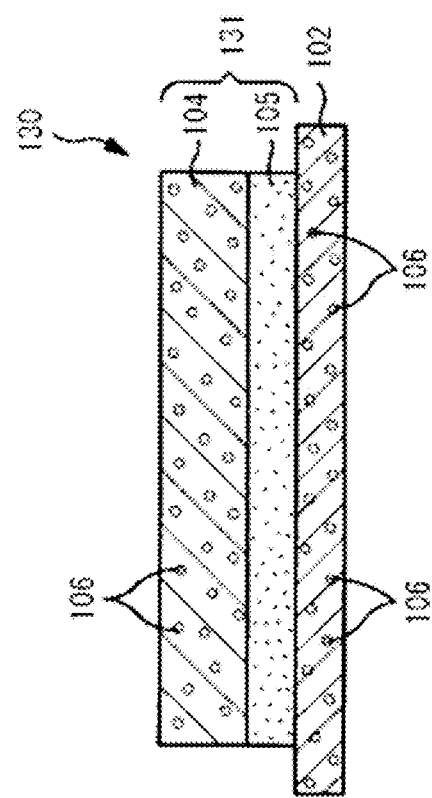
FIG. 5 is an enlarged cross-sectional view of a main part of a label according to a third embodiment of the present invention.

FIG. 5 is an enlarged cross-sectional view of a main part of a label according to a third embodiment of the present invention, a label 130 has the backing paper 102 to which the carbon dioxide absorbent 106 is added, and a label strip 131 thereof also has the label substrate 104 to which the carbon dioxide absorbent 106 is added.

The label 130 of such a configuration can also absorb carbon dioxide by incinerating it as in the cases of the label 101 (FIG. 1, FIG. 2) and the label 120 (FIG. 4).

Figure 6:
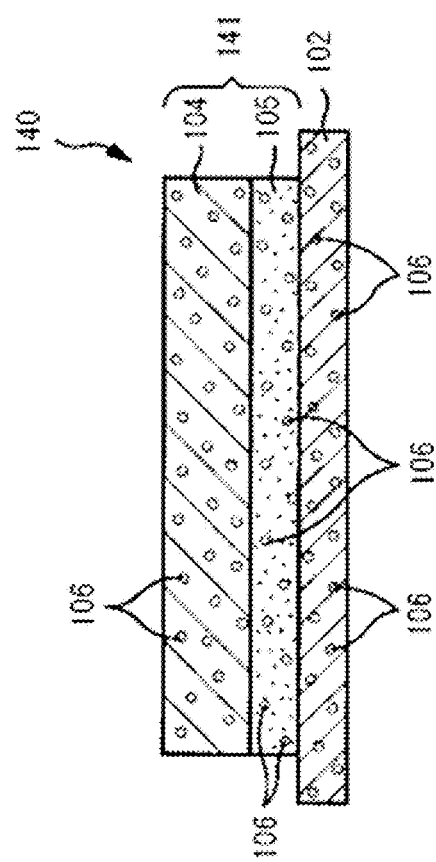
FIG. 6 is an enlarged cross-sectional view of a main part of a label according to a fourth embodiment of the present invention.

FIG. 6 is an enlarged cross-sectional view of a main part of a label according to a fourth embodiment of the present invention, a label 140 has the backing paper 102 to which the carbon dioxide absorbent 106 is added, and a label strip 141 of the label 140 also has the label substrate 104 and the adhesive layer 105 to which the carbon dioxide absorbent 106 is added.

Since the label 140 of such a configuration can also absorb carbon dioxide by incinerating it as in the cases of the label 101 (FIG. 1, FIG. 2), the label 120 (FIG. 4) and the label 130 (FIG. 5), and the carbon dioxide absorbent 106 is added to the entire laminate of the label 140, the label 140 can exert an effect of absorbing carbon dioxide at a maximum even if being used in any method.

It is to be noted that the present invention can be applied to a label or sticker having a composite multi-layered structure in which, in addition to the backing paper 102, the adhesive layer 103 and the label substrate 104, other intermediate layer or additional layer is incorporated as a substrate or an adhesive layer of a label.

FIG. 7 is a table of a carbon dioxide reduction amount, showing experimental results for confirming an effect of reducing carbon dioxide by a carbon dioxide absorbent (Nano vesicle carbon dioxide reduction additive produced by Acteiive R&D).

Four samples each including the carbon dioxide absorbent 106 added to an emulsion-type adhesive in a concentration of 0.00%, 0.01%, 0.05%, or 0.10% were prepared as experimental samples, a thermogravimetric measurement method for plastics according to JIS K 7120 was employed as a test method, the mass of each sample was 10 mg, inflow gas was air, the flow rate of the inflow gas was 50 mL/min, the rate of temperature rise was 10° C./min, and the temperature was raised to 400° C. to heat each sample for 100 minutes.

As shown in the table in FIG. 7, the sample to which the carbon dioxide absorbent 106 was added in a concentration of 0.01% achieved a carbon dioxide reduction amount of 33.68%, the sample to which it was added in a concentration of 0.05% achieved a carbon dioxide reduction amount of 51.99%, and the sample to which it was added in a concentration of 0.10% achieved a carbon dioxide reduction amount of 56.20%, as determined from each difference in residue amount as compared with the sample to which the carbon dioxide absorbent 106 was not added.

The amount of the carbon dioxide absorbent 106 added is adjusted depending on the type and condition of the label 101 used and various conditions of the incineration disposal thereof, so that the effect of reducing carbon dioxide can be ensured at a predetermined level.

Fifth Embodiment to Seventh Embodiment

According to the present invention, since a carbon dioxide absorbent is added to or laminated on a top layer material formed on a printing medium, the carbon dioxide absorbent can absorb carbon dioxide not only at the time of incinerating the top layer formation material (top layer material) alone but also at the time of incinerating the top layer formation material together with various printing medium or objects of attaching (objects of pasting) used therewith. Thus, a top layer material formed on a printing medium which can contribute to reduction in carbon dioxide and a carbon dioxide reduction method using the top layer material formed on a printing medium are realized.

Then, a top layer material formed on a printing medium according to a fifth embodiment of the present invention and a carbon dioxide reduction method using this are described based on FIG. 8 to FIG. 11.

Figure 8:
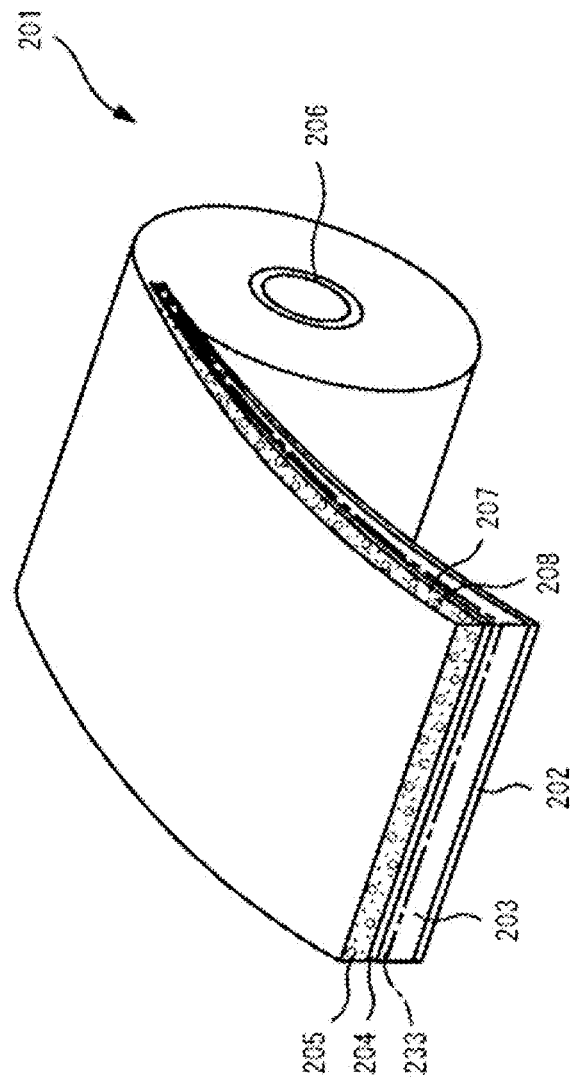
FIG. 8 is a perspective view of an ink ribbon (thermal transfer ink ribbon) configured as a top layer material formed on a printing medium according to a fifth embodiment of the present invention.

FIG. 8 is a perspective view of an ink ribbon (thermal transfer ink ribbon 1) configured as a top layer material formed on a printing medium, and a thermal transfer ink ribbon 201 has a back coat layer 202, a PET (polyethylene terephthalate) film layer 203, an anchor coat layer 204 and a thermal transfer ink layer (carbon ink layer 205), and has a type of usage so that it is wound around a ribbon core tube 206 in a roll shape.

In the state where the thermal transfer ink ribbon 201 is loaded in a thermal printer 216 (FIG. 10), the back coat layer 202 is positioned at the side in contact with a thermal head 226 (FIG. 10) and has a sliding function relative to the thermal head 226, thereby facilitating movement of the thermal transfer ink ribbon 201.

The PET film layer 203 is a main substrate of the thermal transfer ink ribbon 201 and is a ribbon film having a thickness of, for example, about 4.5 to 6 μm, and the back coat layer 202, the anchor coat layer 204 and the carbon ink layer 205 are laminated on the PET film layer 203.

The anchor coat layer 204 is laminated between the PET film layer 203 and the carbon ink layer 205, and ensures the adhesiveness therebetween.

Figure 10:
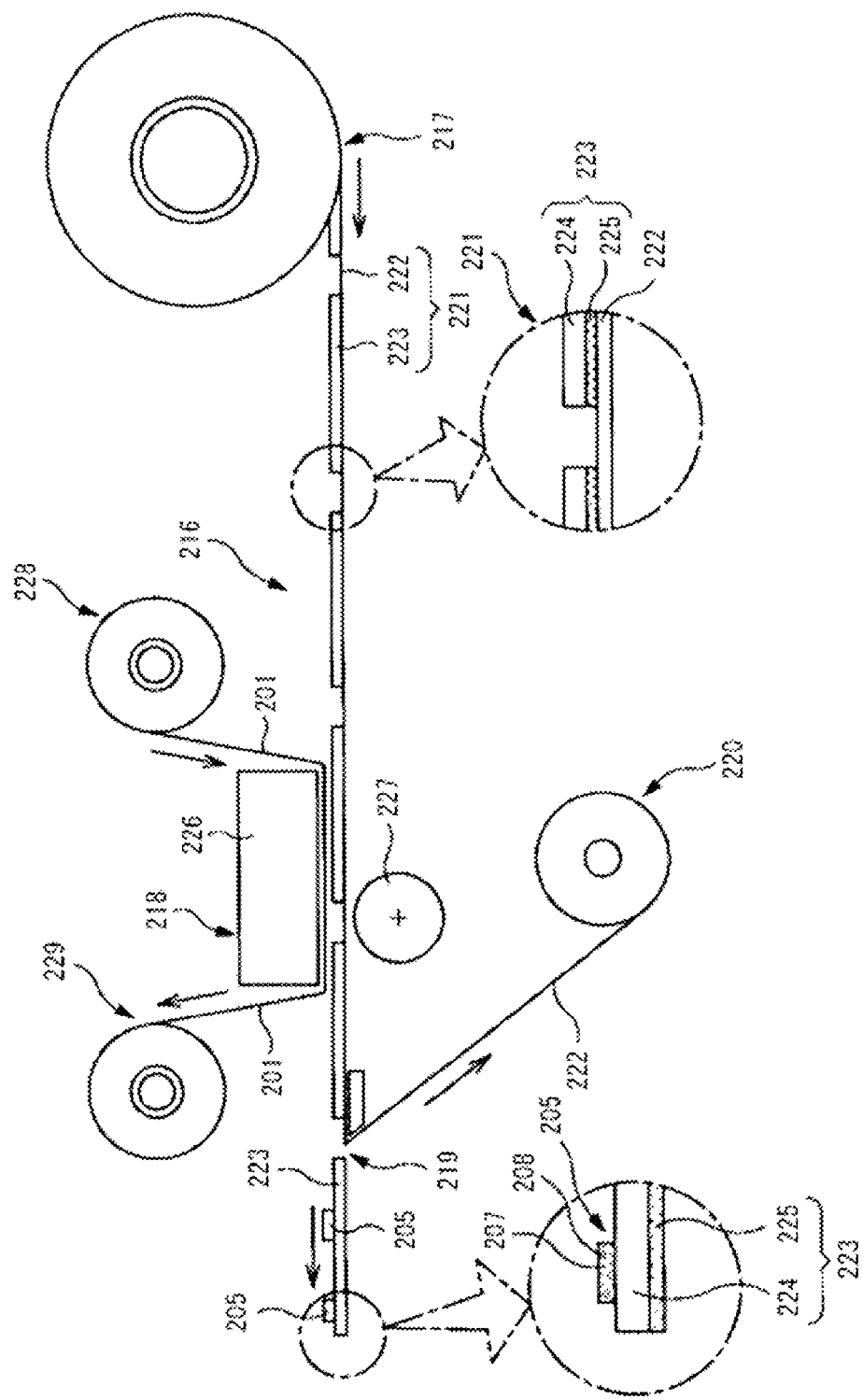
FIG. 10 is a schematic side view of a thermal printer in which the thermal transfer ink ribbon is loaded for printing.

The carbon ink layer 205 serves to transfer a required section to printing medium (for example, a label strip 223 of a continuous label 221, in FIG. 10) by heating from the thermal head, and a carbon dioxide absorbent 208 is added thereto together with a thermal transfer ink (carbon ink 207) and a required mixing agent (not illustrated).

The carbon dioxide absorbent 208 is added in a manufacturing step of the thermal transfer ink ribbon 201 (see FIG. 9, described below).

It is desirable that the carbon dioxide absorbent 208 be made from, for example, an inorganic carbon dioxide absorbent, be particulate to nanometer in size (nm=10-9 m), and be uniformly dispersed throughout the carbon ink layer 205. For example, the particle size can be, at least, less than 1 μm, more preferably about 10 to 100 nm.

As the carbon dioxide absorbent 208 particulate to nanometer in size, for example, a Nano vesicle carbon dioxide reduction additive produced by Acteiive R&D can be used.

Figure 9:
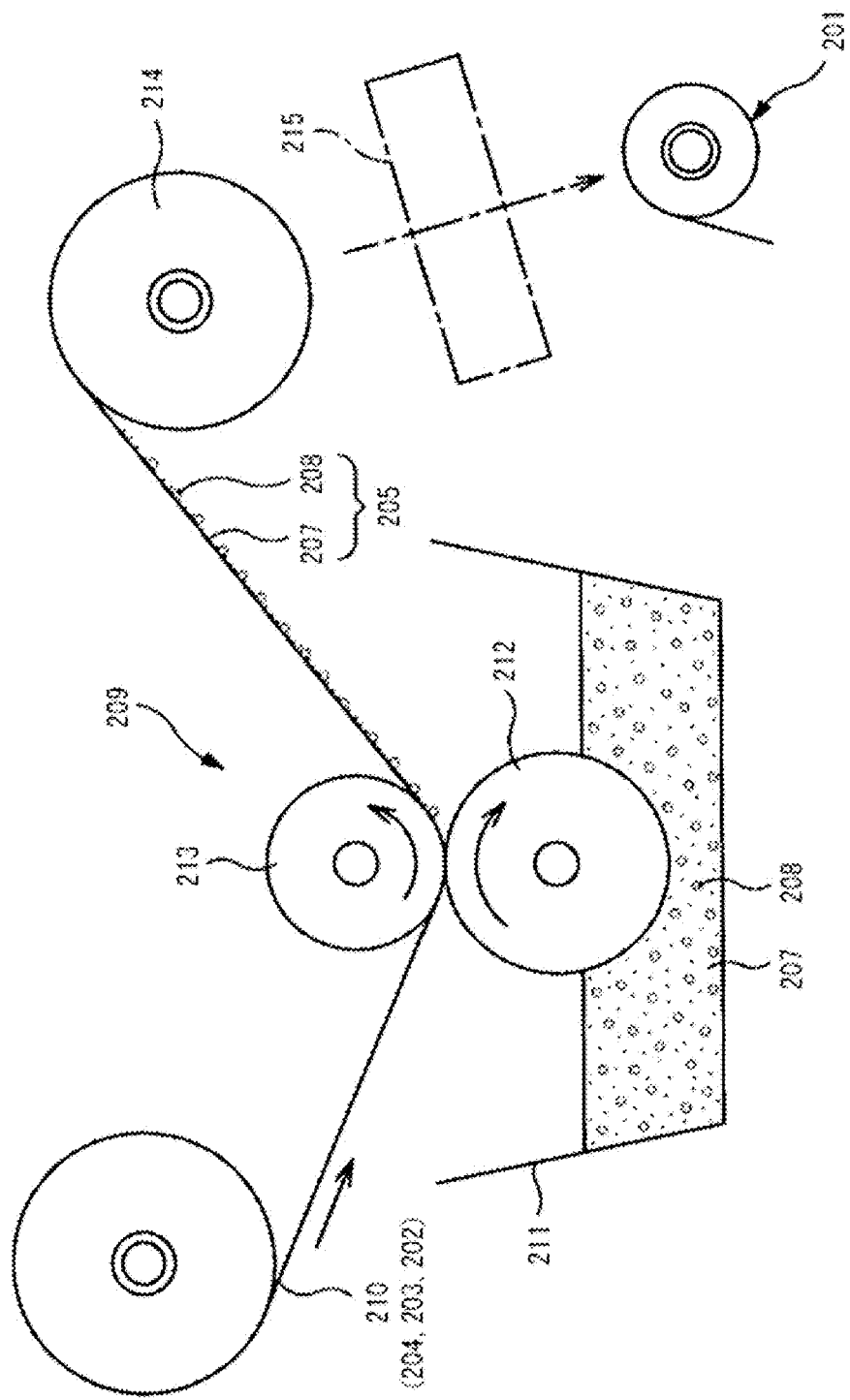
FIG. 9 is a schematic side view of a manufacturing apparatus of the thermal transfer ink ribbon.

FIG. 9 is a schematic side view of a manufacturing apparatus 209 of the thermal transfer ink ribbon 201. A ribbon film substrate 210 having such a configuration that the back coat layer 202 and the anchor coat layer 204 are laminated on the PET film layer 203 in advance in a laminating step is prepared, and in the manufacturing apparatus 209, the carbon ink 207 is prepared in an ink vessel 211 and the carbon dioxide absorbent 208 particulate is added to the carbon ink 207 itself.

The carbon ink 207 including the carbon dioxide absorbent 208 is applied to the ribbon film substrate 210 in a determined thickness (for example, 1 to 1.5 μm) at the place between a gravure printing roll 212 and a backup roll 213, and then wound so as to form a large winding roll 214. The large winding roll 214 is allowed to pass through a small winding device 215 to obtain, as a final product, a roll-shaped thermal transfer ink ribbon 201 having a smaller diameter and being handleable.

FIG. 10 is a schematic side view of a thermal printer 216 in which the thermal transfer ink ribbon 201 of such a configuration is loaded for printing, and the thermal printer 216 has a label-feeding portion 217, a label-printing portion 218, a backing paper-turning portion 219 and a backing paper-winding up portion 220.

The label-feeding portion 217 holds printing medium (for example, continuous label 221) in a roll shape, and allows the continuous label 221 to veer out in the direction of the label-printing portion 218 in a band shape.

The continuous label 221 has a band-shaped backing paper 222 and a plurality of label strips 223 temporarily attached to the band-shaped backing paper 222.

The label strip 223 has a label substrate 224 and an adhesive layer 225 on the rear surface of the label substrate 224, and the portion of the adhesive layer 225 is temporarily attached to the band-shaped backing paper 222.

The label-printing portion 218 has the thermal head 226, a platen roller 227, and a ribbon-feeding portion 228 and a ribbon-winding up portion 229 of the thermal transfer ink ribbon 201.

The thermal transfer ink ribbon 201 and the continuous label 221 are conveyed while being sandwiched between the thermal head 226 and the platen roller 227, and information having predetermined matter (variable information being matter if necessary printed by the thermal printer 216 in each case) is printed on the continuous label 221 (label strip 223) by thermal-transfer with heat from the thermal head 226.

As show in FIG. 10 illustrating a part of the released label strip 223 in an enlarged manner, the carbon ink 207 and the carbon dioxide absorbent 208 of the carbon ink layer 205 are transferred to an upper layer (top layer) of the label strip 223, and the variable information is indicated by means of the carbon ink 207 and the carbon dioxide absorbent 208.

The thermal transfer ink ribbon 201 loaded in the thermal printer 216 and used as described above is wound up to the ribbon-winding up portion 229 while the printing matter on the label-printing portion 218 being kept on the carbon ink layer 205 in a reverse state, and is generally collected, incinerated and disposed of for confidentiality reasons.

Figure 11:
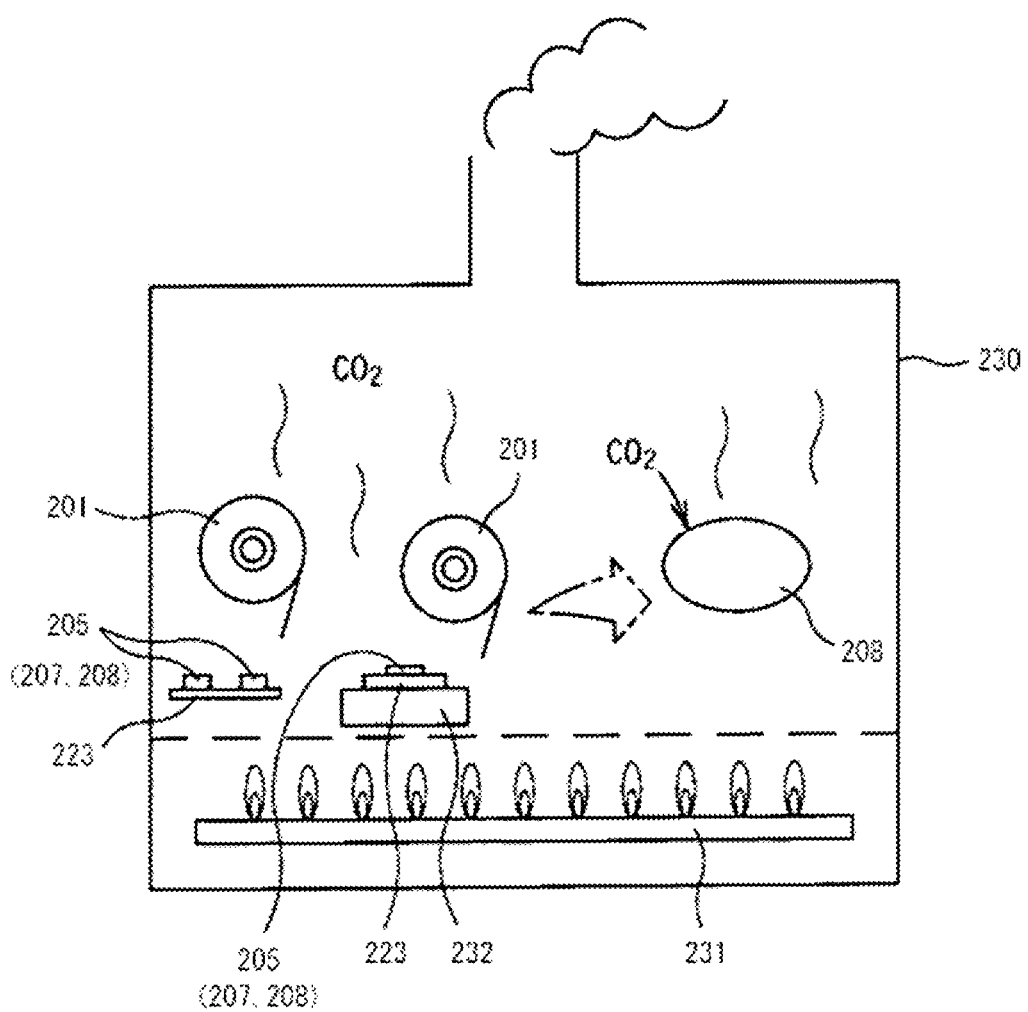
FIG. 11 is an explanatory view illustrating a state where the used thermal transfer ink ribbon is incinerated in an incinerator.

That is, FIG. 11 is an explanatory view illustrating a state where the used thermal transfer ink ribbon 1 is incinerated in an incinerator 230.

As illustrated therein, the thermal transfer ink ribbon 201 is incinerated in an incineration disposal with an incinerating burner 231 in the incinerator 230.

Herein, the label strip 223 and any object of pasting or object of attachment 232 to the label strip 223 are also incinerated together with the thermal transfer ink ribbon 201 depending on a disposal system, in many cases.

Then, carbon dioxide (CO2 gas) is generated due to burning by heating in the incinerator 230, carbon dioxide is absorbed to the carbon dioxide absorbent 208, and carbon dioxide generated in each of the thermal transfer ink ribbon 201 and the label strip 223 as well as the object of pasting or object of attachment 232 is absorbed in the portion of the carbon dioxide absorbent 208.

In particular, since the carbon dioxide absorbent 208 is particulate to nanometer in size (for example, about 10 to 100 nm) and uniformly dispersed, it can effectively absorb carbon dioxide.

Also in the case where the label strip 223 is utilized as a price tag or a indicate tag for generally commercial goods, pasted to a packaging box or a packaging bag for commercial goods as the object of pasting or object of attachment 232, and incinerated and disposed of separately from the thermal transfer ink ribbon 201, the carbon ink layer 205 by printing forms the top layer of the label strip 223 itself, as described above, and therefore the function of effectively absorbing carbon dioxide by the carbon dioxide absorbent 208 added to the carbon ink layer 205 can be expected.

In the present invention, the carbon dioxide absorbent 208 can be added to or laminated on any layer. That is, the carbon dioxide absorbent 208 may be added to at least any one of the back coat layer 202, the PET film layer 203 and the anchor coat layer 204.

For example, even if the carbon dioxide absorbent 208 is not added to the carbon ink layer 205, a function of absorbing carbon dioxide by the carbon dioxide absorbent 208 can be expected at the time of the incineration disposal of the thermal transfer ink ribbon 201 as long as the carbon dioxide absorbent 208 is added to any of the above layers.

Furthermore, in the present invention, a carbon dioxide absorbent layer can be laminated on any layer of the thermal transfer ink ribbon 201.

For example, as illustrated in a dashed line in FIG. 8, a carbon dioxide absorbent layer 233 can be laminated between the PET film layer 203 and the anchor coat layer 204.

The carbon dioxide absorbent layer 233 is formed into a film in which the carbon dioxide absorbent 208 is uniformly dispersed, and a function of absorbing carbon dioxide by the carbon dioxide absorbent 208 of the carbon dioxide absorbent layer 233 can be expected at the time of the incineration disposal of the thermal transfer ink ribbon 201.

In the present invention, any top layer formation material can be employed as long as it can form a printing medium top layer.

Figure 12:
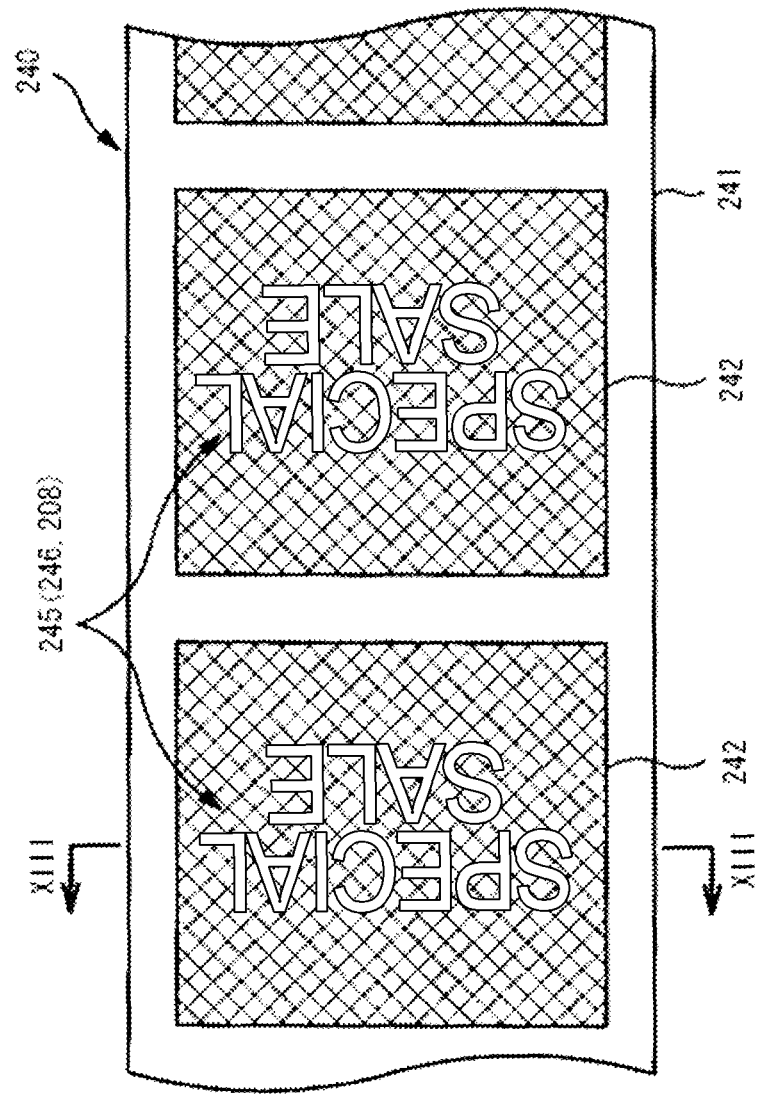
FIG. 12 is a plan view of an advertising label in which various printing inks are employed as a top layer formation material according to a sixth embodiment of the present invention.
Figure 13:
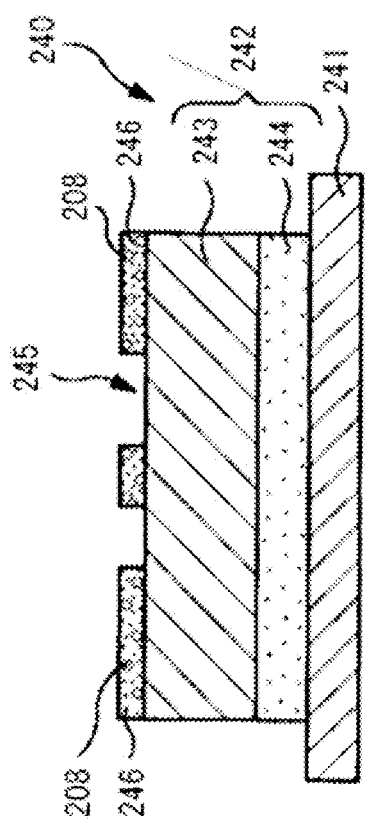
FIG. 13 is a cross-sectional view taken along line XIII-XIII of FIG. 12.

For example, FIG. 12 is a plan view of an advertising label in which various printing inks are employed as a top layer formation material according to a sixth embodiment of the present invention, FIG. 13 is a cross-sectional view taken along line XIII-XIII of FIG. 12, and an advertising label 240 (printing medium) has a band-shaped backing paper 241 and a plurality of advertising label strips 242 temporarily attached to the surface of the backing paper 241.

The advertising label strips 242 each have an adhesive layer 244 on the rear surface of a label substrate 243 thereof, and have an advertising information 245 (for example, constant information such as "special sale") printed on the front surface thereof in advance.

The advertising information is printed by a predetermined printing ink 246 (top layer formation material) to which the carbon dioxide absorbent 208 is added.

Figure 14:
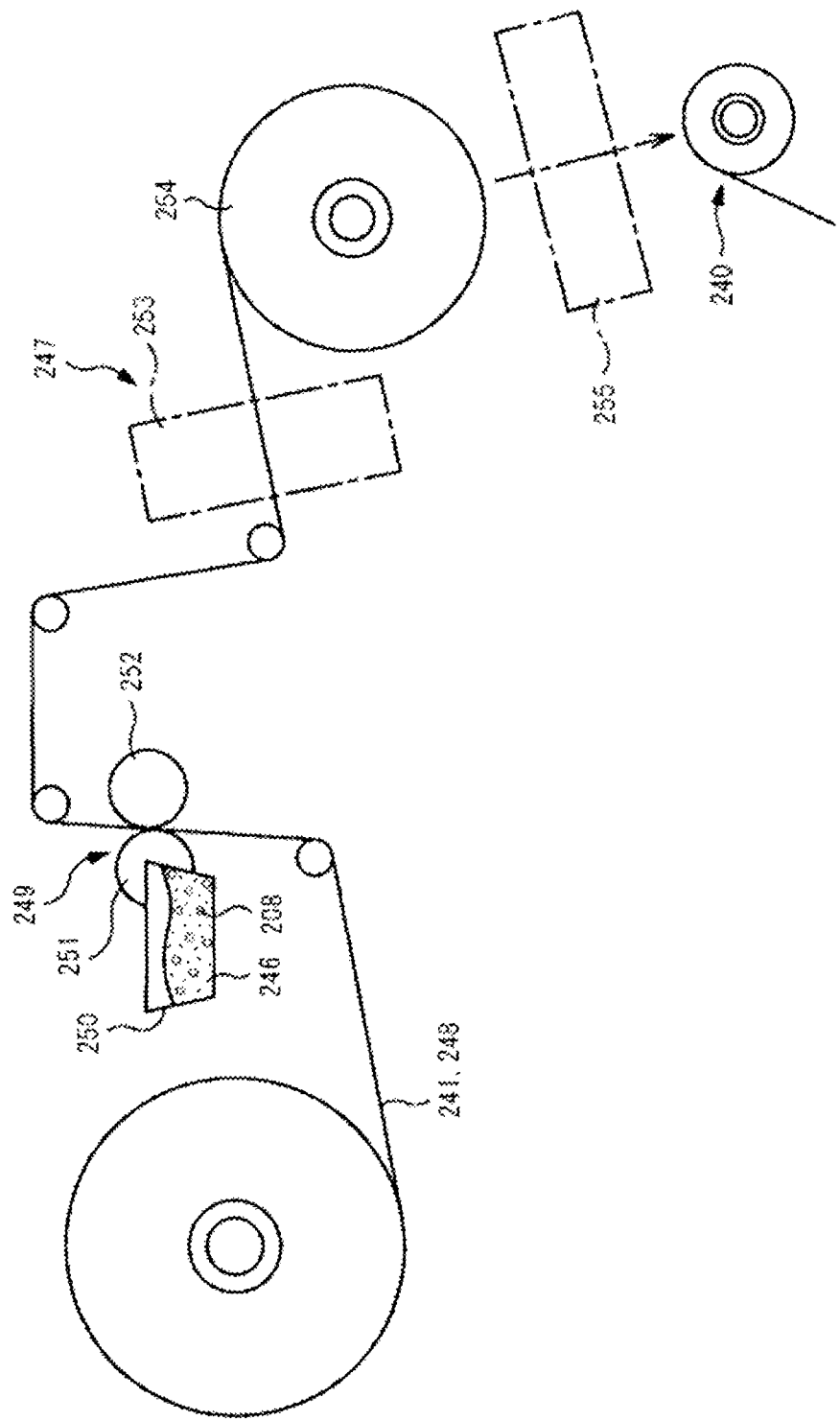
FIG. 14 is a schematic side view of a manufacturing apparatus of the advertising label.

FIG. 14 is a schematic side view of a manufacturing apparatus of the advertising label. In a manufacturing apparatus 247, the backing paper 241 and a label substrate 248 of the advertising label strip 242 veer out in a band shape and the advertising information 245 is printed on a printing portion 249.

That is, the printing ink 246 and the carbon dioxide absorbent 208 added thereto are prepared in an ink vessel 250 of the printing portion 249, and the backing paper 241 and the label substrate 248 are allowed to pass between a printing cylinder 251 and an impression cylinder 252 to print the advertising information 245 on the label substrate 248. The advertising information 245 is preferably full-size printed or reverse printed.

It is to be noted that any method such as silk screen printing, relief printing, flexo printing, offset printing, gravure printing or pad printing method can be employed as a printing method.

Then, an unnecessary part of the label substrate 248 is removed by a debris removal unit 253 to form the label strip 242 and then, the label substrate 248 is formed into a large winding roll 254. Then, through a small winding device 255, a roll-shaped advertising label 240 having a smaller diameter and being easy to handle is obtained as a final product.

Also in the case of the advertising label 240 of such a configuration, when it is incinerated after use together with the object of pasting or object of attachment 232 such as, for example, commercial goods (FIG. 11), the carbon dioxide absorbent 208 in the advertising information 245 can absorb carbon dioxide as in the case of the thermal transfer ink ribbon 201.

Also in the case of such an advertising label 240, the carbon dioxide absorbent 208 can be added to or laminated on any layer of the label as in the case of the thermal transfer ink ribbon 201 (FIG. 8).

Figure 15:
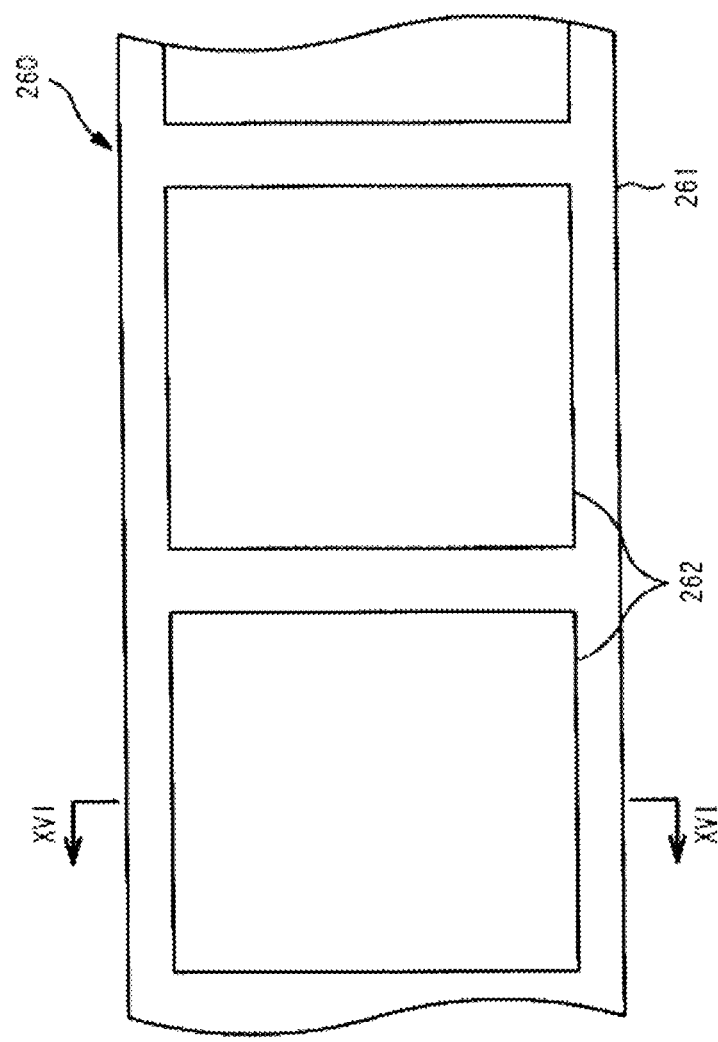
FIG. 15 is a plan view of an identifying label in which a film for surface coating is employed as a top layer formation material according to a seventh embodiment of the present invention.
Figure 16:
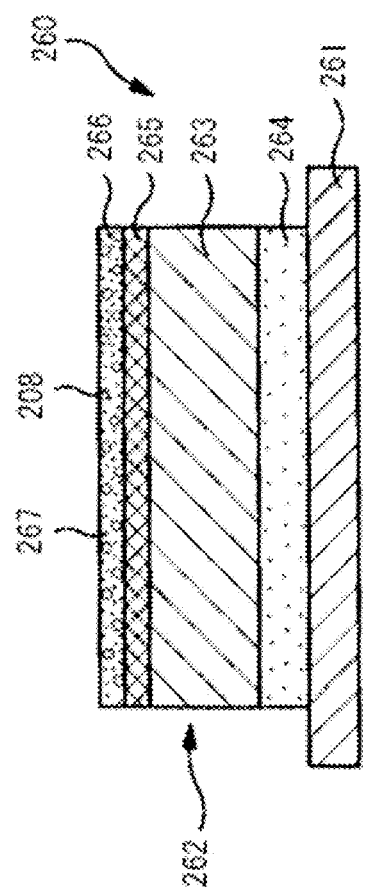
FIG. 16 is a cross-sectional view taken along line XVI-XVI of FIG. 15.

FIG. 15 is a plan view of an identifying label in which a film for surface coating is employed as a top layer formation material according to a seventh embodiment of the present invention, FIG. 16 is a cross-sectional view taken along line XVI-XVI of FIG. 15, and an identifying label 260 (printing medium) has a band-shaped backing paper 261 and a plurality of identifying label strips 262 temporarily attached to the surface of the backing paper 261.

The identifying label strips 262 each have an adhesive layer 264 on the rear surface of the label substrate 263 thereof, and have an identifying printing layer 265 and a surface coating layer 266 on the front surface of the label substrate 263.

The identifying printing layer 265 is printed on the entire surface of the identifying label strips 262 so as to, for example, color-code with various colors, thereby enabling the respective identifying label strips 262 pasted to various articles to identify the respective articles.

The surface coating layer 266 is formed into a transparent film in which the carbon dioxide absorbent 208 is uniformly dispersed, and has the carbon dioxide absorbent 208 together with a coating agent 267 having a predetermined function such as weather resistance.

The identifying label 260 of such a configuration is also pasted to the required object of pasting or object of attachment 232 so that the identifying label 260 can achieve its representational function or an identifying function. When the identifying label 260 is incinerated together with the object of pasting or object of attachment 232 after use, the carbon dioxide absorbent 208 of the surface coating layer 266 can absorb carbon dioxide.

Also in the case of such an identifying label 260, the carbon dioxide absorbent 208 can be added to or laminated on any layer of the label as in the cases of the thermal transfer ink ribbon 201 (FIG. 8) and the advertising label 240 (FIG. 12).

FIG. 7 is a table of a carbon dioxide reduction amount, showing experimental results for confirming an effect of reducing carbon dioxide by a carbon dioxide absorbent (Nano vesicle carbon dioxide reduction additive produced by Acteiive R&D).

Four samples each including the carbon dioxide absorbent 8 added to an emulsion-type adhesive in a concentration of 0.00%, 0.01%, 0.05%, or 0.10% were prepared as experimental samples, a thermogravimetric measurement method for plastics according to JIS K 7120 was employed as a test method, the mass of each sample was 10 mg, inflow gas was air, the flow rate of the inflow gas was 50 mL/min, the rate of temperature rise was 10° C./min, and the temperature was raised to 400° C. to heat each sample for 100 minutes.

As shown in the table in FIG. 7, the sample to which the carbon dioxide absorbent 208 was added in a concentration of 0.01% achieved a carbon dioxide reduction amount of 33.68%, the sample to which it was added in a concentration of 0.05% achieved a carbon dioxide reduction amount of 51.99%, and the sample to which it was added in a concentration of 0.10% achieved a carbon dioxide reduction amount of 56.20%, as determined from each difference in residue amount as compared with the sample to which the carbon dioxide absorbent 208 was not added.

The amount of the carbon dioxide absorbent 208 added is adjusted depending on the types and conditions of usage of the thermal transfer ink ribbon 201, the advertising label 240 and the identifying label 260, and various conditions of the incineration disposal thereof so that the effect of reducing carbon dioxide can be ensured at a predetermined level.

That is, in the top layer material formed on a printing medium and the carbon dioxide reduction method using this according to the present invention, the carbon dioxide absorbent is added to or laminated on various top layer formation materials that are used for indicating information such as variable information and constant information by using various printing medium, and also used for a coating treatment for enhancing decorative properties, functionalities and performances of the printing medium, and it can absorb carbon dioxide at the time of incinerating the top layer formation materials alone or the top layer formation materials together with the printing medium and various objects of pasting or objects of attaching.

Eighth Embodiment to Eleventh Embodiment

According to the present invention, since a carbon dioxide absorbent is added to or laminated on an information-bearing medium, not only at the time of incinerating the information-bearing medium alone but also at the time of incinerating the information-bearing medium together with various objects of attaching (objects of pasting) used therewith, the carbon dioxide absorbent can absorb carbon dioxide. Thus, information-bearing medium which contribute to reduction in carbon dioxide, and a carbon dioxide reduction method using this are realized.

Figure 17:
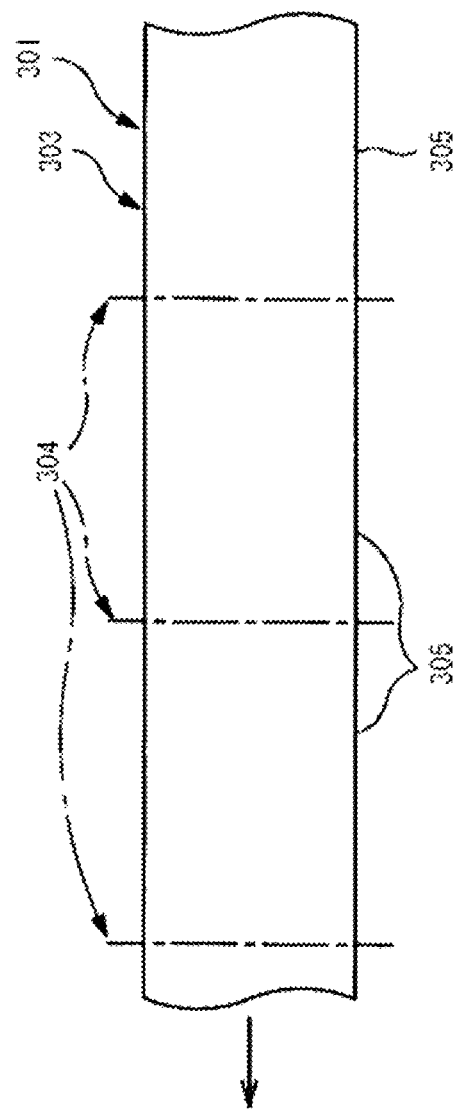
FIG. 17 is a plan view of a tag as an information-bearing medium according to an eighth embodiment of the present invention.
Figure 18:
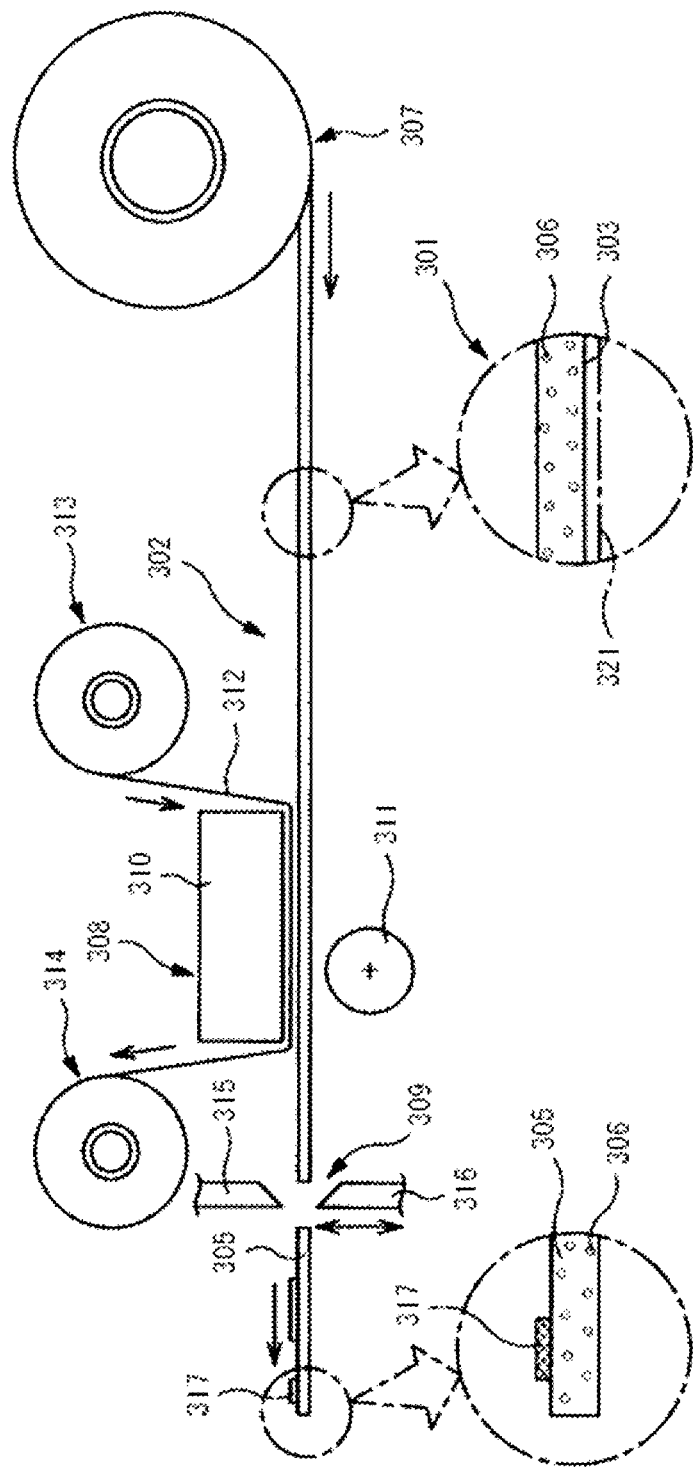
FIG. 18 is a schematic side view of a printer (thermal printer) in which a tag is loaded for printing.
Figure 19:
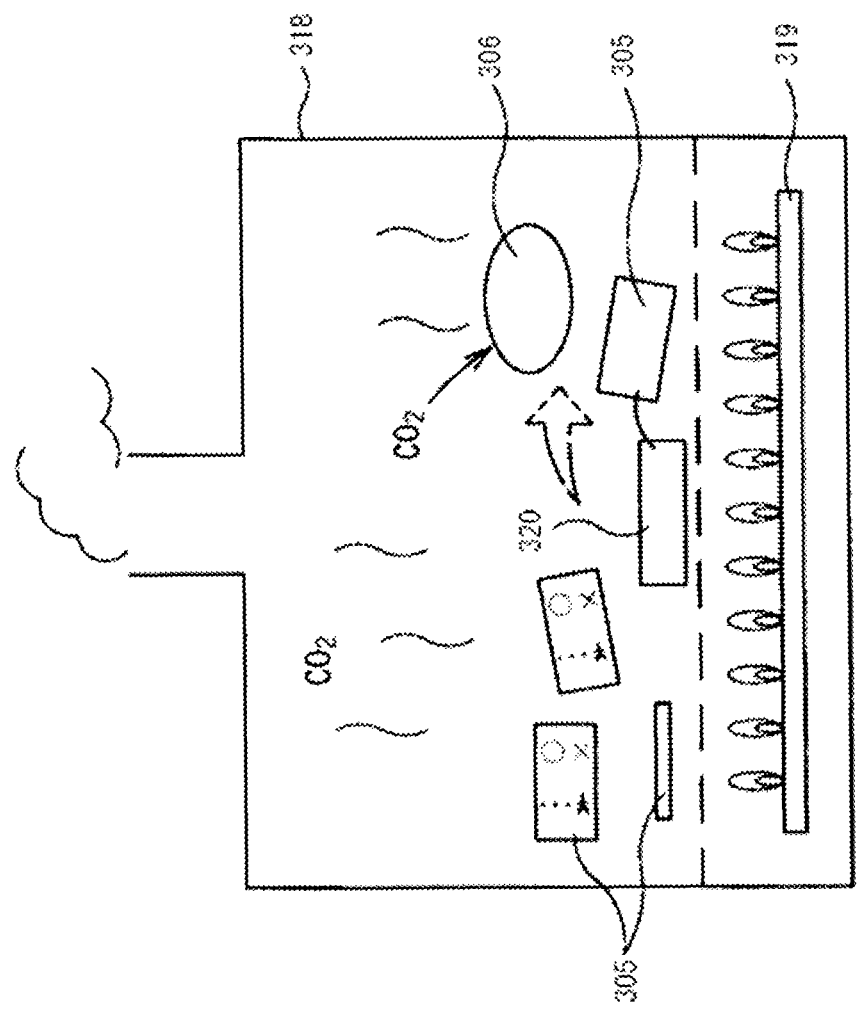
FIG. 19 is an explanatory view illustrating a state where a used tag (tag strip) is incinerated in an incinerator.

Then, an information-bearing medium according to an eighth embodiment of the present invention and a carbon dioxide reduction method using this are described based on FIG. 17 to FIG. 19.

FIG. 17 is a plan view of a tag as an information-bearing medium, and FIG. 18 is a schematic side view of a printer (thermal printer) to which a tag is loaded for printing.

A tag 301 has a medium body 303 formed from a paper material or a plastic material in a band shape, and is cut along a cutting line 304 at a predetermined pitch to obtain one tag strip 305.

The tag 301 has a medium body 303 to which a carbon dioxide absorbent 306 is added, as shown particularly in FIG. 18 illustrating a partial cross-sectional view thereof in an enlarged manner.

The carbon dioxide absorbent 306 is added by any way depending on a material of the tag 301 in a manufacturing step of the tag 301.

It is desirable that the carbon dioxide absorbent 306 be made from, for example, an inorganic carbon dioxide absorbent, be particulate to the nanometer (nm=10-9 m) level, and be uniformly dispersed throughout the medium body 303. For example, the particle size of the carbon dioxide absorbent 306 can be, at least, less than 1 μm, more preferably about 10 to 100 nm.

As the carbon dioxide absorbent 306 particulate to nanometer in size, for example, a Nano vesicle carbon dioxide reduction additive produced by Acteiive R&D can be used.

As illustrated in FIG. 18, a thermal printer 302 has a tag-feeding portion 307, a tag-printing portion 308 and a tag-cutting portion 309.

The tag-feeding portion 307 holds the tag 301 in a roll shape, and allows the tag 301 to veer out in the direction of the tag-printing portion 308 in a band shape.

The tag-printing portion 308 has a thermal head 310 and a platen roller 311, as well as a ribbon-feeding portion 313 and a ribbon-winding up portion 314 of a thermal transfer ink ribbon 312.

The tag 301 is conveyed while being sandwiched between the thermal head 310 and the platen roller 311, and information having predetermined matter (variable information being matter if necessary printed by the thermal printer 302 in each case) is thermal-transferred on the tag 301 (tag strip 305) by heat from the thermal head 310 and printed thereon.

Herein, it is also possible to print by heat from the thermal head 310 without using the thermal transfer ink ribbon 312 by laminating a heat-sensitive color-forming layer (not illustrated) on the surface of the tag body 303 to constitute a thermal paper. In this configuration, the carbon dioxide absorbent 306 can also be added to the heat-sensitive color-forming layer.

The carbon dioxide absorbent can be added to the heat-sensitive color-forming layer to thereby make a substrate with no starch.

Specifically, the carbon dioxide absorbent can be added to a dye, a developer, a stabilizer or the like constituting the heat-sensitive color-forming layer.

The tag-cutting portion 309 has a stationary knife 315 and a movable knife 316, and cuts the tag 301 at the portion of the cutting line 304 at a predetermined pitch to obtain one tag strip 305.

As shown in FIG. 18 which illustrates a part of the cut tag strip 305 in an enlarged manner, the carbon ink of the thermal transfer ink ribbon 312 is transferred on the surface of the tag strip 305 so that the carbon ink of the thermal transfer ink ribbon 312 indicates the variable information 317.

In the case where the tag 301 (tag strip 305) loaded in the thermal printer 302, printed and cut as described above is utilized as a price tag, the tag 301 is attached to commercial goods (object of attachment, not illustrated) such as clothing items so as to indicate necessary information, and removed from commercial goods when purchase of commercial goods so as to be used for managing the necessary information or to be broken off. In either case, the tag 301 is generally incinerated and disposed of.

Of course, in the case where the tag 301 is used as a ticket such as a general admission ticket, information necessary for such a ticket is printed on the tag 301.

That is, FIG. 19 is an explanatory view illustrating a state where a used tag (tag strip) is incinerated in an incinerator.

As illustrated, the tag strip 305 is incinerated in an incineration disposal with an incinerating burner 319 in an incinerator 318.

Herein, the tag strip 305 and any object of pasting or object of attachment 320 pasted to the tag strip 305 are also incinerated together with the tag strip 305 depending on a disposal system, in some cases.

Then, carbon dioxide (CO2 gas) is generated due to burning by heating in the incinerator 318, carbon dioxide is absorbed to the carbon dioxide absorbent 306, and carbon dioxide generated in each of the tag strip 305 and also the object of pasting or object of attachment 320 is absorbed in the portion of the carbon dioxide absorbent 306.

In particular, since the carbon dioxide absorbent 306 is particulate to nanometer in size (for example, about 10 to 100 nm) and uniformly dispersed, it can effectively absorb carbon dioxide.

In the present invention, in the case where the tag 301 has an at least two or more-layer structure having a plurality of layers, the carbon dioxide absorbent 306 can be added to or laminated on any layer.

As illustrated in an enlarged part of FIG. 18 by a dashed line, of course, a carbon dioxide absorbent layer 321 can be laminated on the rear surface of the medium body 303.

The carbon dioxide absorbent layer 321 is formed into a film in which the carbon dioxide absorbent 306 is uniformly dispersed. In this case, a function of absorbing carbon dioxide by the carbon dioxide absorbent 306 of the carbon dioxide absorbent layer 321 can also be expected at the time of the incineration disposal of the tag 301 (tag strip 305).

Figure 20:
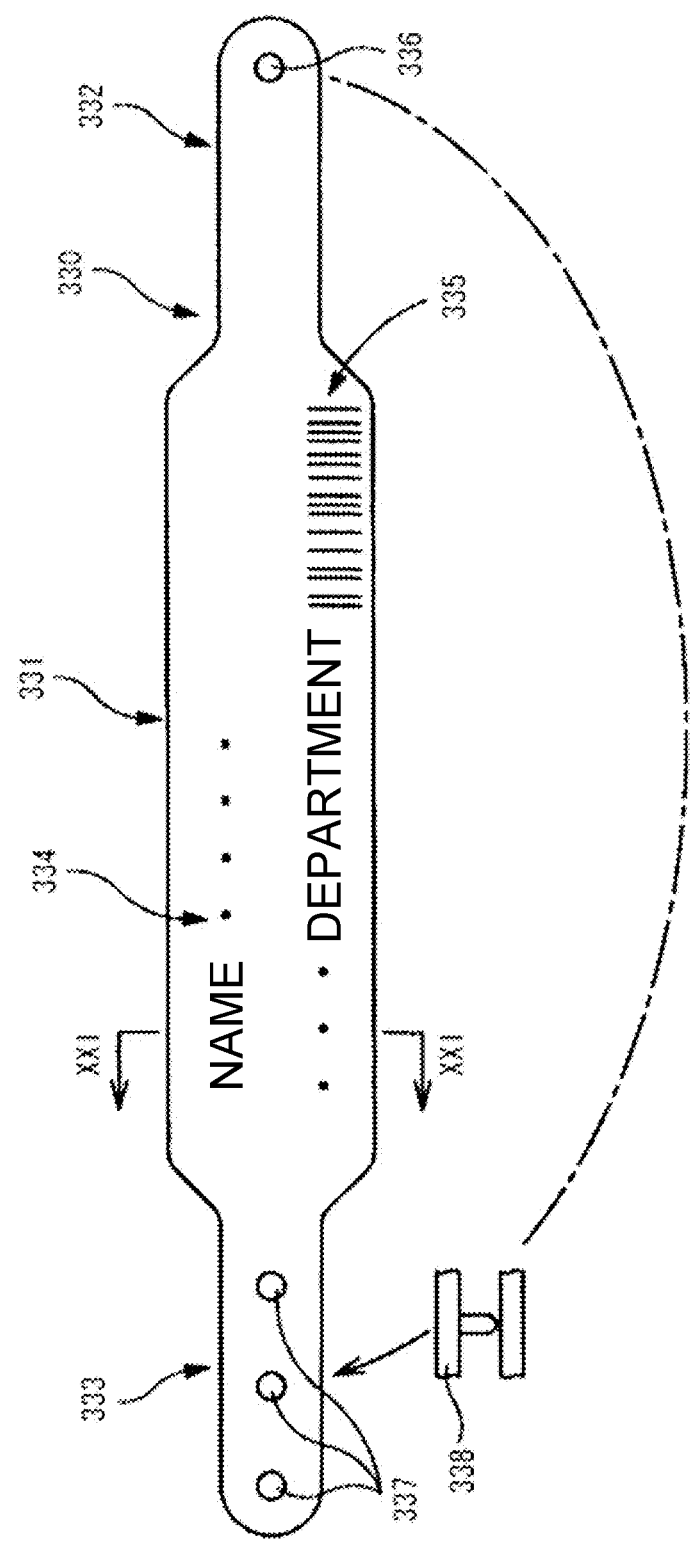
FIG. 20 is a plan view of a wristband as an information-bearing medium according to a ninth embodiment of the present invention.
Figure 21:
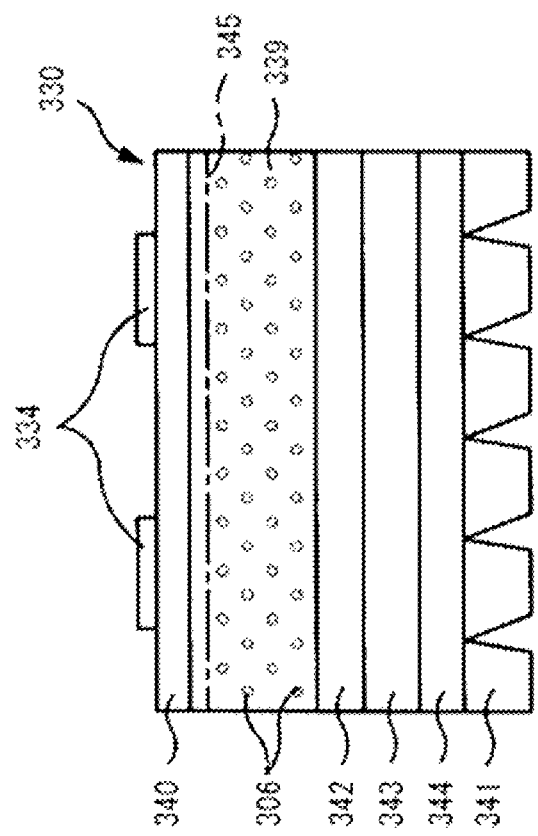
FIG. 21 is an enlarged cross-sectional view taken along line XXI-XXI of FIG. 20.

FIG. 20 is a plan view of a wristband as an information-bearing medium according to a ninth embodiment of the present invention, FIG. 21 is an enlarged cross-sectional view taken along line XXI-XXI of FIG. 20. The wristband 330 is attached to a wrist or an ankle of a patient in order to identify the patient in a hospital and the like, and has a center indicate region 331 and a left-and-right pair of a first attachment region 332 and a second attachment region 333.

The name and therapy department of a patient, and other necessary visible information 334 and bar code information 335 are printed on the center indicate region 331.

The first attachment region 332 has a single attachment hole 336 formed thereon, the second attachment region 333 has a plurality of selection holes 337 formed thereon, and a attachment tool 338 is attached to the selected selection hole 337 and the attachment hole 336, thereby enabling the wristband 330 to be attached to a patient in a ring shape having a predetermined diameter.

In particular, as illustrated in FIG. 21, the wristband 330 has a base substrate 339, a coat layer 340 on the surface thereof, an embossed layer 341 on the rear surface in contact with the skin of a patient, and intermediate layers (first intermediate layer 342, second intermediate layer 343 and third intermediate layer 344).

The carbon dioxide absorbent 306 is added to in particular in a manufacturing step of the base substrate 339.

Of course, the carbon dioxide absorbent 306 may be added to at least any one of the respective layers (base substrate 339, coat layer 340, embossed layer 341, first intermediate layer 342, second intermediate layer 343 and third intermediate layer 344), and a carbon dioxide absorbent layer 345 that is the same as the carbon dioxide absorbent layer 321 (FIG. 18) can also be laminated thereon, as illustrated in FIG. 21 by a dashed line.

Also in the case of the wristband 330 of such a configuration, when it is incinerated and disposed of after use, the carbon dioxide absorbent 306 can effectively absorb carbon dioxide to thereby contribute to reduction in carbon dioxide.

Figure 22:
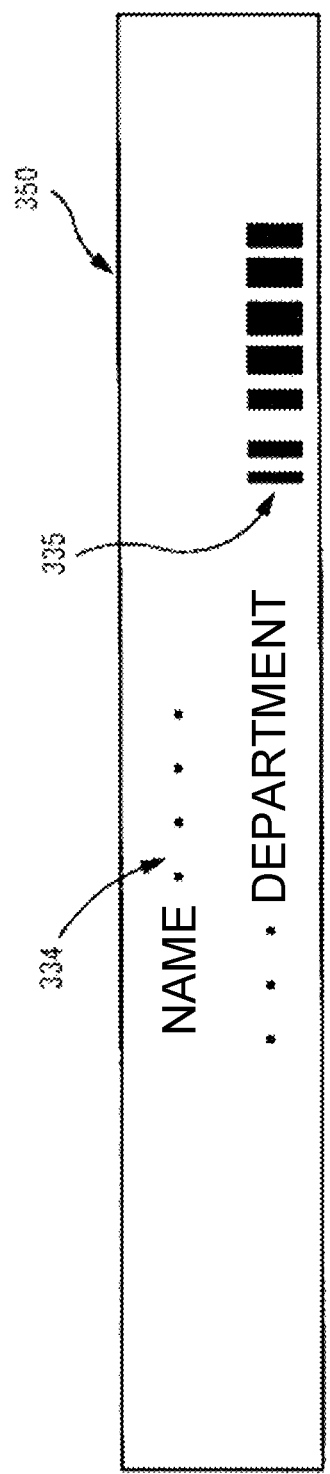
FIG. 22 is a plan view of a wristband as an information-bearing medium according to a tenth embodiment of the present invention.
Figure 23:
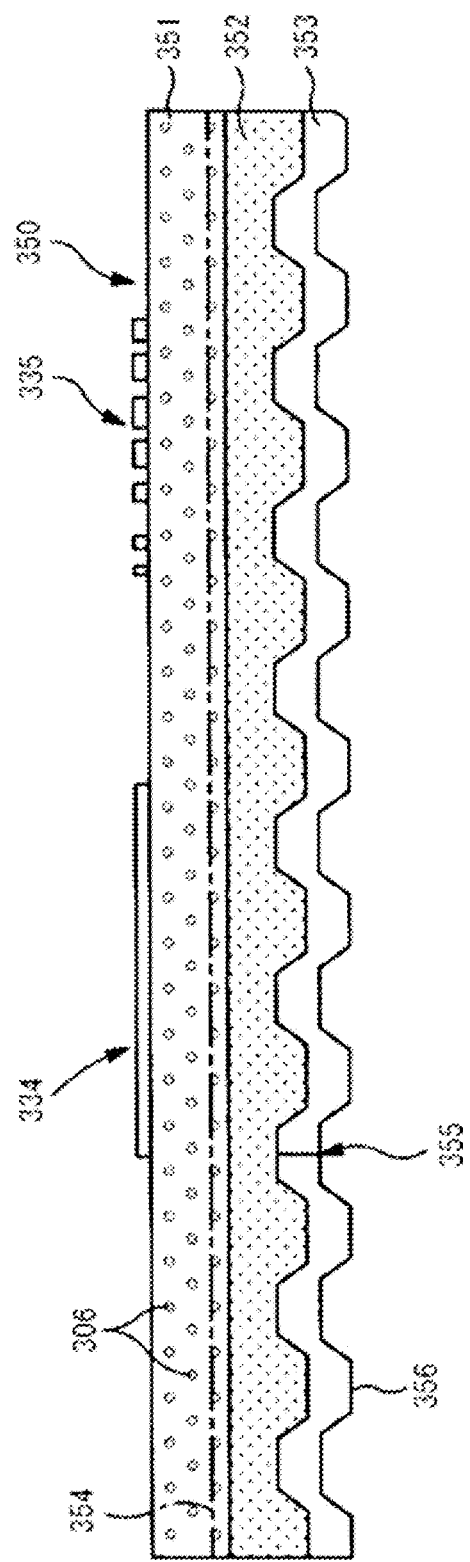
FIG. 23 is a cross-sectional side view of the wristband.

FIG. 22 is a plan view of a wristband as an information-bearing medium according to a tenth embodiment of the present invention, and FIG. 23 is a cross-sectional side view of the wristband.

A wristband 350 has a simpler configuration than the above-described wristband 330 (FIG. 20), and has a name and therapy department of a patient, and other necessary visible information 334 and bar code information 335 which are printed on its front surface as in the wristband 330.

As illustrated in particular in FIG. 23, the wristband 350 has a base substrate 351, an adhesive layer 352 on the rear surface of the base substrate 351, and an embossed layer 353 on the rear surface of the adhesive layer 352.

The carbon dioxide absorbent 306 is added to the wristband 350 in particular in a manufacturing step of the base substrate 351.

Of course, the carbon dioxide absorbent 306 may be added to at least any one of the respective layers (base substrate 351, adhesive layer 352 and embossed layer 353), and a carbon dioxide absorbent layer 354 that is the same as the carbon dioxide absorbent layer 321 (FIG. 18) can also be laminated thereon, as illustrated in FIG. 21 by a dashed line.

A cut-off line (cut-here line) 355 is formed on the embossed layer 353, this cut-off line 355 is used to peel a release region 356 at the end side of the embossed layer 353 (left side in FIG. 23) to thereby expose an internal adhesive layer 352, and this portion of the adhesive layer 352 is pasted to the opposite end of the wristband 350, thereby enabling the wristband 350 to be attached to a patient in a ring shape.

While the wristband 350 of such a configuration is of a simple type, not used for a long period of time but collected after being used for one day, and incinerated and disposed of as waste, the carbon dioxide absorbent 306 can effectively absorb carbon dioxide at the time of incinerating as in the cases of the tag 301 (FIG. 17) and the wristband 330 (FIG. 20).

Figure 24:
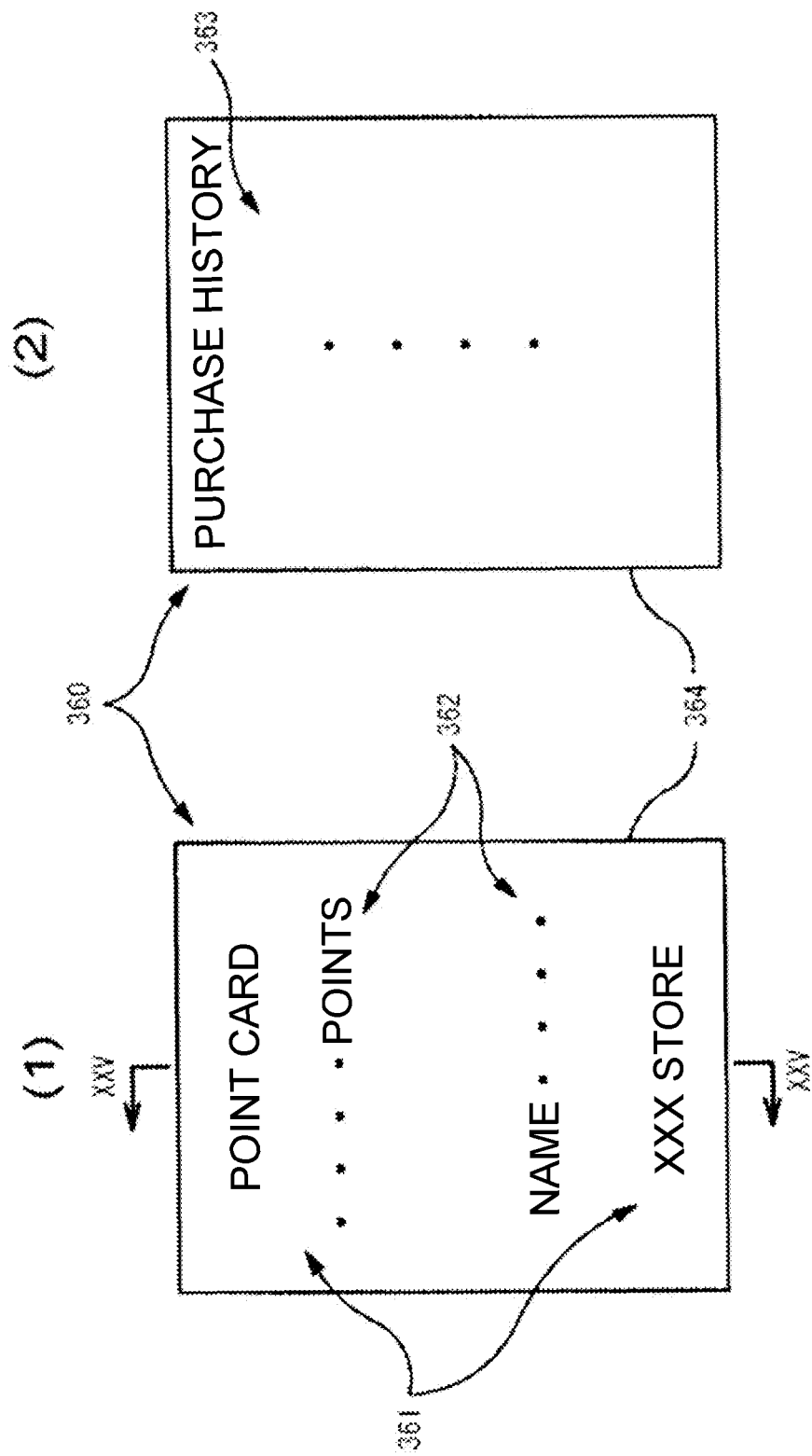
FIG. 24 is an explanatory view of a point card as an information-bearing medium according to an eleventh embodiment of the present invention, wherein Portion (1) in FIG. 24 is a front surface view of the explanatory view and Portion (2) in FIG. 24 is a rear surface view of the explanatory view.
Figure 25:
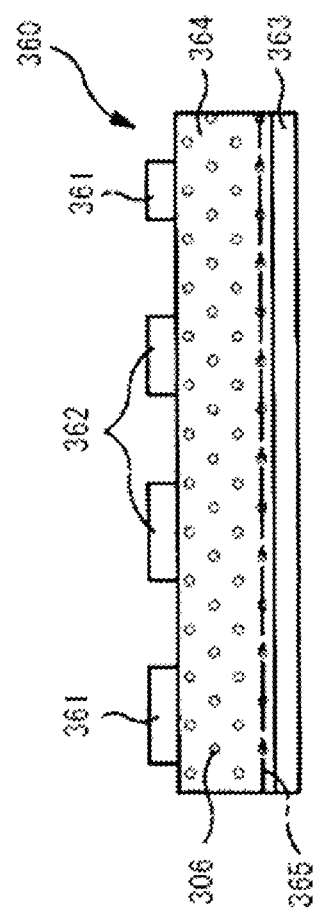
FIG. 25 is an enlarged cross-sectional view taken along line XXV-XXV of FIG. 24.

FIG. 24 is an explanatory view of a point card as an information-bearing medium according to an eleventh embodiment of the present invention. Portion (1) in FIG. 24 is a front surface view of the explanatory view and Portion (2) in FIG. 24 is a rear surface view of the explanatory view. FIG. 25 is an enlarged cross-sectional view taken along line XXV-XXV of FIG. 24.

A point card 360 is used in, for example, a retailing store, and can indicate on the front surface thereof, for example, constant information 361 such as "point card" and "XXX store", and variable information 362 such as a number of points and a user name, as illustrated in Portion (1) in FIG. 24.

As illustrated in Portion (2) in FIG. 24, the point card 360 can indicate on the rear surface thereof, for example, variable information 363 such as "purchase history".

As a method for printing or indicating the respective information (constant information 361, variable information 362 and variable information 363), any method can be employed depending on the conditions and types of use thereof.

In the point card 360, the carbon dioxide absorbent 306 is added to a base substrate 364.

Of course, in the case where the point card 360 includes a plurality of layers, the carbon dioxide absorbent 306 may be added to at least any one of the respective layers, and a carbon dioxide absorbent layer 365 that is the same as the carbon dioxide absorbent layer 321 (FIG. 18) can also be laminated thereon, as illustrated in FIG. 25 by a dashed line.

Information can be rewritten a plurality of times on the point card 360 of such a configuration. When the point card 360 is finally collected after use, incinerated and disposed of as waste, the carbon dioxide absorbent 306 can effectively absorb carbon dioxide at the time of incinerating as in the cases of the tag 301 (FIG. 17), the wristband 330 (FIG. 20) and the wristband 350 (FIG. 22).

FIG. 7 is a table of a carbon dioxide reduction amount, showing experimental results for confirming an effect of reducing carbon dioxide by a carbon dioxide absorbent (Nano vesicle carbon dioxide reduction additive produced by Acteiive R&D).

Four samples each including the carbon dioxide absorbent 6 added to an emulsion-type adhesive in a concentration of 0.00%, 0.01%, 0.05%, or 0.10% were prepared as experimental samples, a thermogravimetric measurement method for plastics according to JIS K 7120 was employed as a test method, the mass of each sample was 10 mg, inflow gas was air, the flow rate of the inflow gas was 50 mL/min, the rate of temperature rise was 10° C./min, and the temperature was raised to 400° C. to heat each sample for 100 minutes.

As shown in the table in FIG. 7, the sample to which the carbon dioxide absorbent 306 was added in a concentration of 0.01% achieved a carbon dioxide reduction amount of 33.68%, the sample to which it was added in a concentration of 0.05% achieved a carbon dioxide reduction amount of 51.99%, and the sample to which it was added in a concentration of 0.10% achieved a carbon dioxide reduction amount of 56.20%, as determined from each difference in residue amount as compared with the sample to which the carbon dioxide absorbent 306 was not added.

The amount of the carbon dioxide absorbent 306 added is adjusted depending on the type and condition of the label 301 used and various conditions of the incineration disposal thereof so that the effect of reducing carbon dioxide can be ensured at a predetermined level.

That is, in the information-bearing medium and the carbon dioxide reduction method using this according to the present invention, the carbon dioxide absorbent is added to or laminated on various information-bearing media in which information such as variable information and constant information is indicated on the surface thereof by using various information-bearing media, and to which a coating treatment for enhancing decorative properties, functionalities and performances of the printing medium is applied. When such information-bearing medium is incinerated alone or together with various objects of pasting or objects of attaching, carbon dioxide can be absorbed.

Twelfth Embodiment

According to the present invention, since a carbon dioxide absorbent is added to a solid fuel itself, there have been realized a solid fuel in which the carbon dioxide absorbent can absorb carbon dioxide at the time of burning the solid fuel to thereby contribute to reduction in carbon dioxide, and a carbon dioxide reduction method using this.

Figure 26:
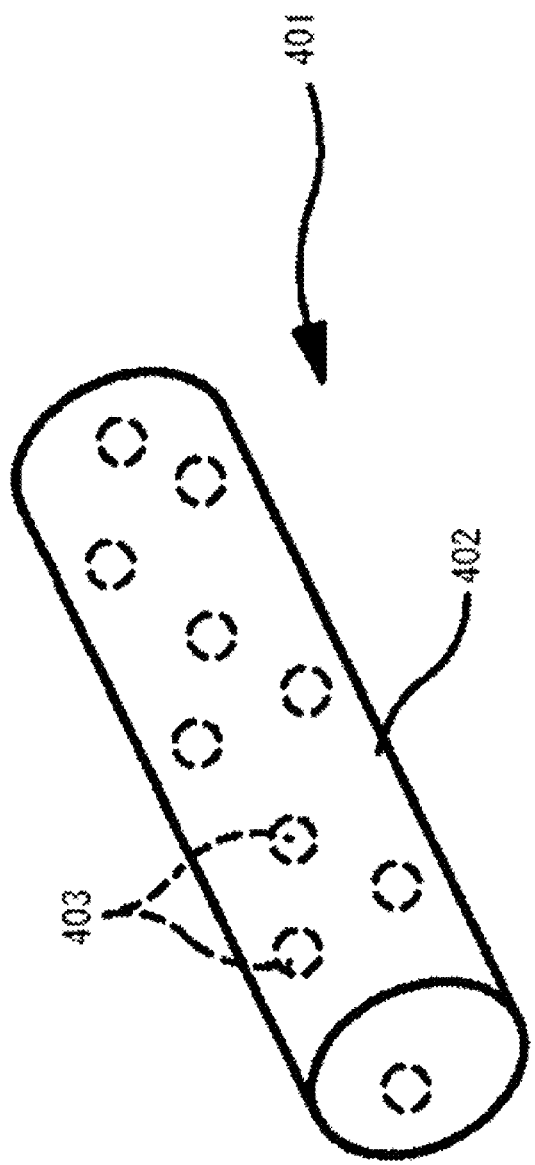
FIG. 26 is a perspective view of a solid fuel according to a twelfth embodiment of the present invention.
Figure 27:
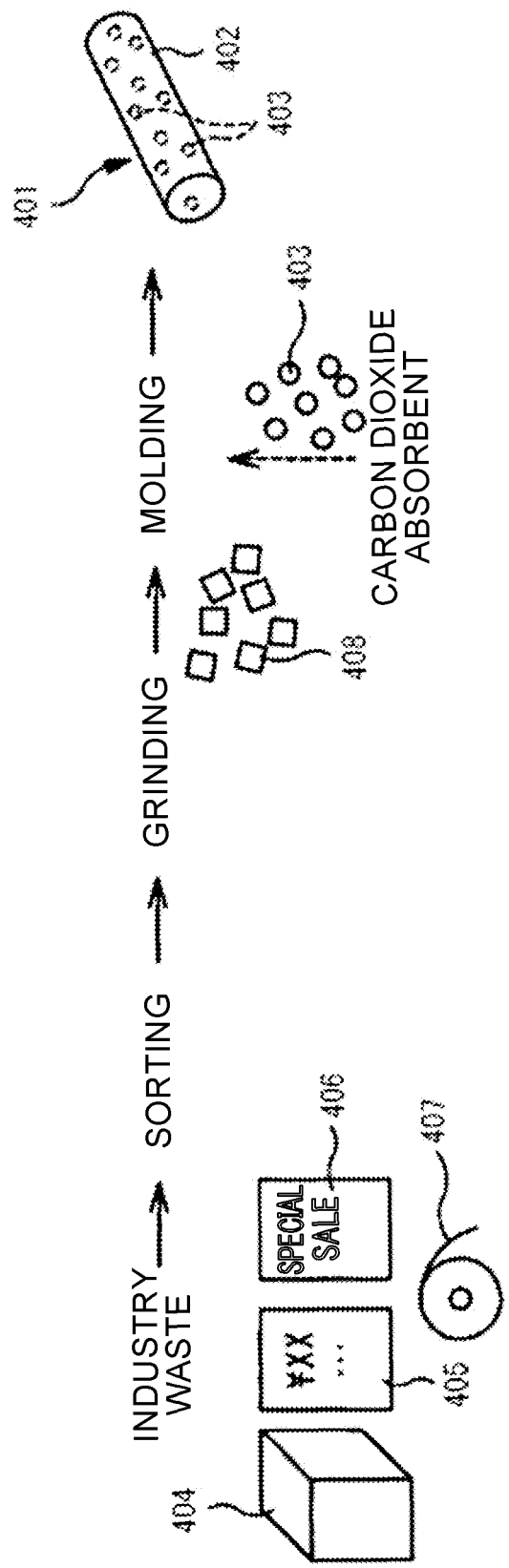
FIG. 27 is a schematic explanatory view of a manufacturing step of the solid fuel.
Figure 28:
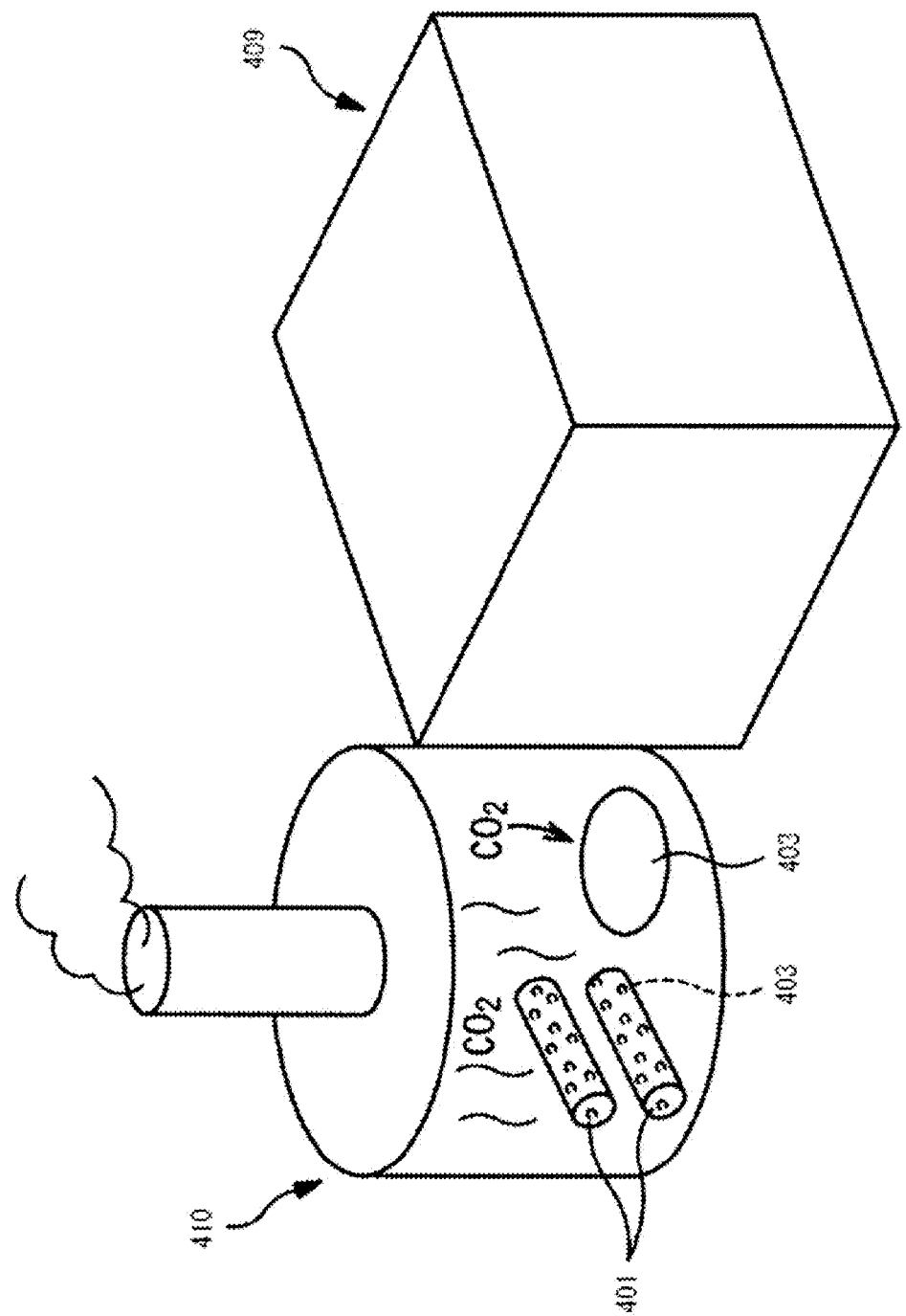
FIG. 28 is an explanatory view illustrating a state where the solid fuel is burned in a boiler of a plant.

Then, a solid fuel 401 according to a twelfth embodiment of the present invention and a carbon dioxide reduction method using this are described based on FIG. 26 to FIG. 28.

FIG. 26 is a perspective view of the solid fuel, FIG. 27 is a schematic explanatory view of a manufacturing step of the solid fuel, and the solid fuel 401 is manufactured using flammable industry waste as a raw material via each step of sorting, grinding and molding.

That is, the solid fuel 401 is molded in, for example, a column shape as illustrated, and has a flammable body 402 and a carbon dioxide absorbent 403 added to the flammable body 402.

The solid fuel 401 has a diameter of 6 to 60 mm and a length of about 10 to 100 mm, for example, but can be molded in any shape and size.

As illustrated in FIG. 27, examples of industry waste include used paper, a waste plastic material and other flammable waste. In addition to them, a cardboard box 404, a label 405, a sticker 406, a printing ink ribbon (thermal transfer ink ribbon 407) or the like is utilized. It is to be noted that the industry waste may be used as it is or may be used with if necessary being mixed with general waste such as domestic refuse.

In the sorting step, metals that serve as the flammable body 402 with difficulty and other articles that are unsuitable for being converted into a fuel, and also products that can be burned to cause toxicity, including vinyl chloride and other chlorine compounds, are removed from the collected industry waste.

In the grinding step, the sorted raw material is ground to a chip 408 having a required size, for example, about 5 to 15 cm in each of length, width and height.

In the molding step, the chip 408 is molded and compressed into a column, and the column is designated as the solid fuel 401.

In addition, if being necessary for the molding, a binder is desirably added in a predetermined amount. Herein, if the label 405, the sticker 406 or the like having an adhesive layer is contained in industry waste, a binder needs not to be added or the amount thereof can be reduced.

Furthermore, in the present invention, a carbon dioxide absorbent 403 is added to the chip 408 in the molding step.

It is desirable that the carbon dioxide absorbent 403 be made from, for example, an inorganic carbon dioxide absorbent, be particulate to the nanometer (nm=10-9 m) level, and be uniformly dispersed throughout the solid fuel 401 (flammable body 402). For example, the particle size thereof can be, at least, less than 1 µm, more preferably about 10 to 100 nm.

As the carbon dioxide absorbent 403 particulate to nanometer in size, for example, a Nano vesicle carbon dioxide reduction additive produced by Acteiive R&D can be used.

The solid fuel 401 of such a configuration can be applied as a part of a boiler fuel in paper-manufacturing companies, cement companies, chemical companies, and any other fields.

FIG. 28 is an explanatory view illustrating a state where a solid fuel is burned in a boiler of a plant. While the solid fuel 401 is burned in a boiler 410 to obtain heat energy for a plant 409, carbon dioxide ($CO_2$ gas) is generated due to the burning by heating and the carbon dioxide is adsorbed to the carbon dioxide absorbent 403. Carbon dioxide generated from other fuel used as needed basis is also absorbed to the portion of the carbon dioxide absorbent 403.

In particular, since the carbon dioxide absorbent 403 is particulate to nanometer in size (for example, about 10 to 100 nm) and uniformly dispersed, it can effectively absorb carbon dioxide.

Also in the case where the solid fuel 401 is not used for companies or the plant 409, but used as a common fuel, the function of effectively absorbing carbon dioxide by the carbon dioxide absorbent 403 can be expected as in the above case.

FIG. 7 is a table of a carbon dioxide reduction amount, showing experimental results for confirming an effect of reducing carbon dioxide by the carbon dioxide absorbent 403 (Nano vesicle carbon dioxide reduction additive produced by Acteiive R&D).

Four samples each including the carbon dioxide absorbent 3 added to an emulsion-type adhesive in a concentration of 0.00%, 0.01%, 0.05%, or 0.10% were prepared as experimental samples, a thermogravimetric measurement method for plastics according to JIS K 7120 was employed as a test method, the mass of each sample was 10 mg, inflow gas was air, the flow rate of the inflow gas was 50 mL/min, the rate of temperature rise was 10° C./min, and the temperature was raised to 400° C. to heat each sample for 100 minutes.

As shown in the table in FIG. 7, the sample to which the carbon dioxide absorbent 403 was added in a concentration of 0.01% achieved a carbon dioxide reduction amount of 33.68%, the sample to which it was added in a concentration of 0.05% achieved a carbon dioxide reduction amount of 51.99%, and the sample to which it was added in a concentration of 0.10% achieved a carbon dioxide reduction amount of 56.20%, as determined from each difference in residue amount as compared with the sample to which the carbon dioxide absorbent 403 was not added.

The amount of the carbon dioxide absorbent 403 added is adjusted depending on the type and condition of the solid fuel 401 used and various conditions of burning thereof so that the effect of reducing carbon dioxide can be ensured at a predetermined level.

Thirteenth Embodiment

According to the present invention, since a carbon dioxide absorbent is added to a wristband clip, there have been realized a wristband clip in which the carbon dioxide absorbent can absorb carbon dioxide at the time of being incinerated to thereby contribute to reduction in carbon dioxide, and a carbon dioxide reduction method using this.

Figure 29:
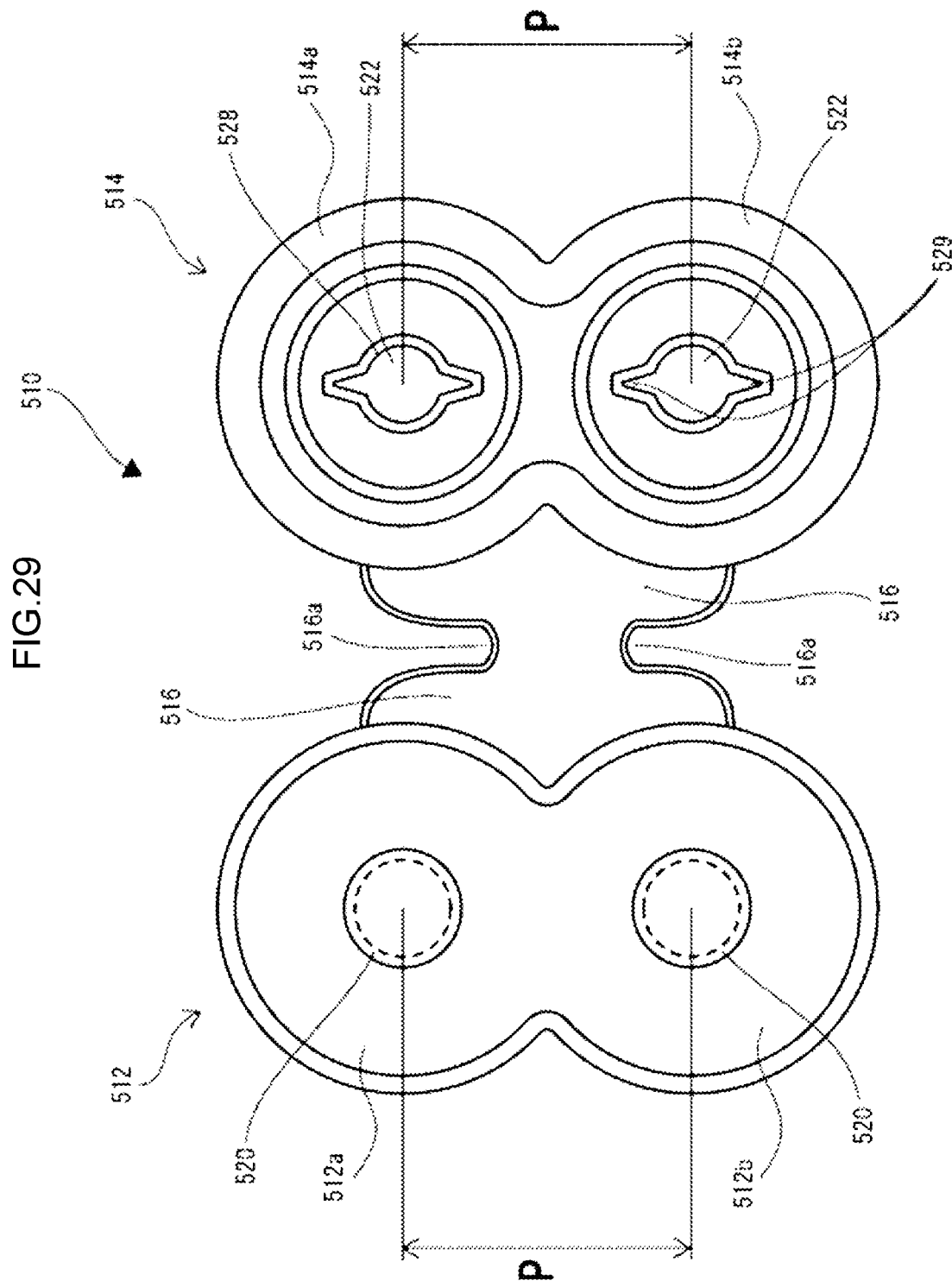
FIG. 29 is a plan view illustrating a configuration of a wristband clip according to a thirteenth embodiment of the present invention.
Figure 30:
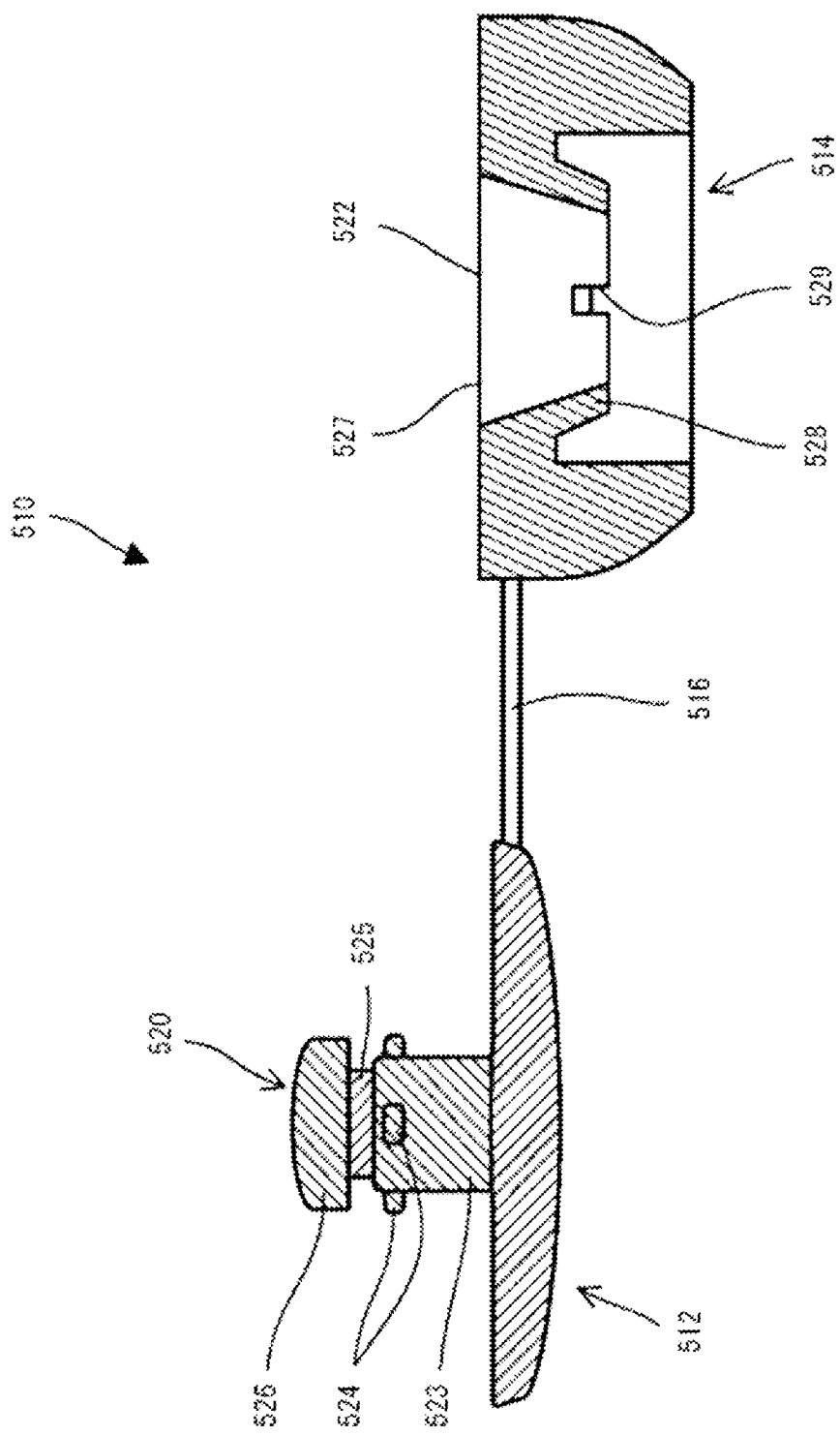
FIG. 30 is a side view illustrating the configuration of the wristband clip according to the thirteenth embodiment of the present invention.

Then, a wristband clip according to a thirteenth embodiment of the present invention and a carbon dioxide reduction method using this are described based on FIG. 29 and FIG. 30.

FIG. 29 is a plan view illustrating the configuration of the wristband clip, and FIG. 30 is a side view illustrating the configuration of the wristband clip.

A wristband clip 510 of the present invention is mainly formed from a synthetic resin material as illustrated in FIG. 29. This wristband clip 510 includes a male clip portion 512 and a female clip portion 514 that have a substantial eight figure and that are connected via a hinge 516 in a bilateral symmetrical manner to be integrally formed.

Each of bosses 520 is formed on the center of each of circular portions 512a and 512b of the male clip portion 512 of the wristband clip 510, and such bosses 520 are formed at the same interval as the interval of band holes 536 and setting holes 538 formed on a wristband 530 described later. In addition, each of boss holes 522 is formed on the center of each of circular portions 514a and 514b of the female clip portion 514 of the wristband clip 510, and such boss holes 522 are also formed at the same interval as the interval of the band holes 536.

The hinge 516 of the wristband clip 510 is formed into a thin sheet, and is provided with flexion portions 516a on both edges thereof, each having a substantial U-shape for making flexion easy, as illustrated in FIG. 30.

The bosses 520 formed so as to be protruded to the male clip portion 512 are each provided with a columnar shaft portion 523 disposed on the center thereof in a protruding manner and a first radially-enlarged portion constituting four sheet-shaped engagement portions 524 radially protruded at equal angles in the circumferential direction of the shaft portion 523. The bosses 520 are each further provided with, on the tip thereof, a non-return portion 526 constituting a second radially-enlarged portion having a smaller diameter than the first radially-enlarged portion. A constricted portion 525 having a smaller diameter than the first radially-enlarged portion and the second radially-enlarged portion is provided between the first radially-enlarged portion and the second radially-enlarged portion. A portion protruded from the outer circumference of the shaft portion 523 on the non-return portion 526 is configured to have a scalable diameter by elastic deformation.

On the other hand, the boss holes 522 of the female clip portion 514 each have a holding portion 527 formed in an inverted cone shape (mortar shape), corresponding to the shape of the engagement portion 524 for the bosses 520 of the male clip portion 512.

In addition, a retaining portion 528 is formed on the lower surface of the female clip portion 514 provided with the boss hole 522, the retaining portion 528 being built up along the inner circumference of the boss hole 522. This retaining portion 528 has two notches 529 formed so that the inner diameter of the retaining portion 528 is made scalable.

When this wristband clip 510 is folded by the hinge 516, the boss 520 of the male clip portion 512 is fitted into the boss hole 522 of the female clip portion 514 to thereby join the male clip portion 512 and the female clip portion 514. That is, the boss 520 is inserted into the boss hole 522 while the retaining portion 528 of the boss hole 522 being pushed and extended by the non-return portion 526 of the boss 520. After the non-return portion 526 passing through the retaining portion 528, the diameter of the retaining portion 528 contracts by an elastic restoring force is fitted between the non-return portion 526 and the engagement portion 524. The holding portion 527 of the boss hole 522 corresponds to the engagement portion 524 of the boss 520 in terms of shape, and thus the engagement portion 524 is held to the holding portion 527 in close contact with each other to prevent backlash of the boss 520 on the boss hole 522. Even if the boss 520 is tried to be pulled out of the boss hole 522 in this state, the retaining portion 528 gets hung up the non-return portion 526 to prevent the boss 520 from being pulled out.

Figure 31:
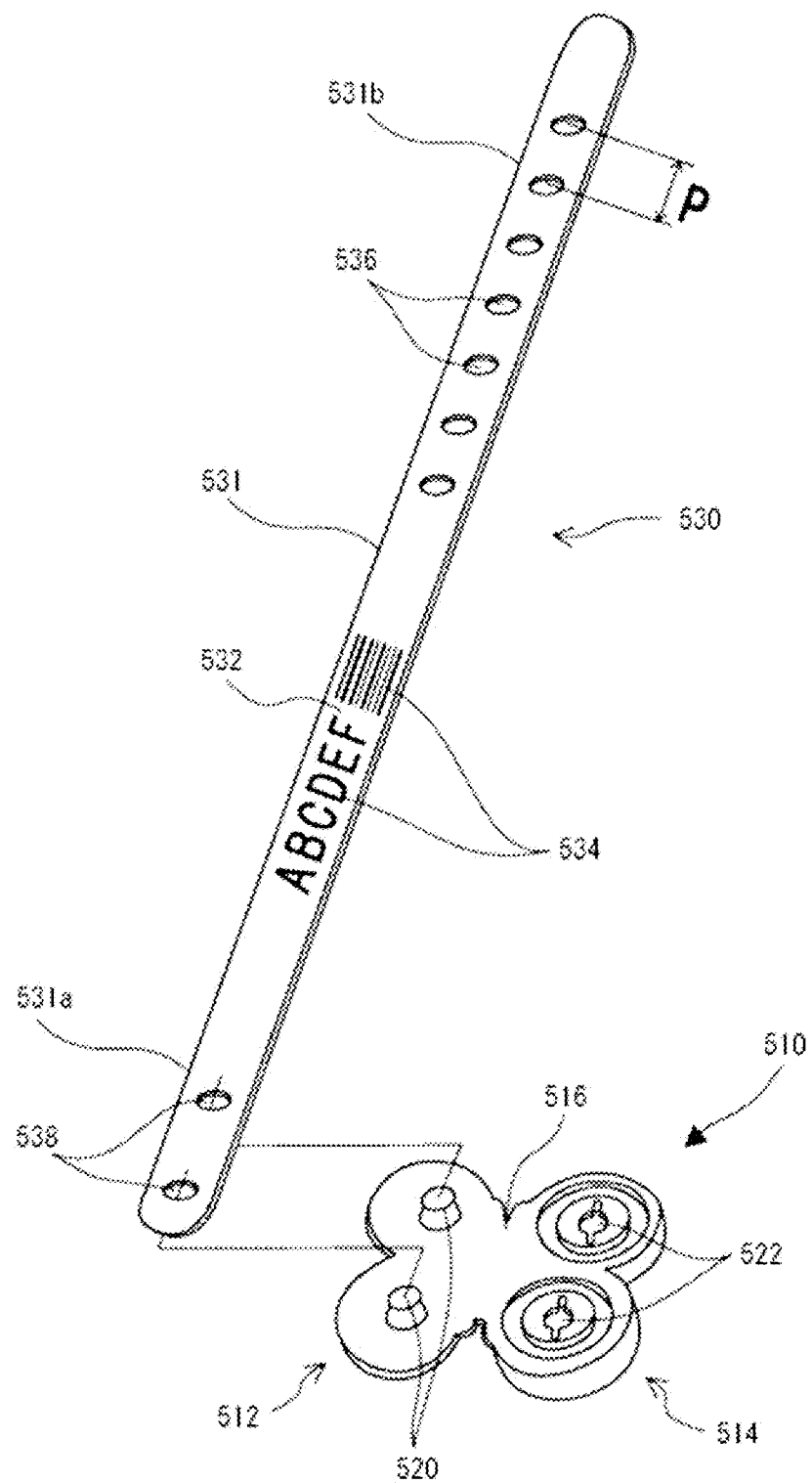
FIG. 31 is a perspective view illustrating a configuration of a wristband to which the wristband clip according to the thirteenth embodiment of the present invention is adapted.
Figure 32:
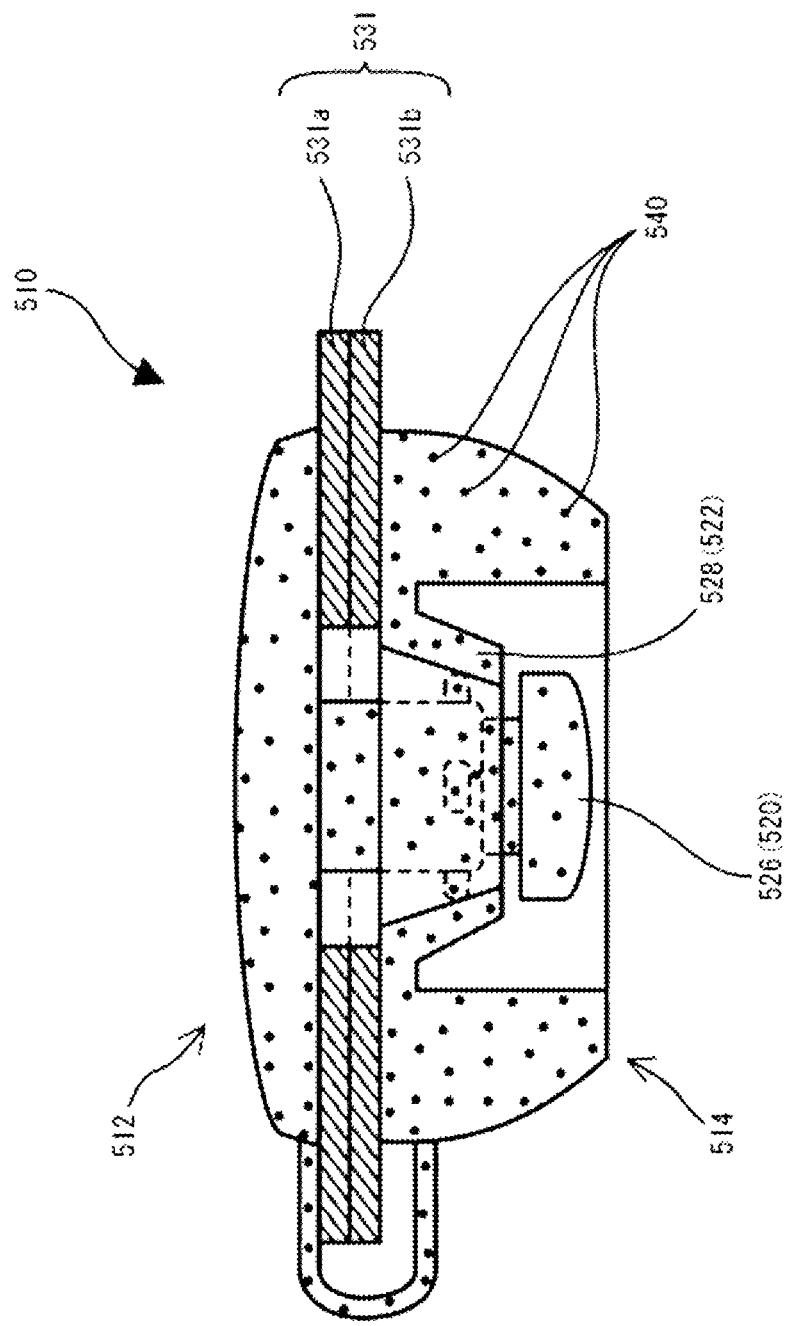
FIG. 32 is a side view illustrating a state where a boss of a male clip portion of the wristband clip according to the thirteenth embodiment of the present invention is fitted into a boss hole of a female clip portion to fix a wristband.

Then, a use method in which the wristband clip of the present invention is applied to a wristband is described based on FIG. 31 and FIG. 32.

FIG. 31 is a perspective view illustrating a configuration of a wristband to which the wristband clip according to the thirteenth embodiment of the present invention is adapted, and FIG. 32 is a side view illustrating a state where the boss of the male clip portion of the wristband clip according to the thirteenth embodiment of the present invention is fitted into the boss hole of the female clip portion to fix the wristband. A wristband 530 includes a display portion 532 whose center region can be printed by an electronic printer (not illustrated) or the like, and band portions 531a and 531b extending to both sides of the display portion 532. Herein, the band portions 531a and 531b constitute a band main body 531.

Identification data 534 specific to an individual, such as the department, name, age and blood type of a patient, is printed on the display portion 532.

A pair of setting holes 538 for setting the wristband clip 510 is formed on a shorter band portion 531a. The setting holes 538 are formed at regular intervals. On the other hand, a plurality of band holes 536 is formed on a longer band portion 531b at regular intervals.

The function of the wristband clip 510 thus configured is described by the procedure of winding the wristband 530 around a wrist, an ankle or the like.

First, the bosses 520 of the male clip portion 512 are allowed to pass through the setting holes 538 formed on the shorter band portion 531a of the wristband 530 to attach the wristband 530 to the clip 510.

Then, after the wristband 530 is wound around a wrist, any of the band holes 536 formed on the longer band portion 531b is selected depending on the size of a wrist, and the boss 520 is allowed to pass through the selected band hole 536. Thus, the wristband 530 is wound around a wrist at a temporary position.

Then, the female clip portion 514 is bent to the side of the male clip portion 512 by means of the hinge 516 to close the upper surface of the male clip portion 512 by the female clip portion 514, thereby folding the clip 510.

After the non-return portion 526 formed on the tip of the boss 520 pushes and extends the retaining portion 528 of the female clip portion 514, the non-return portion 526 engages with the retaining portion 528 to lock the female clip portion 514. At this time, if the space between the male clip portion 512 and the female clip portion 514 is set to have a thickness equal to or less than the thickness when the band portions 531a and 531b are overlaid each other, the wristband 530 can be strongly sandwiched by the clip 510 and the backlash thereof can be further prevented. In addition, the constricted portion 525 is formed to have a smaller diameter than the first radially-enlarged portion and the second radially-enlarged portion of the boss 520, and therefore the male clip portion 512 and the female clip portion 514 of the wristband 530 are securely fitted to each other.

In this way, the wristband 530 is annularly wound around a wrist or the like. Since the boss 520 and the boss hole 522 can be fitted to each other only by bending the hinge 516, the wristband 530 can be attached even by one hand. Since the non-return portion 526 once engaged with the retaining portion 528 locks the boss 520 so that the boss 520 is never pulled out again, the wristband 530 can be safely used even in, for example, hospital or the like. When the wristband 530 is detached, the wristband 530 is cut by scissors or the like.

This wristband clip 510 is configured from, for example, a synthetic resin material composed of polyethylene excellent in chemical resistance. In a manufacturing step of the wristband clip 510, a carbon dioxide absorbent 540 is added thereto by any way depending on a material of the clip 510 (see FIG. 32).

The carbon dioxide absorbent 540 is a material that is reacted with carbon dioxide generated at the time of burning to allow the carbon dioxide not to be released in air but to remain as ash (carbonate).

It is desirable that this carbon dioxide absorbent 540 be made from, for example, an inorganic carbon dioxide absorbent 540, be particulate to the nanometer (nm=10-9 m) level, and be uniformly dispersed throughout the clip 510. For example, the particle size thereof can be, at least, less than 1 μm, more preferably about 10 to 100 nm.

As the carbon dioxide absorbent 540 particulate to nanometer in size, for example, a Nano vesicle carbon dioxide reduction additive produced by Acteiive R&D can be used.

The wristband clip 510 of such a configuration is used for winding the wristband 530, on which identification information specific to a patient is printed for identifying the patient, around a wrist of the patient to clip it, and after use, detached from the wrist, and incinerated and disposed of.

Figure 33:
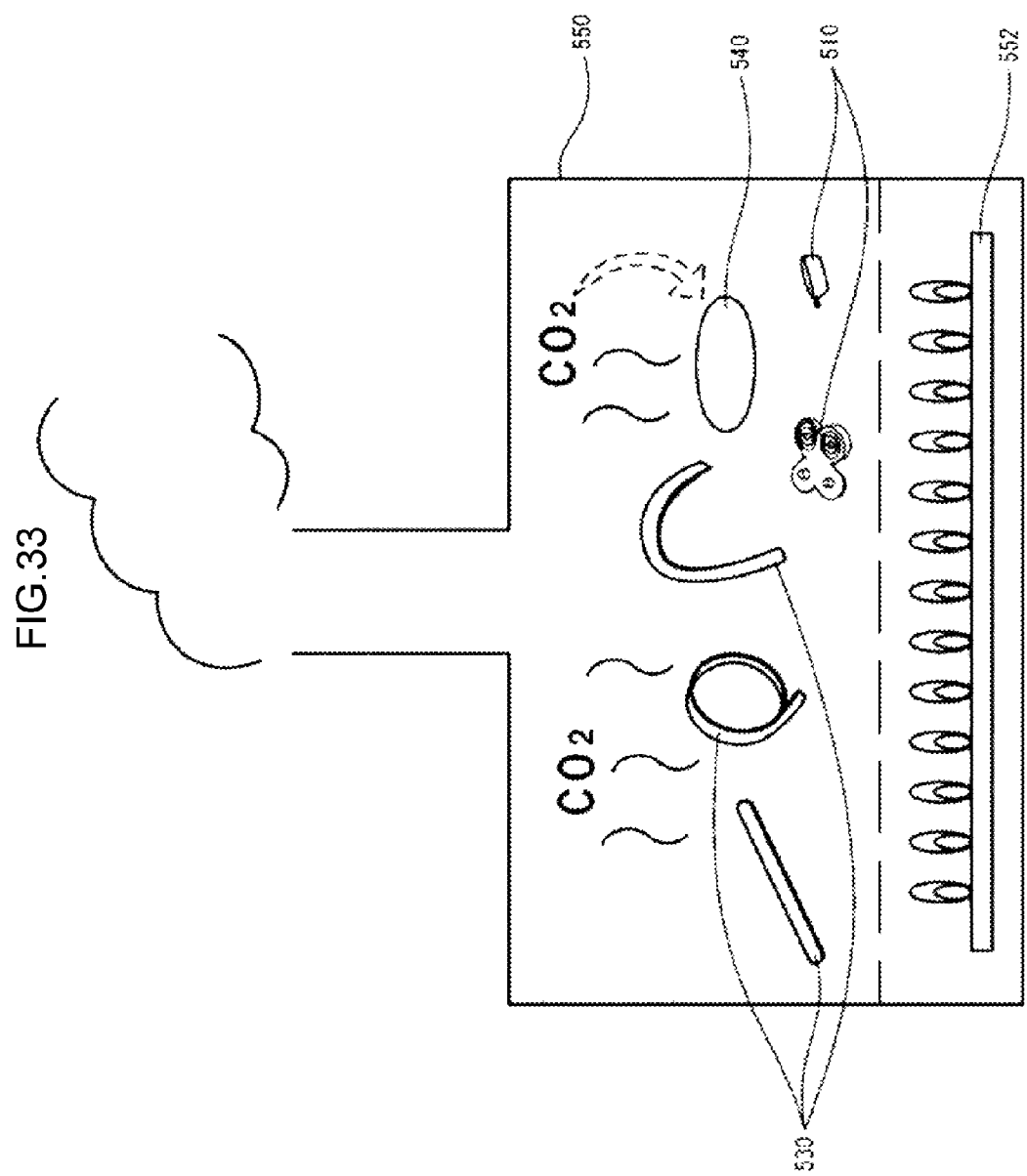
FIG. 33 is an explanatory view illustrating a state where the wristband clip according to the thirteenth embodiment of the present invention after use is incinerated in an incinerator.

FIG. 33 is an explanatory view illustrating a state where the used wristband clip is incinerated in an incinerator.

While the wristband clip 510 is incinerated in an incineration disposal by an incinerating burner 552 in an incinerator 550, carbon dioxide (CO2 gas) is generated due to burning by heating, and the carbon dioxide is adsorbed by the carbon dioxide absorbent 540.

Carbon dioxide generated by burning the wristband clip 510 is absorbed by the portion of the carbon dioxide absorbent 540.

In particular, if the carbon dioxide absorbent 540 is particulate to nanometer in size (for example, about 10 to 100 nm) and also uniformly dispersed, the carbon dioxide absorbent 540 can have an increased surface area so as to effectively absorb carbon dioxide.

FIG. 34 is a table of a carbon dioxide reduction amount, showing experimental results for confirming an effect of reducing carbon dioxide by the carbon dioxide absorbent 540 (Nano vesicle carbon dioxide reduction additive produced by Acteiive R&D).

Two kinds of clips were prepared as experimental samples: one of which was a commercially available and to which the carbon dioxide absorbent 540 was not added (manufactured by Sato Corporation, product name: Soft clip); and the other was the wristband clip 510 of the present invention obtained by adding 3.00% of the carbon dioxide absorbent 540 to the commercially available wristband clip. A thermogravimetric measurement method for plastics according to JIS K 7120 was employed as a test method, the mass of each sample was 10 mg, inflow gas was air, the flow rate of the inflow gas was 50 mL/min, the rate of temperature rise was 10° C./min, and the temperature was raised to 400° C. to heat each sample for 100 minutes.

As shown in the table in FIG. 34, the wristband clip 510 of the present invention could achieve a carbon dioxide reduction amount of 64.89%, as determined from a difference in residue amount as compared with the commercially available wristband clip.

In addition, the amount of the carbon dioxide absorbent 540 added is adjusted depending on the type and condition of the wristband clip 510 used and various conditions of the incineration disposal thereof so that the effect of reducing carbon dioxide can be ensured at a predetermined level.

Herein, a synthetic resin material such as polypropylene, rubber or urethane which has moldability comparable with polyethylene and is gentle to skin even if being in contact with skin, can also be employed to the wristband clip 510 to which the carbon dioxide absorbent 540 is added.

Furthermore, if the carbon dioxide absorbent 540 is added at the time of manufacturing the wristband 530, the carbon dioxide absorbent 540 can effectively absorb carbon dioxide at the time of incinerating and disposing of the wristband 530, thereby contributing to reduction in carbon dioxide.

The carbon dioxide absorbent of the present invention is obtained by mixing a carbon dioxide-absorbing substance and a dispersion aid, subjecting them to a dispersion treatment (mixed dispersion), and then adding them to a resin.

The carbon dioxide-absorbing substance in the present invention may be any one to which carbon dioxide chemically or physically adsorbs. For example, metal hydroxide, metal oxide, aluminosilicate, a titanic acid compound, lithium silicate, silica gel, alumina, and activated carbon are preferable with respect to an inorganic compound, and a coconut mesocarp fiber is preferable with respect to an organic compound.

The metal hydroxide may include lithium hydroxide, sodium hydroxide, magnesium hydroxide, calcium hydroxide, and barium hydroxide.

The metal oxide may include magnesium oxide, calcium oxide, and zinc oxide.

The aluminosilicate may include amorphous aluminosilicate, natural zeolite, and synthetic zeolite.

The titanic acid compound may include barium titanate and barium orthotitanate.

The dispersion aid in the present invention may be any one that enables the carbon dioxide-absorbing substance being an inorganic compound or an organic compound to be effectively dispersed in a resin. For example, a metal salt of fatty acid, a polymeric surfactant, and an amphiphilic lipid are preferable.

The metal salt of fatty acid may include calcium stearate, zinc stearate, magnesium stearate, aluminum stearate, barium stearate, lithium stearate, sodium stearate, potassium stearate, calcium 12-hydroxystearate, zinc 12-hydroxystearate, magnesium 12-hydroxystearate, aluminum 12-hydroxystearate, barium 12-hydroxystearate, lithium 12-hydroxystearate, sodium 12-hydroxystearate, and potassium 12-hydroxystearate.

The polymeric surfactant may include sodium polyacrylate, sodium polycarboxylate, an olefin/maleic acid copolymer sodium salt, polyoxyethylene-type gemini surfactants (POE30-10-ODEs, POE20-10ODEs, POE10-10-ODEs), a phosphate ester-type gemini surfactant (POH-10-ODEs), and a dicarboxylic acid-type gemini surfactant (DC-10-ODEs).

The amphiphilic lipid may include glycerophospholipids such as phosphatidylcholine, phosphatidylethanolamine, phosphatidylserine, phosphatidic acid, phosphatidylglycerol, phosphatidylinositol, cardiopine, egg yolk lecithin, hydrogenated egg yolk lecithin, soy lecithin and hydrogenated soy lecithin, and sphingophospholipids such as sphingomyelin, ceramide phosphorylethanolamine and ceramide phosphorylglycerol.

The dispersion treatment in the present invention may be any method that enables to effectively cover the surface of the carbon dioxide-absorbing substance with the dispersion aid to prepare a dispersion liquid in which the carbon dioxide-absorbing substance is uniformly dispersed.

For example, a supercritical fluid treatment, an ultrasonic irradiation treatment, and a stirring treatment are preferable.

As a solvent of the dispersion liquid, water or an organic solvent is preferable. The specific organic solvent may include ethanol, dichloromethane, and hexane.

In the supercritical fluid treatment, the mixture of the carbon dioxide-absorbing substance and the dispersion aid is exposed to a supercritical fluid, thereby enhancing dispersibility of the carbon dioxide-absorbing substance. As the supercritical fluid, carbon dioxide in a supercritical state is preferable.

The carbon dioxide in a supercritical state in the present invention means carbon dioxide that is in a supercritical state where the critical temperature is 30.98° C. and the critical pressure is 7.3773 MPa or more. Carbon dioxide under a condition in which only the critical temperature or only the critical pressure is satisfied is not considered to be in the supercritical state.

Figure 42:
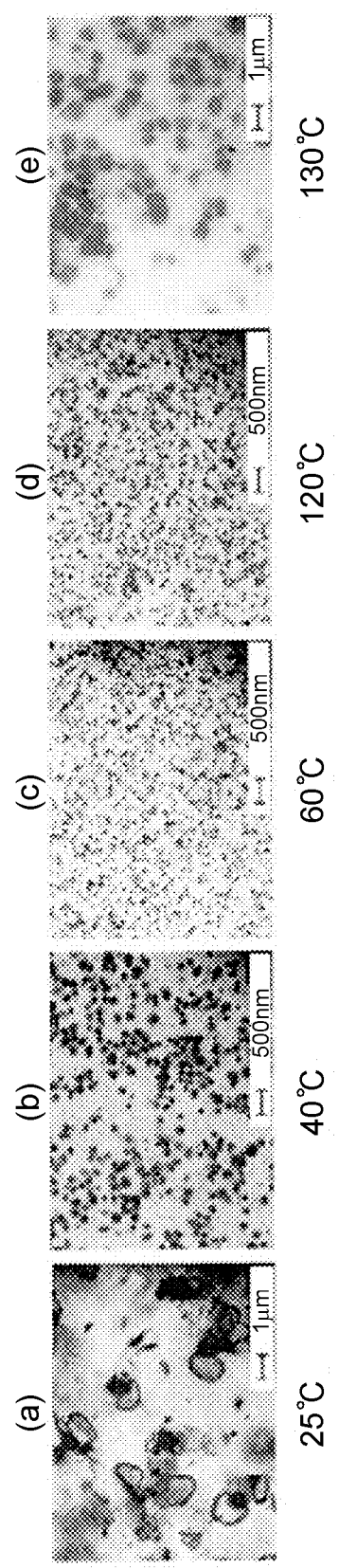
FIG. 42 shows transmission electron microscope photographs indicating dispersibility of a carbon dioxide-absorbing substance in a dispersion aid in the case where a supercritical fluid treatment is performed.

Herein, FIG. 42 shows transmission electron microscope photographs of a mixture of 100 parts by weight of calcium hydroxide as the carbon dioxide-absorbing substance, 1 part by weight of calcium 12-hydroxystearate as the dispersion aid and 20 parts by weight of ion exchange water as the dispersion solvent, which is subjected to a supercritical fluid treatment at a treatment pressure of 20 MPa and a treatment temperature of each of 25° C., 40° C., 60° C., 120° C. and 130° C. for 15 minutes.

The black areas in the photographs indicate the carbon dioxide-absorbing substance covered with the dispersion aid, and the white areas indicate an aqueous solution of the dispersion aid.

Figure 41:
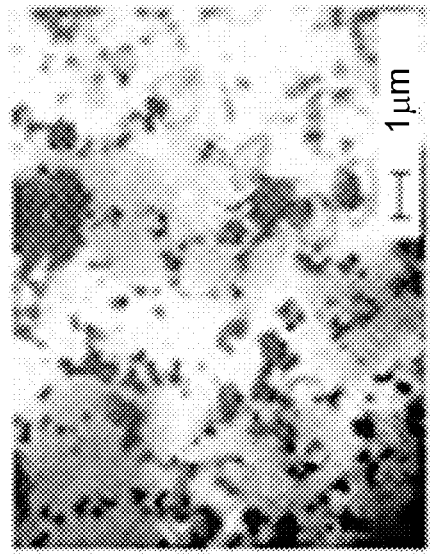
FIG. 41 shows a transmission electron microscope photograph indicating dispersibility of a carbon dioxide-absorbing substance in a dispersion aid in the case where no dispersion treatment is performed.

For comparison, FIG. 41 shows a transmission electron microscope photograph indicating dispersibility of the carbon dioxide-absorbing substance in the dispersion aid in the case where no dispersion treatment is performed.

The respective mixtures after the supercritical fluid treatment at the respective treatment temperatures are compared. In the mixture after the dispersion treatment at a treatment temperature of 25° C. that does not meet the supercritical fluid treatment condition, the particle size of the carbon dioxide-absorbing substance is 1 µm or more, and the carbon dioxide-absorbing substance is aggregated in the aqueous solution of the dispersion aid without being dispersed (see FIG. 42(a)). On the contrary, in the mixture after the dispersion treatment at a treatment temperature of 40° C. that satisfies the supercritical fluid treatment condition, the particle size of the carbon dioxide-absorbing substance is about 100 nm, and the carbon dioxide-absorbing substance in the mixture is uniformly dispersed (see FIG. 42(b)). Therefore, it can be said that, in the supercritical fluid treatment, the treatment is required to be performed in a state where both pressure and temperature that make carbon dioxide be in a supercritical state are satisfied.

In addition, regarding the mixtures after the dispersion treatment at a treatment temperature of 60° C. and a treatment temperature of 120° C., the particle size of the carbon dioxide-absorbing substance is about 10 nm in both cases, and high dispersibility is achieved (see FIGS. 8(c) and (d)). However, when the treatment temperature exceeds 130° C., the particle size of the carbon dioxide-absorbing substance becomes about 0.8 µm, and the carbon dioxide-absorbing substance is found to be aggregated (See FIG. 42(e)). In other words, a treatment temperature that is too high is unfavorable, and a dispersion effect is adversely suppressed at a treatment temperature of an excessive condition.

In the ultrasonic irradiation treatment, the mixture of the carbon dioxide-absorbing substance and the dispersion aid is irradiated with an ultrasonic wave having a frequency of 15 KHz to 60 KHz and an intensity of about 75 W to about 600 W to thereby enhance dispersibility of the carbon dioxide-absorbing substance.

Figure 43:
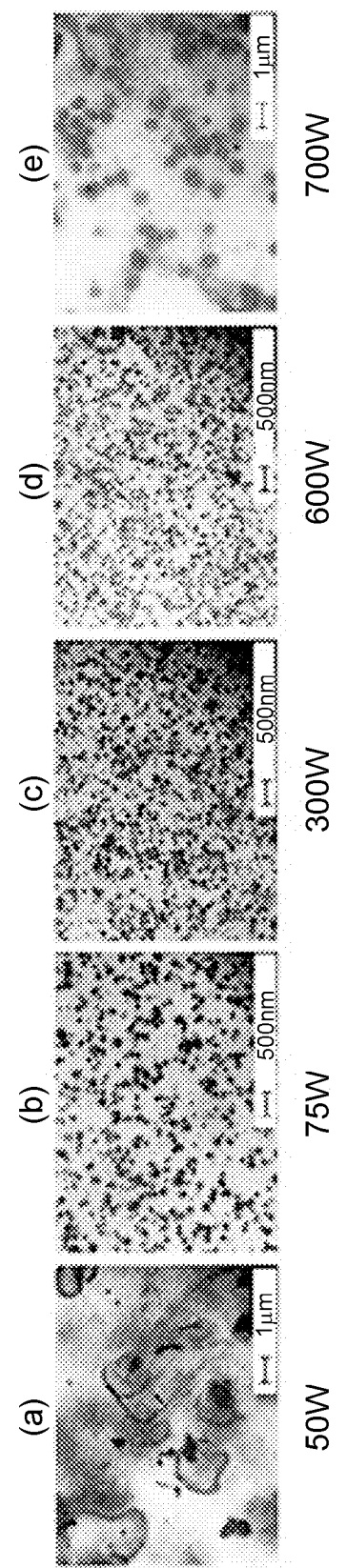
FIG. 43 shows transmission electron microscope photographs indicating dispersibility of a carbon dioxide-absorbing substance in a dispersion aid in the case where an ultrasonic treatment is performed.

Herein, FIG. 43 shows transmission electron microscope photographs of a mixture of 100 parts by weight of calcium hydroxide as the carbon dioxide-absorbing substance, 1 part by weight of calcium 12-hydroxystearate as the dispersion aid and 20 parts by weight of ion exchange water as the dispersion solvent, which is subjected to an ultrasonic irradiation treatment under a condition of 60° C. with an ultrasonic wave having a frequency of 40 KHz and an intensity of each of 50 W, 75 W, 300 W, 600 W and 700 W for 30 minutes.

The respective mixtures after the ultrasonic irradiation treatment at the respective intensities are compared. In the mixture after the dispersion treatment with the ultrasonic wave irradiation at an intensity of 50 W, the particle size of the carbon dioxide-absorbing substance is about 1 µm, and the carbon dioxide-absorbing substance in the mixture after the treatment is aggregated without being dispersed (see FIG. 43(a)). On the contrary, in the mixture after the dispersion treatment at the ultrasonic wave irradiation at an intensity of 75 W, the particle size of the carbon dioxide-absorbing substance is about 150 nm, and the carbon dioxide-absorbing substance in the mixture is uniformly dispersed (see FIG. 43(b)).

In addition, regarding the mixtures after the ultrasonic wave irradiation at an intensity of 300 W and an intensity of 600 W, the particle size of the carbon dioxide-absorbing substance is about 80 nm in both cases, and high dispersibility is achieved (see FIGS. 43(c) and (d)). However, in the ultrasonic wave irradiation at an intensity of 700 W, the particle size of the carbon dioxide-absorbing substance becomes about 1 µm, and the carbon dioxide-absorbing substance is found to be aggregated (see FIG. 43(e)).

From this, an ultrasonic wave irradiation at an intensity of 75 W to 600 W is preferable in the ultrasonic irradiation treatment. An ultrasonic wave irradiation at an intensity below the range does not impart a sufficient dispersion effect, and on the contrary, an ultrasonic wave irradiation at an intensity above the range makes the function of the dispersion aid lost and thus is not preferable.

In addition, in the stirring treatment, the mixture of the carbon dioxide-absorbing substance and the dispersion aid is stirred at a rotation speed of 1,000 rpm to 20,000 rpm to thereby enhance dispersibility of the carbon dioxide-absorbing substance.

Figure 44:
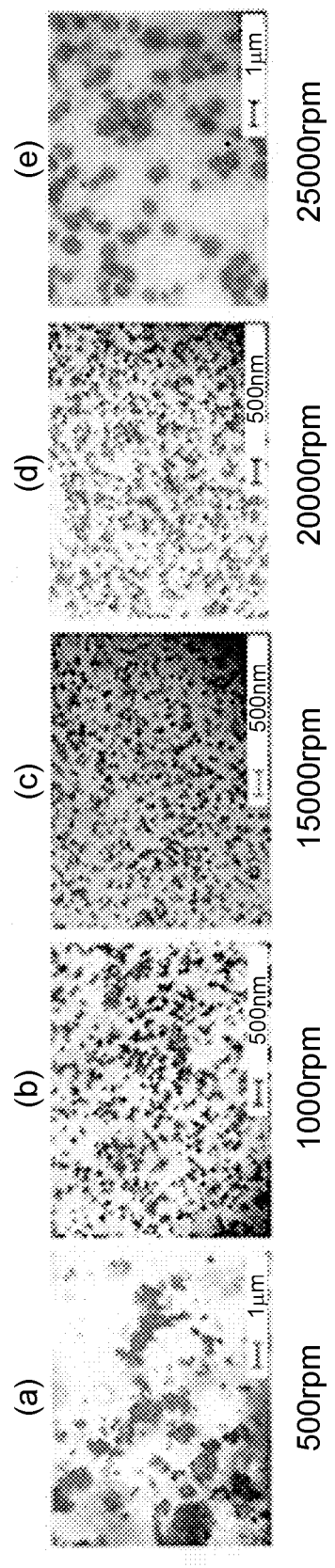
FIG. 44 shows transmission electron microscope photographs indicating dispersibility of a carbon dioxide-absorbing substance in a dispersion aid in the case where a stirring treatment is performed.

Herein, FIG. 44 shows transmission electron microscope photographs of a mixture of 100 parts by weight of calcium hydroxide as the carbon dioxide-absorbing substance, 1 part by weight of calcium 12-hydroxystearate as the dispersion aid and 20 parts by weight of ion exchange water as the dispersion solvent, which is subjected to a stirring treatment under a condition of 60° C. at a rotation speed of each of 500 rpm, 1,000 rpm, 15,000 rpm, 20,000 rpm and 25,000 rpm for 30 minutes.

The respective mixtures after the stirring treatment at the respective rotation speeds are compared. In the mixture after the stirring treatment at a rotation speed of 500 rpm, variation in the particle size of the carbon dioxide-absorbing substance is observed with the larger particle size being 3 µm or more, and the carbon dioxide-absorbing substance in the mixture is aggregated without being dispersed (see FIG. 44(a)). On the contrary, in the mixture after the stirring treatment at a rotation speed of 1,000 rpm, the particle size of the carbon dioxide-absorbing substance is about 100 nm, and the carbon dioxide-absorbing substance in the mixture is uniformly dispersed (see FIG. 44(b)).

In addition, regarding the mixtures after the stirring treatment at rotation speeds of 15,000 rpm and 20,000 rpm, the particle size of the carbon dioxide-absorbing substance is about 60 nm in both cases, and high dispersibility is achieved (see FIGS. 44(c) and (d)). However, in the mixture after the stirring treatment at a rotation speed of 25,000 rpm, the particle size of the carbon dioxide-absorbing substance becomes about 0.8 nm, and the carbon dioxide-absorbing substance is found to be aggregated (see FIG. 44(e)).

From this, a stirring treatment at a rotation speed of 1,000 rpm to 20,000 rpm is preferable. A stirring treatment at a rotation speed below the range does not result in sufficient dispersion due to an unsatisfactory rotation speed, thereby aggregating the carbon dioxide-absorbing substance. On the contrary, a stirring treatment at a rotation speed above the range prevents the surface of the carbon dioxide-absorbing substance from being covered with the dispersion aid, thereby aggregating the carbon dioxide-absorbing substance, and thus is not preferable.

The resin in e present invention may be any one that is commonly used. For example, a polyolefin-based resin, a polyester-based resin, a polyamide-based resin, a polyvinylchloride-based resin, and a polystyrene-based resin are preferable.

In order to produce the carbon dioxide absorbent by the above component and dispersion treatment, the following procedure may be adopted.

First, the carbon dioxide-absorbing substance and the dispersion aid are mixed with water or an organic solvent, and the mixture is subjected to any of the supercritical fluid treatment, the ultrasonic irradiation treatment and the stirring treatment to produce a carbon dioxide-absorbing substance dispersion liquid. Herein, if the carbon dioxide-absorbing substance is uniformly dispersed, the mixture has transparency.

A mixing ratio of the dispersion aid to 100 parts by weight of the carbon dioxide-absorbing substance is preferably 0.1 to 10 parts by weight. The mixing ratio of the dispersion aid is most preferably 0.1 to 5 parts by weight.

The reason for the ranges is because if the amount of the dispersion aid added to the carbon dioxide-absorbing substance is smaller than the ranges, the carbon dioxide-absorbing substance is not sufficiently dispersed in the carbon dioxide-absorbing substance dispersion liquid which is a mixture to be produced. Eventually, the dispersibility of the carbon dioxide-absorbing substance in the resin to be mixed is deteriorated, and the amount of carbon dioxide absorbed is made smaller.

In addition, the reason for the ranges is because if the amount added is larger than the ranges, a carbon dioxide-absorbing substance dispersion liquid having the carbon dioxide-absorbing substance in a sufficient concentration is not obtained, and the amount added becomes larger in order to satisfy the required concentration of the carbon dioxide-absorbing substance dispersant added to the resin, thereby making kneading difficult.

In the case where the supercritical fluid treatment is performed, it is preferably performed at a temperature of 7.37 MPa or more for 1 minute to 12 hours while the mixture being warmed to a temperature of 30.98° C. or higher under carbon dioxide, and most preferably at a temperature of 60° C. to 120° C. for 10 minutes to 1 hour.

Figure 45:
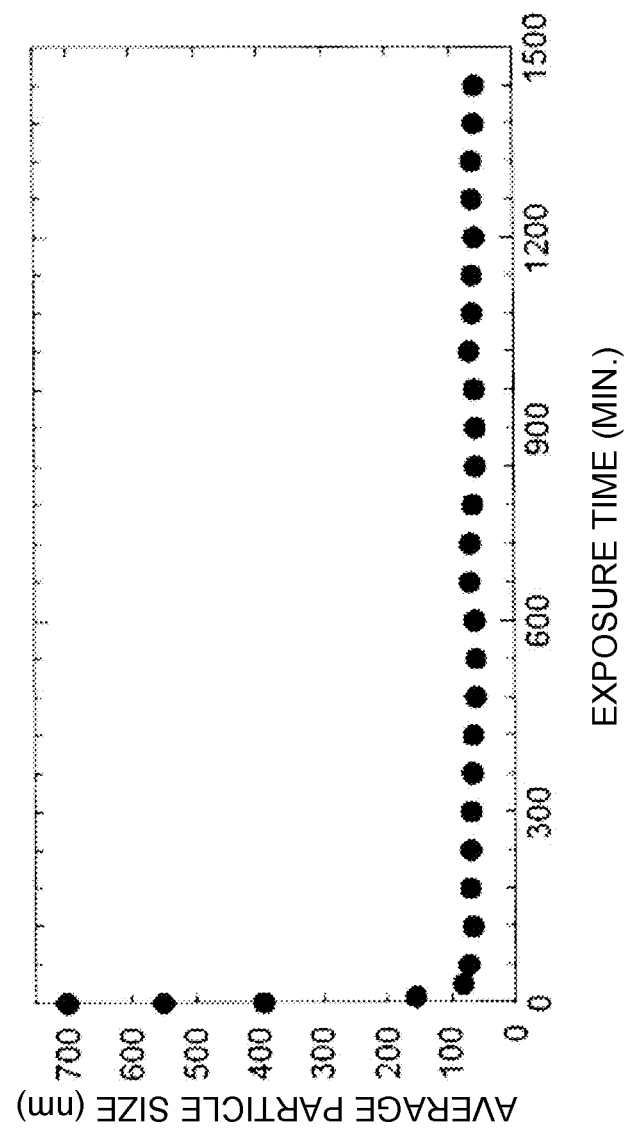
FIG. 45 shows a relationship between the exposure time and the average particle size of the carbon dioxide-absorbing substance in the supercritical fluid treatment.

Herein, a particle size distribution measurement is performed at the exposure times in the supercritical fluid treatment at a treatment temperature of 60° C. and a treatment pressure of 20 MPa, and the results are used to calculate an average particle size at each exposure time. FIG. 45 shows a relationship between the exposure time and the average particle size obtained from the results.

In the case where the exposure time is shorter than 10 minutes, that is, the cases where the exposure time of 0.1 minutes, 0.5 minutes and 1 minute, dispersibility of the carbon dioxide-absorbing substance to the dispersion aid is insufficient to cause aggregation, and the average particle size of the carbon dioxide-absorbing substance is found to be as large as about 400 nm to about 700 nm. In the case where the exposure time is longer than 1 hour, that is, the cases where the exposure time of 2 hours to 24 hours, there is hardly observed a difference in average particle size from the case of the exposure time of 1 hour.

In the case where the ultrasonic irradiation treatment is performed, the mixture is preferably irradiated with an ultrasonic wave having a frequency of 15 KHz to 60 KHz and an intensity of about 75 W to 600 W under a condition of 40° C. to 80° C. for a period of 5 minutes to 60 minutes, most preferably an ultrasonic wave having a frequency of 40 KHz and an intensity of 300 W for 30 minutes.

Figure 46:
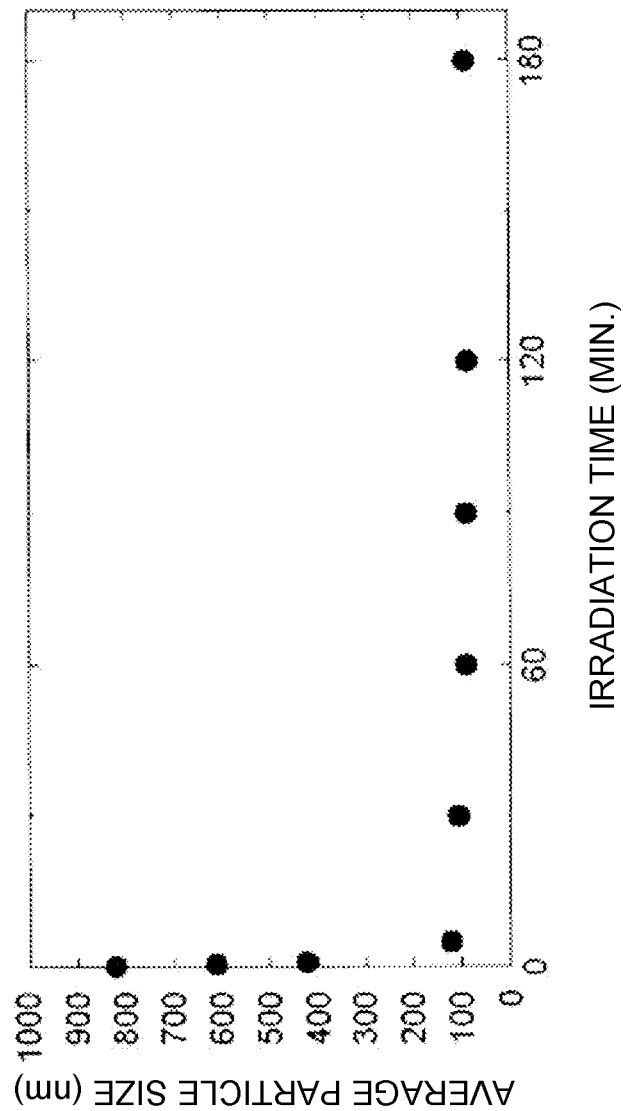
FIG. 46 shows a relationship between the irradiation time and the average particle size of the carbon dioxide-absorbing substance in the ultrasonic irradiation treatment.

Herein, a particle size distribution measurement is performed at the irradiation times in the ultrasonic irradiation treatment with an ultrasonic wave having a frequency of 40 KHz and an intensity of 300 W under a condition of 60° C., and the results are used to calculate an average particle size at each irradiation time. FIG. 46 shows a relationship between the irradiation time and the average particle size obtained from the results.

In the case where the irradiation time is shorter than 5 minutes, that is, the cases where the irradiation time of 0.1 minutes, 0.5 minutes and 1 minute, dispersibility of the carbon dioxide-absorbing substance to the dispersant is insufficient to cause aggregation, and the average particle size of the carbon dioxide-absorbing substance is found to be as large as about 400 nm to about 800 nm. In the case where the irradiation time is longer than 60 minutes, that is, the cases where the irradiation time of 90 minutes, 120 minutes and 180 minutes, there is hardly observed a difference in average particle size from the case of the irradiation time of 60 minutes.

In the case where the stirring treatment is performed, the mixture is preferably stirred under a temperature condition of about 40° C. to 80° C. at a rotation speed of about 1,000 rpm to 20,000 rpm for a period of 5 minutes to 60 minutes, most preferably under a temperature of 60° C. at a rotation speed of 15,000 rpm for 30 minutes.

Figure 47:
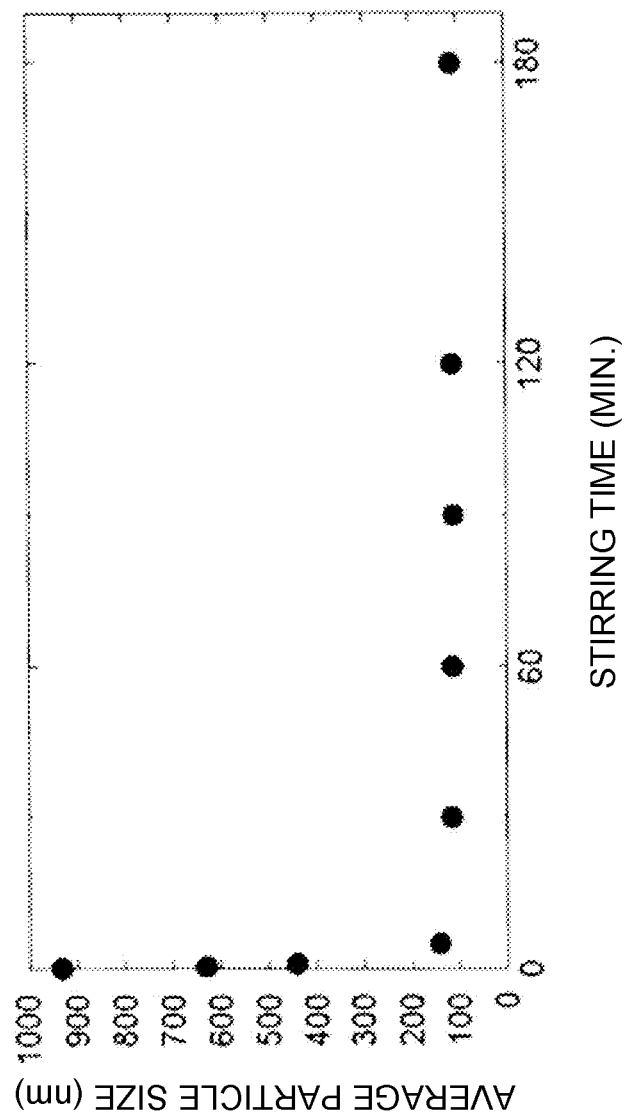
FIG. 47 shows a relationship between the stirring time and the average particle size of the carbon dioxide-absorbing substance in the stirring treatment.

Herein, a particle size distribution measurement is performed at the stirring times in the stirring treatment at 60° C. and a rotation speed of 15000 rpm, and the results are used to calculate an average particle size at each stirring time. FIG. 47 shows a relationship between the stirring time and the average particle size obtained from the results.

In the case where the stirring time is shorter than 5 minutes, that is, the cases where the stirring time of 0.1 minutes, 0.5 minutes and 1 minute, dispersibility of the carbon dioxide-absorbing substance to the dispersant is insufficient to cause aggregation, and the average particle size of the carbon dioxide-absorbing substance is found to be as large as about 400 nm to about 900 nm. In the case where the stirring time is longer than 60 minutes, that is, the cases where the stirring time of 90 minutes, 120 minutes and 180 minutes, there is hardly observed a difference in average particle size from the case of the stirring time of 30 minutes.

Figure 48:
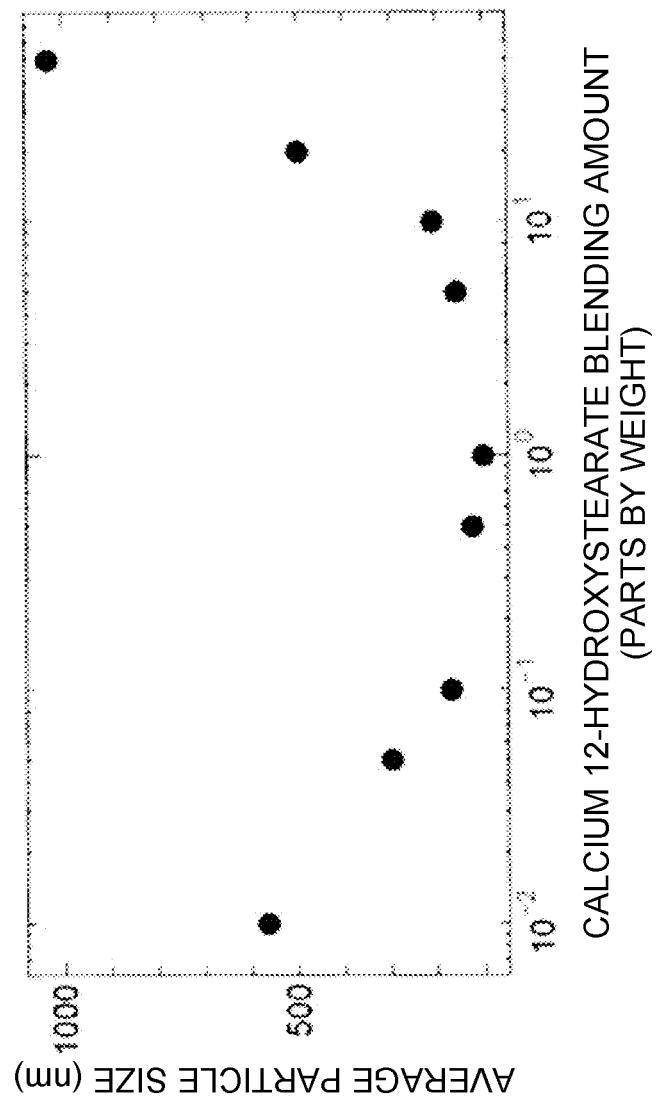
FIG. 48 shows a relationship between the amount of the dispersion aid blended and the average particle size of the carbon dioxide-absorbing substance.

In addition, calcium 12-hydroxystearate as the dispersion aid is blended with 100 parts by weight of calcium hydroxide as the carbon dioxide-absorbing substance and 20 parts by weight of ion exchange water while the amount thereof varying in amounts of 50, 20, 10, 5, 1, 0.5, 0.1, 0.05 and 0.01 parts by weight, and the resultant is subjected to the supercritical fluid treatment at a treatment temperature of 60° C. and a treatment pressure of 20 MPa for 15 minutes. FIG. 48 shows a relationship between the amount of the dispersion aid blended and the average particle size of the carbon dioxide-absorbing substance.

When the amount of the dispersion aid is 50 parts by weight, the average particle size is 1 μm or more, and the carbon dioxide-absorbing substance is aggregated. When the amount of the dispersion aid is 20 parts by weight or less, the average particle size of the carbon dioxide-absorbing substance is gradually reduced, and is the most smallest in an amount of 1 part by weight.

Thereafter, the average particle size becomes larger again and is about 500 nm in an amount of 0.01 parts by weight, and the carbon dioxide-absorbing substance aggregates.

From this, the dispersion aid is preferably added to 100 parts by weight of carbon dioxide-absorbing substance in an amount of 0.1 to 5 parts by weight.

Figure 49:
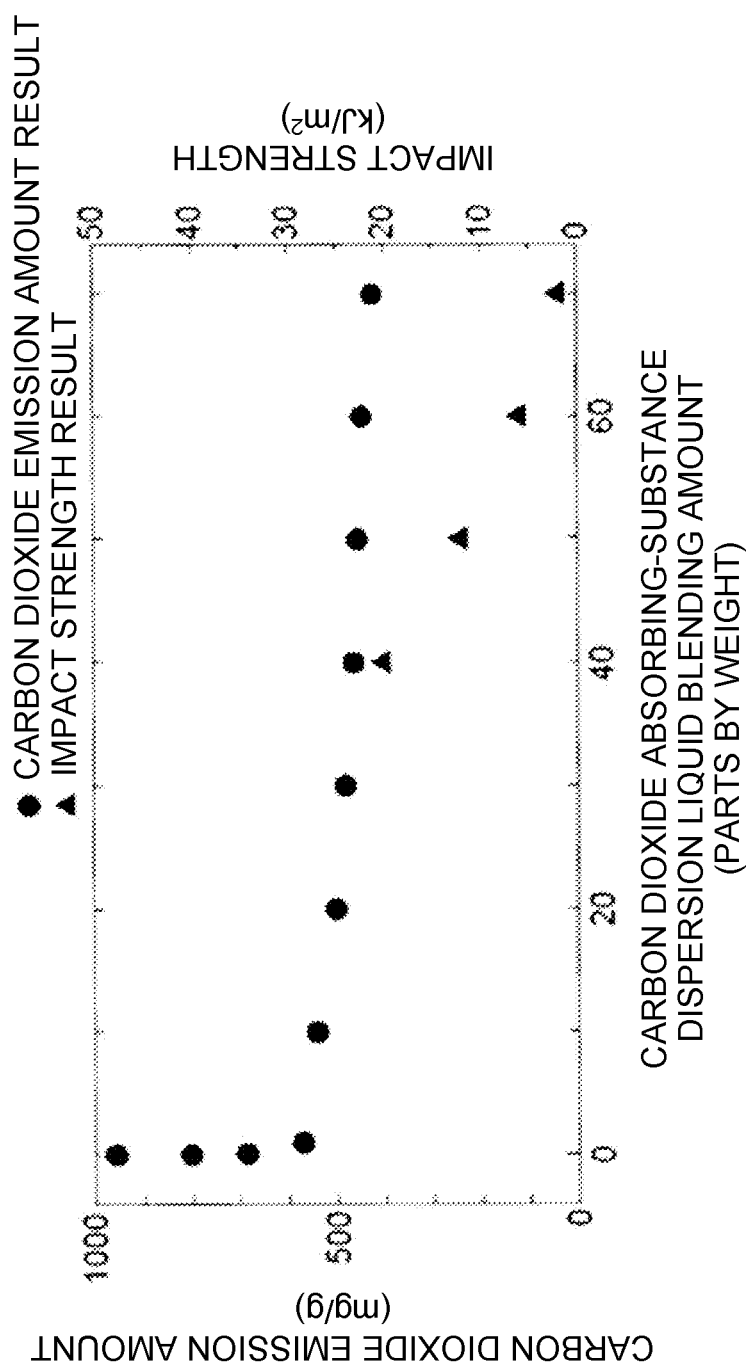
FIG. 49 shows a relationship between the amount of a carbon dioxide-absorbing substance dispersion liquid blended as well as the carbon dioxide emission amount and impact strength.

In addition, 100 parts by weight of calcium hydroxide as the carbon dioxide-absorbing substance, 1 part by weight of calcium 12-hydroxystearate as the dispersion aid, and 20 parts by weight of ion exchange water as the dispersion medium are subjected to the supercritical fluid treatment at a treatment temperature of 60° C. and a treatment pressure of 20 MPa for 15 minutes to obtain a carbon dioxide-absorbing substance dispersion liquid, the carbon dioxide-absorbing substance dispersion liquid is mixed with 100 parts by weight of a low-density polyethylene as the resin in an amount of each of 0.001, 0.01, 0.1, 1, 10, 20, 30, 40, 50, 60 and 70 parts by weight to obtain a carbon dioxide-absorbing substance dispersion liquid of the carbon dioxide absorbent. FIG. 49 shows a relationship between the amount of the carbon dioxide-absorbing substance dispersion liquid blended and the impact strength, and a relationship between the carbon dioxide-absorbing substance dispersion liquid blended and the carbon dioxide emission amount.

It is confirmed in FIG. 49 that when the amounts of the carbon dioxide-absorbing substance dispersion liquid blended are 0.001, 0.01, 0.1, 1, 10, 20 and 30 parts by weight, the carbon dioxide absorbent has such strength as not to break in a tensile impact strength test.

The impact strength is reduced as the amount of the carbon dioxide-absorbing substance dispersion liquid blended is increased, resulting in breaking at 20 kJ/m2 in an amount of 40 parts by weight, at 12 kJ/m2 in an amount of 50 parts by weight, at 6 kJ/m2 in an amount of 60 parts by weight, and at 2 kJ/m2 in an amount of 70 parts by weight.

On the contrary, the carbon dioxide emission amount is reduced and exhibits a good value, as the amount of the carbon dioxide-absorbing substance dispersion liquid blended is increased.

From this, in order to obtain a carbon dioxide absorbent good in impact strength and excellent in carbon dioxide emission reduction amount, the carbon dioxide-absorbing substance dispersion liquid is preferably added in an amount of 0.1 to 40 parts by weight to 100 parts by weight of the resin.

Each of various carbon dioxide-absorbing substance dispersion liquids obtained by the above operation is added to the resin while being spayed at a rate of about 100 ml/min, and stirred by a mixer for about 15 minutes to obtain a mixture. Thereafter, the mixture can be kneaded by a twin-screw extruder, a single-screw extruder, a heating-type triple roll, a heating pressure kneader, a Banbury mixer, or the like with a usual method, thereby obtaining a pellet of the carbon dioxide absorbent of the present invention.

Hereinafter, the present invention is described with reference to Production Examples in more detail. It is to be noted that the present invention is not limited to these Production Examples at all.

Production Example 1

A high-pressure stainless vessel kept at 60° C. was charged with 100 parts by weight of calcium hydroxide as the carbon dioxide-absorbing substance, 1 part by weight of calcium 12-hydroxystearate as the dispersion aid and 20 parts by weight of ion exchange water and sealed, and a supercritical treatment, in which carbon dioxide was injected so that the pressure was 20 MPa to be made in a supercritical state, the content of the vessel was stirred and mixed for 15 minutes while the temperature and pressure being kept, and carbon dioxide was discharged to return to atmospheric pressure, was performed, thereby obtaining a carbon dioxide-absorbing substance dispersion liquid. Then, a stirring treatment was performed by a mixer for 15 minutes while 30 parts by weight of the carbon dioxide-absorbing substance dispersion liquid were being sprayed to 100 parts by weight of a low density polyethylene resin (Moretec 0168N produced by Prime Polymer Co., Ltd.,) at a rate of 100 ml/min. The resultant was dried in vacuum to remove a water content, and kneaded by a twin-screw extruder having a screw inner diameter of 30 mm, thereby obtaining a pellet-like carbon dioxide absorbent.

In addition, a resin composition obtained by performing the entire process in Production Example 1 except for the supercritical treatment process was referred to as Comparative Production Example 1.

Production Example 2

The supercritical treatment in Production Example 1 was performed with calcium hydroxide as the carbon dioxide-absorbing substance being changed to calcium oxide, and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 2 except for the supercritical treatment process was referred to as Comparative Production Example 2.

Production Example 3

The supercritical treatment in Production Example 1 was performed with calcium hydroxide as the carbon dioxide-absorbing substance being changed to amorphous aluminosilicate, and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 3 except for the supercritical treatment process was referred to as Comparative Production Example 3.

Production Example 4

The supercritical treatment in Production Example 1 was performed with calcium hydroxide as the carbon dioxide-absorbing substance being changed to barium titanate, and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 4 except for the supercritical treatment process was referred to as Comparative Production Example 4.

Production Example 5

The supercritical treatment in Production Example 1 was performed with calcium hydroxide as the carbon dioxide-absorbing substance being changed to lithium silicate, and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 5 except for the supercritical treatment process was referred to as Comparative Production Example 5.

Production Example 6

The supercritical treatment in Production Example 1 was performed with calcium 12-hydroxystearate (metal salt of fatty acid) as the dispersion aid being changed to phosphatidylcholine (amphiphilic lipid), and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 6 except for the supercritical treatment process was referred to as Comparative Production Example 6.

Production Example 7

The supercritical treatment in Production Example 1 was performed with calcium 12-hydroxystearate (metal salt of fatty acid) as the dispersion aid being changed to an olefin/maleic acid copolymer sodium salt (polymeric surfactant), and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 7 except for the supercritical treatment process was referred to as Comparative Production Example 7.

Production Example 8

The supercritical treatment in Production Example 3 was performed with calcium 12-hydroxystearate (metal salt of fatty acid) as the dispersion aid being changed to phosphatidylcholine (amphiphilic lipid), and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 8 except for the supercritical treatment process was referred to as Comparative Production Example 8.

Production Example 9

The supercritical treatment in Production Example 3 was performed with calcium 12-hydroxystearate (metal salt of fatty acid) as the dispersion aid being changed to sodium polyacrylate (polymeric surfactant), and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 9 except for the supercritical treatment process was referred to as Comparative Production Example 9.

Production Example 10

The supercritical treatment in Production Example 1 was performed with calcium 12-hydroxystearate (metal salt of fatty acid) as the dispersion aid being changed to a polyoxyethylene-type gemini surfactant, POE30-10-ODES (polymeric surfactant), and the obtained carbon dioxide-absorbing substance dispersion liquid was added to a low density polyethylene resin, thereby obtaining a pellet-like carbon dioxide absorbent.

In addition, a resin composition obtained by performing the entire process in Production Example 10 except for the supercritical treatment process was referred to as Comparative Production Example 10.

Production Example 11

The carbon dioxide-absorbing substance dispersion liquid obtained after the supercritical treatment in Production Example 1 was added to a PET resin (A-PET FR produced by Teijin Chemicals Ltd.) to obtain a pellet-like carbon dioxide absorbent.

In addition, a resin composition obtained by performing the entire process in Production Example 11 except for the supercritical treatment process was referred to as Comparative Production Example 11.

Production Example 12

The carbon dioxide-absorbing substance dispersion liquid obtained after the supercritical treatment in Production Example 1 was added to a nylon 6 resin (Amilan CM1017 produced by Toray Industries, Inc.) to obtain a pellet-like carbon dioxide absorbent.

In addition, a resin composition obtained by performing the entire process in Production Example 12 except for the supercritical treatment process was referred to as Comparative Production Example 12.

Production Example 13

The carbon dioxide-absorbing substance dispersion liquid obtained after the supercritical treatment in Production Example 1 was added to a PVC resin (SE-1100 produced by Sunarrow Kasei Co., Ltd.) to obtain a pellet-like carbon dioxide absorbent.

In addition, a resin composition obtained by performing the entire process in Production Example 13 except for the supercritical treatment process was referred to as Comparative Production Example 13.

Production Example 14

The carbon dioxide-absorbing substance dispersion liquid obtained after the supercritical treatment in Production Example 1 was added to a PS resin (HIPS 475D produced by PS Japan Corporation) to obtain a pellet-like carbon dioxide absorbent.

In addition, a resin composition obtained by performing the entire process in Production Example 14 except for the supercritical treatment process was referred to as Comparative Production Example 14.

Production Example 15

A glass vessel was charged with 100 parts by weight of calcium hydroxide as the carbon dioxide-absorbing substance, 1 part by weight of calcium 12-hydroxystearate as the dispersion aid and 20 parts by weight of ion exchange water, and under a condition of 60° C., an ultrasonic irradiation treatment, in which an ultrasonic wave having a frequency of 40 KHz and an output of 300 W was radiated by an ultrasonic homogenizer for 15 minutes, was performed, thereby obtaining a carbon dioxide-absorbing substance dispersion liquid. Then, a stirring treatment was performed by a mixer for 15 minutes while 30 parts by weight of the carbon dioxide-absorbing substance dispersion liquid were being sprayed to 100 parts by weight of a low density polyethylene resin at a rate of 100 ml/min. The resultant was dried in vacuum to remove a water content, and kneaded by a twin-screw extruder having a screw inner diameter of 30 mm, thereby obtaining a pellet-like carbon dioxide absorbent.

In addition, a resin composition obtained by performing the entire process in Production Example 15 except for the ultrasonic irradiation treatment process was referred to as Comparative Production Example 15. Herein, Comparative Production Example 15 is the same as Comparative Production Example 1.

Production Example 16

The ultrasonic irradiation treatment in Production Example 15 was performed on a mixture obtained by mixing amorphous aluminosilicate as the carbon dioxide-absorbing substance and phosphatidylcholine (amphiphilic lipid) as the dispersion aid, and the obtained carbon dioxide-absorbing substance dispersion liquid was subjected to the same method as in Production Example 15 to obtain a pellet-like resin for achieving reduction in carbon dioxide emission amount.

In addition, a resin composition obtained by performing the entire process in Production Example 16 except for the ultrasonic irradiation treatment process was referred to as Comparative Production Example 16. Herein, Comparative Production Example 16 is the same as Comparative Production Example 8.

Production Example 17

A stainless vessel was charged with 100 parts by weight of calcium hydroxide as the carbon dioxide-absorbing substance, 1 part by weight of calcium 12-hydroxystearate as the dispersion aid and 20 parts by weight of ion exchange water, and under a condition of 60° C., the stainless vessel was set to a stirring machine (CLEARMIX CLM-0.8S manufactured by M Technique Co., Ltd.) to perform a stirring treatment at a rotation number of 10,000 rpm for 30 minutes, thereby obtaining a carbon dioxide-absorbing substance dispersion liquid. Then, a stirring treatment was performed by a mixer for 15 minutes while 30 parts by weight of the carbon dioxide-absorbing substance dispersion liquid being sprayed to 100 parts by weight of a low density polyethylene resin at a rate of 100 ml/min. The resultant was dried in vacuum to remove a water content, and kneaded by a twin-screw extruder having a screw inner diameter of 30 mm, thereby obtaining a pellet-like carbon dioxide absorbent.

In addition, a resin composition obtained by performing the entire process in Production Example 17 except for the stirring treatment process was referred to as Comparative Production Example 17. Herein, Comparative Production Example 17 is the same Comparative Production Example 1.

Production Example 18

The stirring treatment in Production Example 17 was performed on a mixture obtained by mixing amorphous aluminosilicate as the carbon dioxide-absorbing substance and phosphatidylcholine (amphiphilic lipid) as the dispersion aid, and the obtained carbon dioxide-absorbing substance dispersion liquid was subjected to the same method as in Production Example 17 to obtain a pellet-like resin for achieving reduction in carbon dioxide emission amount.

In addition, a resin composition obtained by performing the entire process in Production Example 18 except for the stirring treatment process was referred to as Comparative Production Example 18. Herein, Comparative Production Example 18 is the same as Comparative Production Example 8.

Production Example 19

A stainless vessel was charged with 100 parts by weight of a coconut mesocarp fiber as the carbon dioxide-absorbing substance of the organic compound, 1 part by weight of calcium 12-hydroxystearate as the dispersion aid and 20 parts by weight of ion exchange water, and under a condition of 60° C., the stainless vessel was set to a stirring machine (CLEARMIX CLM-0.8S manufactured by M Technique Co., Ltd.) to perform a stirring treatment at a rotation number of 10,000 rpm for 30 minutes, thereby obtaining a carbon dioxide-absorbing substance dispersion liquid. Then, a stirring treatment was performed by a mixer for 15 minutes while 30 parts by weight of the carbon dioxide-absorbing substance dispersion liquid being sprayed to 100 parts by weight of a low density polyethylene resin (Moretec 0168N produced by Prime Polymer Co., Ltd.,) at a rate of 100 ml/min. The resultant was dried in vacuum to remove a water content, and kneaded by a twin-screw extruder having a screw inner diameter of 30 mm, thereby obtaining a pellet-like carbon dioxide absorbent.

In addition, a resin composition obtained by performing the entire process in Production Example 19 except for the stirring treatment process was referred to as Comparative Production Example 19.

Evaluations for the carbon dioxide absorbents in Production Example 1 to Production Example 19 and resin compositions in Comparative Production Example 1 to Comparative Production Example 19 were performed by tensile impact strength measurement (method described in JISK7160), Tensile Yield Stress Measurement (method described in JISK7161), bending elastic modulus measurement (method described in JISK7171), and carbon dioxide emission amount measurement (method described in JISK7217). Specific evaluation methods are described hereafter.

Evaluation Methods
(Impact Strength Measurement)
A digital impact tester, DR-IB tester (manufactured by Toyo Seiki Seisaku-sho, Ltd.) was used for measurement.

In accordance with the material standards regulated by JIS standards, each of the pellet-like carbon dioxide absorbents of Production Example 1 to Production Example 19 and the resin compositions of Comparative Production Example 1 to Comparative Production Example 19 was directly molded by injection molding to prepare a notched sheet-shaped test piece having a length of 80 mm, a width of 10 mm and a thickness of 4 mm, or once molded by compression molding or injection molding into a sheet material and then the sheet material was processed by cutting to prepare a test piece having the dimension. Measurement was performed by fixing one end of the test piece to a gripping tool fixed to a base, and the other end thereof to a movable cross-head support base, respectively, and striking the cross-head support base with a striker having any weight at an impact speed of 3.46 m/s. The measurement was performed 10 times for each case.

(Tensile Yield Stress Measurement)
A strograph HT tester (manufactured by Toyo Seiki Seisaku-sho, Ltd.) was used for measurement.

In accordance with the material standards regulated by JIS standards, each of the pellet-like carbon dioxide absorbents of Production Example 1 to Production Example 19 and the resin compositions of Comparative Production Example 1 to Comparative Production Example 19 was directly molded by injection molding to prepare a dumbbell-shaped sheet-shaped test piece having a parallel section measuring 20 mm×5 mm and having a length of 100 mm, a width of 25 mm and a thickness of 4 mm, or once molded by compression molding or injection molding into a sheet material and then the sheet material was processed by cutting to prepare a test piece having the dimension. Measurement was performed by fixing both ends of the test piece and applying constant tensile weight in the length direction of the test piece to measure stress at each point and strain corresponding to the stress, thereby determining yield stress at a yield point from a stress-strain curve. The measurement was performed 5 times for each case.

(Bending Elastic Modulus Measurement)
A bend graph-2 tester (manufactured by Toyo Seiki Seisaku-sho, Ltd.) was used for measurement.

In accordance with the material standards regulated by JIS standards, each of the pellet-like carbon dioxide absorbents of Production Example 1 to Production Example 19 and the resin compositions of Comparative Production Example 1 to Comparative Production Example 19 was directly molded by injection molding to prepare a sheet-shaped test piece having a length of 80 mm, a width of 10 mm and a thickness of 4 mm, or once molded by compression molding or injection molding into a sheet material and then the sheet material was processed by cutting to prepare a test piece having the dimension. Measurement was performed by free-supporting both ends of the test piece at a fulcrum interval of 64 mm, and applying bending weight (testing stress) to the center between the fulcrums by a pressurizing wedge to measure breaking stress and deflection. The measurement was performed 5 times for each case.

(Carbon Dioxide Emission Amount Measurement)
A plastic flammability tester (manufactured by Sugiyama-Gen Co., Ltd.) was used for measurement.

The test piece weighing 0.1 g resulted from each of the carbon dioxide absorbents of Production Example 1 to Production Example 19 and the resin compositions of Comparative Production Example 1 to Comparative Production Example 19 was used for a specimen. Measurement was performed by burning 0.1 g of the specimen under conditions of a gas feeding rate of 0.5 L/min and a setting temperature of 750° C. for 10 minutes to measure the total emission amount of carbon dioxide generated in this time. The measurement was performed 3 times for each case.

FIG. 35 shows the evaluation results for the carbon dioxide emission amount, the tensile yield stress, the bending elastic modulus and the tensile impact strength of each Production Example, and FIG. 36 shows the evaluation results for the carbon dioxide emission amount, the tensile yield stress, the bending elastic modulus and the tensile impact strength of each Comparative Production Example, respectively. Each of the evaluation results was indicated as an average value in relation to the number of the measurement times.

Regarding to all combinations of the carbon dioxide-absorbing substance, the dispersion aid and the resin, the carbon dioxide emission amount is found to be significantly reduced in each Production Example where the mixture of the carbon dioxide-absorbing substance and the dispersion aid was subjected to the dispersion treatment, as compared with that in each Comparative Production Example where no dispersion treatment was performed.

In addition, favorable values are indicated in each Production Example for mechanical properties such as tensile yield stress, bending elastic modulus and tensile impact strength, as compared with values in each Comparative Production Example.

Furthermore, it has been confirmed that when the mechanical strength in each Production Example is compared with the mechanical strength of the simple resin used in each Production Example as 100%, it is as sufficient as 90 to 70% in most of Production Examples. Although the mechanical strength is inferior in some Production Examples, the carbon dioxide absorbents of such Production Examples may be used for applications in which such a load is not applied.

In order to describe the carbon dioxide emission amount reduction performance of the present invention in more detail, comparisons of the carbon dioxide emission amount on the type of the carbon dioxide-absorbing substance, the type of the dispersion aid, the type of the resin and the type of the dispersion treatment method are discussed below.

(Comparison of Carbon Dioxide Emission Amounts on Types of Carbon Dioxide-Absorbing Substances)

The reduction amounts of carbon dioxide emission were compared with respect to calcium hydroxide (Production Example 1 and Comparative Production Example 1), calcium oxide (Production Example 2 and Comparative Production Example 2), amorphous aluminosilicate (Production Example 3 and Comparative Production Example 3), barium titanate (Production Example 4 and Comparative Production Example 4), and lithium silicate (Production Example 5 and Comparative Production Example 5), as the carbon dioxide-absorbing substances.

Herein, calcium 12-hydroxystearate was used for the dispersion aid, and a low density polyethylene resin (LLDPE) was used for the resin.

Figure 37:
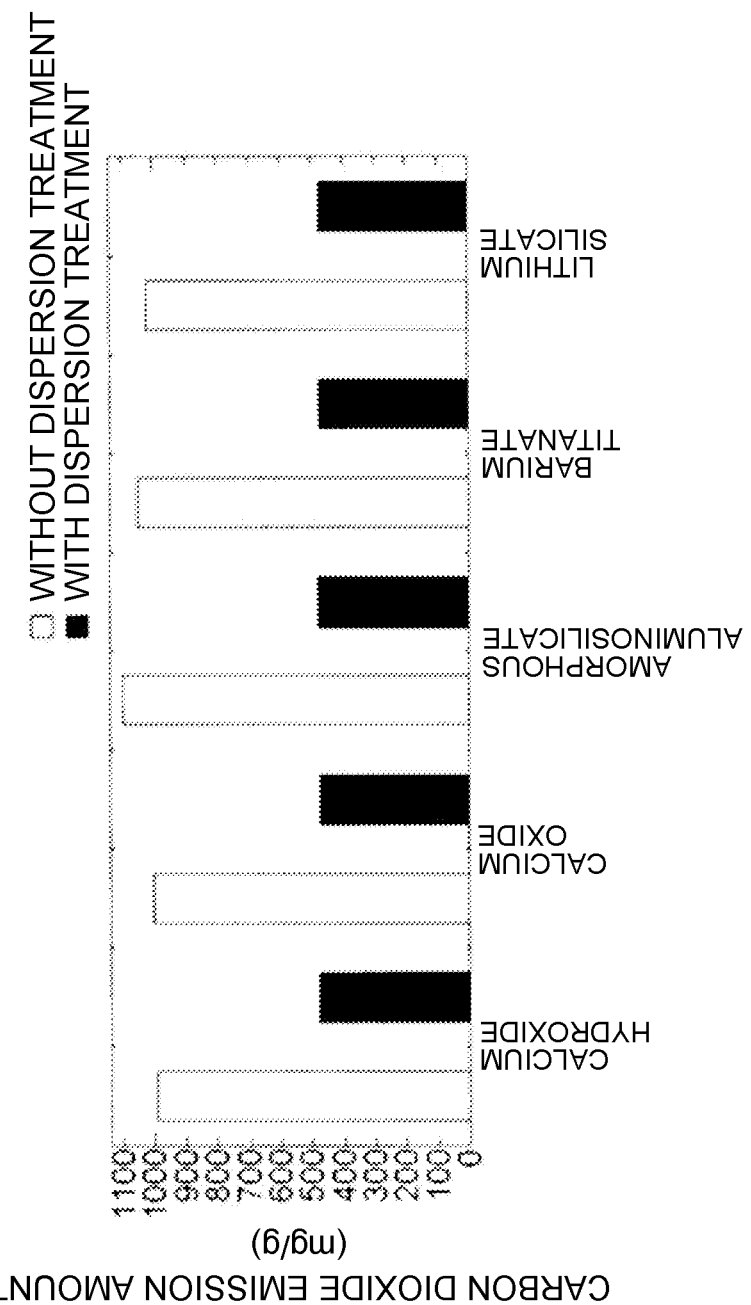
FIG. 37 is a comparison chart of carbon dioxide emission amounts in Production Examples with those in Comparative Production Examples on types of carbon dioxide-absorbing substances.

As shown in FIG. 37, regarding to all of the carbon dioxide-absorbing substances, significant reduction in carbon dioxide emission amount was observed. The reductions in emission amount realized were 51.6% in the case of calcium hydroxide, 52.5% in the case of calcium oxide, 56.4% in the case of amorphous aluminosilicate, 55.0% in the case of barium titanate, and 53.4% in the case of lithium silicate.

In particular, amorphous aluminosilicate being one aluminosilicate exhibited the most favorable result of 56.4%.

(Comparison of Carbon Dioxide Emission Amounts on Types of Dispersion Aids)

The reduction amounts of carbon dioxide emission were compared in the case where calcium hydroxide was used as the carbon dioxide-absorbing substance, with respect to calcium 12-hydroxystearate (Production Example 1 and Comparative Production Example 1), phosphatidylcholine (Production Example 6 and Comparative Production Example 6), an olefin/maleic acid copolymer sodium salt (Production Example 7 and Comparative Production Example 7), and POE30-10-ODES (Production Example 10 and Comparative Production Example 10), as the dispersion aids.

As shown in FIG. 38(a), regarding to all of the dispersion aids, significant reduction in carbon dioxide emission amount was observed. The reductions in carbon dioxide emission amount realized were 51.6% in the case of calcium 12-hydroxystearate, 52.5% in the case of phosphatidylcholine, 51.8% in the case of olefin/maleic acid copolymer sodium salt, and 53.8% in the case of POE30-10-ODES.

In particular, POE30-10-ODES being one polymeric surfactant exhibited the most favorable result of 53.8%.

Furthermore, the reduction amounts of carbon dioxide emission were compared in the case where amorphous aluminosilicate that exhibited the most favorable reduction amount in the comparison on the carbon dioxide-absorbing substances was used as the carbon dioxide-absorbing substance, with respect to calcium 12-hydroxystearate (Production Example 3 and Comparative Production Example 3), phosphatidylcholine (Production Example 8 and Comparative Production Example 8), and sodium polyacrylate (Production Example 9 and Comparative Production Example 9), as the dispersion aids.

As illustrated in FIG. 38(b), more favorable values were exhibited as a whole than the case of calcium hydroxide as the carbon dioxide-absorbing substance, and the reductions in emission amount realized were 56.4% in the case of calcium 12-hydroxystearate, 51.5% in the case of phosphatidylcholine, and 55.0% in the case of sodium polyacrylate.

In particular, calcium 12-hydroxystearate being metal salt of fatty acid exhibited the most favorable result of 56.4%.

The evaluation results indicate that while a few combinations of the carbon dioxide-absorbing substance and the dispersion aid are observed to be effective, in all of such combinations, there is seen no significant difference in the carbon dioxide emission amount based on combinations.

(Comparison of Carbon Dioxide Emission Amounts on Types of Resins)

The reduction amounts of carbon dioxide emission were compared in the case where, as a mixture of calcium hydroxide as the carbon dioxide-absorbing substance and calcium 12-hydroxystearate as the dispersion aid, a low density polyethylene resin (LLDPE) (Production Example 1 and Comparative Production Example 1), a PET resin (Production Example 11 and Comparative Production Example 11), a nylon 6 resin (Production Example 12 and Comparative Production Example 12), a polyvinylidene chloride resin (PVC) (Production Example 13 and Comparative Production Example 13), and a polystyrene resin (PS) (Production Example 14 and Comparative Production Example 14) were used.

Figure 39:
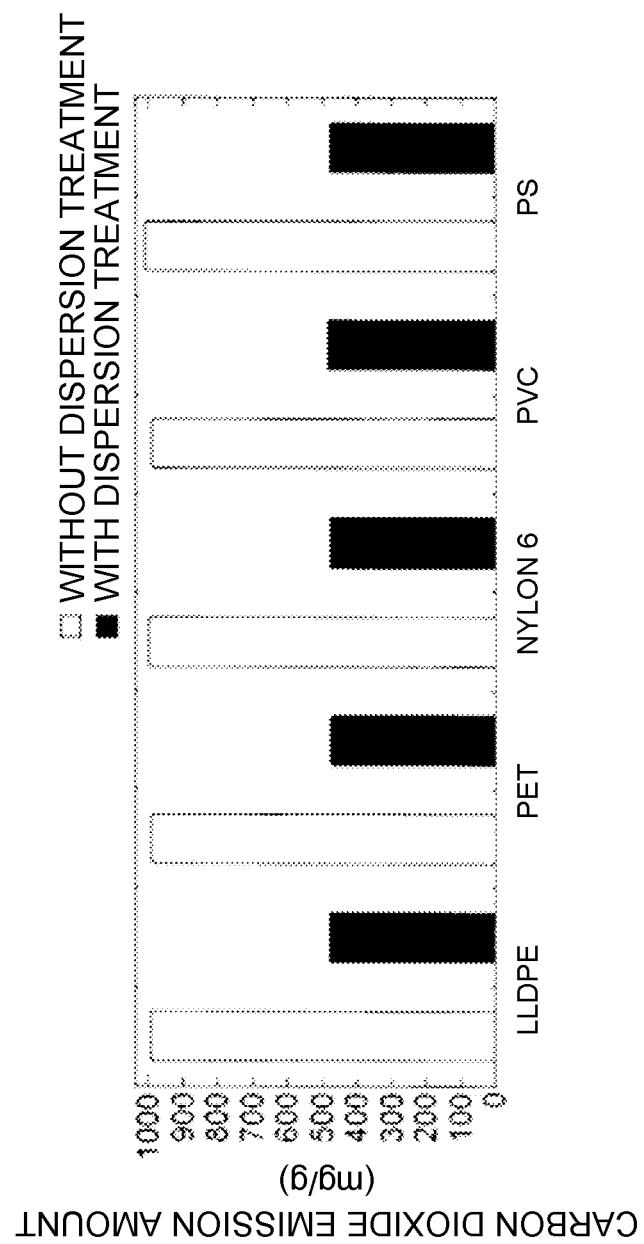
FIG. 39 gives a comparison of carbon dioxide emission amounts in Production Examples with those in Comparative Production Examples on types of resins.

As shown in FIG. 39, very little difference in effect based on the resins was observed. Regarding all the resins, significant reduction in carbon dioxide emission amount was observed. The reductions in emission amount realized were 51.6% in the case of LLDPE, 42.0% in the case of PET, 52.0% in the case of nylon 6, 51.3% in the case of PVC, and 52.5% in the case of PS.

(Comparison of Carbon Dioxide Emission Amounts on Types of Dispersion Treatment Methods)

The reduction amounts of carbon dioxide emission were compared in the case where to a mixture of calcium hydroxide as the carbon dioxide-absorbing substance and calcium 12-hydroxystearate as the dispersant was used, no dispersion treatment was performed (Comparative Production Example 1), the supercritical fluid treatment was performed (Production Example 1), the ultrasonic irradiation treatment was performed (Production Example 15), and the stirring treatment was performed (Production Example 17), as the dispersion treatment methods.

As shown in FIG. 40(a), regarding all the dispersion treatment methods, the carbon dioxide emission amount was reduced by about half as compared with the case where no dispersion treatment was performed. The reductions in emission amount realized were 51.6% in the case of supercritical fluid treatment, 51.6% in the case of ultrasonic irradiation treatment, and 51.9% in the case of stirring treatment.

Furthermore, the reduction amounts of carbon dioxide emission were compared in the case where to a mixture of amorphous aluminosilicate as the carbon dioxide-absorbing substance and phosphatidylcholine as the dispersion aid, no dispersion treatment was performed (Comparative Production Example 8), the supercritical fluid treatment was performed (Production Example 8), the ultrasonic irradiation treatment was performed (Production Example 16), and the stirring treatment was performed (Production Example 18), as the dispersion treatment methods.

As shown in FIG. 40(b), regarding all the dispersion treatment methods, the carbon dioxide emission amount was reduced by about half as compared with the case where no dispersion treatment was performed, as in the case where calcium hydroxide was used as the carbon dioxide-absorbing substance and calcium 12-hydroxystearate was used as the dispersant. The reductions in emission amount realized were 51.5% in the case of supercritical fluid treatment, 53.5% in the case of ultrasonic irradiation treatment, and 51.5% in the case of stirring treatment.

From this, regardless of the types of the dispersion treatment methods, extremely useful evaluation results were obtained in that by subjecting the mixture of the carbon dioxide-absorbing substance and the dispersion aid to the dispersion treatment to enhance dispersibility of the carbon dioxide-absorbing substance in the resin, the carbon dioxide emission amount of the obtained carbon dioxide absorbent was reduced by about 50%.

Since such a carbon dioxide absorbent of the present invention also has the inherent characteristics of resin, existing resin products are easily converted to the carbon dioxide absorbent, and therefore early effects of suppressing global warming can be realized.

It is to be noted that the carbon dioxide absorbent of the present invention is not limited to the above type and can be variously modified if necessary.

According to the carbon dioxide absorbent of the present invention, by subjecting the mixture of the carbon dioxide-absorbing substance and the dispersion aid to the dispersion treatment and then adding the mixture to the resin, the carbon dioxide absorbent can be dispersed in the resin while preventing the carbon dioxide-absorbing substance which is incompatible with the resin from aggregating in the resin. Thus, a high effect of absorbing carbon dioxide can be achieved.

In addition, since dispersibility can be enhanced so as to increase the surface area of the carbon dioxide-absorbing substance in contact with the resin, thereby achieving a high effect of absorbing carbon dioxide with small amount of the carbon dioxide-absorbing substance. Thus, the amount of the carbon dioxide-absorbing substance added to the resin can be reduced, thereby enabling to considerably extend applications without impairing the inherent characteristics of resin, such as lightness in weight and easiness in molding.

Furthermore, the carbon dioxide-absorbing substance added can be appropriately selected depending on applications to thereby produce a carbon dioxide absorbent light in weight and high in impact resistance.

The carbon dioxide absorbent for use in the present invention is preferably sodium aluminosilicate.

The sodium aluminosilicate is preferably encapsulated in a phospholipid.

The sodium aluminosilicate is preferably contained in a ribosome.

Hereinafter, Production Examples of the carbon dioxide absorbent especially suitable for the present invention is described.

Adjustment of Carbon Dioxide Absorbent

In 130 g of water were dissolved 6 g of sodium aluminate (produced by Wako Pure Chemical Industries Ltd., special grade) and 30 g of sodium silicate (produced by Wako Pure Chemical Industries Ltd., special grade), and stirred at 30° C. for 60 minutes. After the stirring, amorphous sodium aluminosilicate was produced by centrifugal separation.

Adjustment of NVC (liposome)

A liposome containing the amorphous sodium aluminosilicate (carbon dioxide absorbent) was prepared by a supercritical reverse phase evaporation method and an apparatus disclosed in the following supercritical reverse phase evaporation method publications *.

(*Japanese National Republication of International Patent Application No. 02/032564, Japanese Patent Application Laid-Open No. 2003-119120, Japanese Patent Application Laid-Open No. 2005-298407 and Japanese Patent Application Laid-Open No. 2008-063284)

Specifically, a high-pressure stainless vessel kept at 60° C. was charged with 0.15 to 0.35 parts by weight of sodium aluminosilicate having an average particle size of 10 to 500 nm, 5 parts by weight of phosphatidylcholine as a phospholipid and 100 parts by weight of ion exchange water and sealed, and a supercritical treatment, in which carbon dioxide was injected so that the pressure was 20 MPa to be made in a supercritical state, the content of the vessel was stirred and mixed for 15 minutes while the temperature and pressure being kept, and carbon dioxide was discharged to return to atmospheric pressure, was performed, thereby obtaining a solution containing a liposome encapsulating sodium aluminosilicate in a phospholipid.

Herein, the phospholipid may include, in addition to the phosphatidylcholine, glycerophospholipids such as phosphatidylethanolamine, phosphatidylserine, phosphatidic acid, phosphatidylglycerol, phosphatidylinositol, cardiopine, egg yolk lecithin, hydrogenated egg yolk lecithin, soy lecithin and hydrogenated soy lecithin, and sphingophospholipids such as sphingomyelin, ceramide phosphorylethanolamine and ceramide phosphorylglycerol.

In addition, the carbon dioxide in a supercritical state means carbon dioxide that is in a supercritical state having a critical temperature (30.98° C.) and a critical pressure (7.3773±0.0030 MPa) or more, and the carbon dioxide having a temperature of the supercritical point or more or under the pressure condition means carbon dioxide under the condition above the critical condition about only one of the critical temperature or the critical pressure (provided that the other is not above the critical condition).

Such a carbon dioxide absorbent is excellent in dispersibility in an adhesive or resin, and is suitable for the present invention.

In the present application, the average particle size means a volume average particle size.

INDUSTRIAL APPLICABILITY

The present invention provides a label, a top layer material formed on a printing medium, an information-bearing medium, a solid fuel and a wristband clip, with which existing products can be replaced, to thereby enable to realize a new carbon dioxide reduction method, and has industrial applicability.

REFERENCE SIGNS LIST 101 label (first embodiment, FIG. 1 to FIG. 3)
102 band-shaped backing paper
103 label strip
104 label substrate
105 adhesive layer
106 carbon dioxide absorbent
107 refuse bag (Portion (1) in FIG. 3)
108 refuse
109 incinerator (Portion (2) in FIG. 3)
110 incinerating burner
120 label (second embodiment, FIG. 4)
121 label strip 122 carbon dioxide absorbent layer
123 bonding adhesive layer
130 label (third embodiment, FIG. 5)
131 label strip
140 label (fourth embodiment, FIG. 6)
141 label strip
201 thermal transfer ink ribbon (top layer formation material, fifth embodiment, FIG. 8)
202 back coat layer
203 PET film layer
204 anchor coat layer
205 carbon ink layer
206 ribbon core tube
207 carbon ink
208 carbon dioxide absorbent
209 manufacturing apparatus of thermal transfer ink ribbon 201 (FIG. 9)
210 ribbon film substrate
211 ink vessel
212 gravure printing roll
213 backup roll
214 large winding roll
215 small winding device
216 thermal printer (FIG. 10)
217 label-feeding portion
218 label-printing portion
219 backing paper-turning portion
220 backing paper-winding up portion
221 continuous label (printing medium)
222 backing paper
223 label strip
224 label substrate
225 adhesive layer
226 thermal head
227 platen roller
228 ribbon-feeding portion
229 ribbon-winding up portion
230 incinerator (FIG. 11)
231 incinerating burner
232 object of attachment or object of pasting
233 carbon dioxide absorbent layer (FIG. 8)
240 advertising label (printing medium, FIG. 12)
241 backing paper
242 advertising label strip
243 label substrate
244 adhesive layer
245 advertising information
246 printing ink (top layer formation material)
247 manufacturing apparatus of advertising label 240 (FIG. 14)
248 label substrate
249 printing portion
250 ink vessel
251 printing cylinder
252 impression cylinder
253 debris removal unit
254 large winding roll
255 small winding device
260 identifying label (printing medium, FIG. 15)
261 backing paper
262 identifying label strip
263 label substrate
264 adhesive layer
265 identifying printing layer
266 surface coating layer (top layer formation material)
267 coating agent
301 tag (information-bearing medium, eighth embodiment, FIG. 17, FIG. 18)
302 thermal printer (FIG. 18)
303 medium body
304 cutting line
305 one tag strip
306 carbon dioxide absorbent
307 tag-feeding portion
308 tag-printing portion
309 tag-cutting portion
310 thermal head
311 platen roller
312 thermal transfer ink ribbon
313 ribbon-feeding portion
314 ribbon-winding up portion
315 stationary knife
316 movable knife
317 variable information
318 incinerator (FIG. 19)
319 incinerating burner
320 object of pasting or object of attachment
321 carbon dioxide absorbent layer (FIG. 18)
330 wristband (information-bearing medium, ninth embodiment, FIG. 20)
331 center indicate region
332 first attachment region
333 second attachment region
334 visible information
335 bar code information
336 attachment hole
337 selection hole
338 attachment tool
339 base substrate
340 coat layer
341 embossed layer
342 first intermediate layer
343 second intermediate layer
344 third intermediate layer
345 carbon dioxide absorbent layer (FIG. 21)
350 wristband (information-bearing medium, tenth embodiment, FIG. 22)
351 base substrate
352 adhesive layer
353 embossed layer
354 carbon dioxide absorbent layer (FIG. 23)
355 cut-off line
356 release region
360 point card (information-bearing medium, eleventh embodiment, FIG. 24)
361 constant information
362 variable information
363 variable information
364 base substrate
365 carbon dioxide absorbent layer (FIG. 25)
401 solid fuel (twelfth embodiment, FIG. 26)
402 flammable body
403 carbon dioxide absorbent
404 cardboard box
405 label
406 sticker
407 thermal transfer ink ribbon
408 chip
409 plant (FIG. 28)
410 boiler (FIG. 28)
510 wristband clip (clip)
512 male clip portion
512a, 512b circular portion 514 female clip portion
514a, 514b circular portion
516 hinge
516a flexion portion
520 boss
522 boss hole
523 shaft portion
524 engagement portion
525 constricted portion
526 non-return portion
527 holding portion
528 retaining portion
529 notch
530 wristband
531 band main body
531a, 531b band portion
532 display portion
534 identification data
536 band hole
538 setting hole
540 carbon dioxide absorbent
550 incinerator
552 incinerating burner

The invention claimed is:

1. An information-bearing medium comprising:
a plurality of layers configured to form a medium body which is capable of bearing information; and
a vesicle encapsulating a carbon dioxide absorbent configured to absorb carbon dioxide generated during incineration of the information-bearing medium,
wherein the vesicle encapsulating the carbon dioxide absorbent is included in at least one layer of the plurality of layers.

2. The information-bearing medium according to claim 1, wherein the information-bearing medium is a thermal paper.

3. The information-bearing medium according to claim 2, wherein the vesicle encapsulating the carbon dioxide absorbent is included in a heat-sensitive color-forming layer of the thermal paper.

4. The information-bearing medium according to claim 1, wherein the information-bearing medium is a thermal paper,
the thermal paper includes a lamination of a heat-sensitive color-forming layer on the medium body composed of a paper material, and
the vesicle encapsulating the carbon dioxide absorbent is included in the heat-sensitive color-forming layer.

5. The information-bearing medium according to claim 1, wherein the information-bearing medium includes a lamination of a heat-sensitive color-forming layer on the medium body, the medium body being composed of a plastic material, and
the vesicle encapsulating the carbon dioxide absorbent is included in the heat-sensitive color-forming layer.

6. The information-bearing medium according to claim 1, wherein the information-bearing medium is configured to be usable in a printer.

7. The information-bearing medium according to claim 1, wherein the vesicle encapsulating the carbon dioxide absorbent is particulate.

8. The information-bearing medium according to claim 1, wherein the vesicle encapsulating the carbon dioxide absorbent is nanometer in size.

9. The information-bearing medium according to claim 8, wherein the vesicle encapsulating the carbon dioxide absorbent is about 10 to 100 nm in size.

10. The information-bearing medium according to claim 1, wherein a plurality of vesicles encapsulating carbon dioxide absorbent are uniformly dispersed in said layer.

11. The information-bearing medium according to claim 1, wherein a plurality of vesicles encapsulating carbon dioxide absorbent are included at a mixture ratio of 0.01 weight % or more and 0.10 weight % or less in one layer to which the plurality of vesicles encapsulating carbon dioxide absorbent are added.

12. The information-bearing medium according to claim 1, wherein the carbon dioxide absorbent is a material that reacts with the carbon dioxide generated from the medium body during the incineration so that the carbon dioxide remains in ash formed by the incineration.

13. The information-bearing medium according to claim 12, wherein carbon dioxide generated from the medium body during the incineration is not released into the air.

14. The information-bearing medium according to claim 1, wherein the carbon dioxide absorbent comprises:
a carbon dioxide-absorbing substance;
a dispersion aid that covers a surface of the carbon dioxide-absorbing substance; and
a resin.

15. The information-bearing medium according to claim 1, wherein the vesicle is a liposome that encapsulates the carbon dioxide absorbent.

16. The information-bearing medium according to claim 15, wherein the liposome encapsulates the carbon dioxide absorbent in a phospholipid.

17. An information-bearing medium comprising:
a plurality of layers configured to form a medium body which is capable of bearing information, and
a vesicle encapsulating a carbon dioxide absorbent configured to absorb carbon dioxide generated during incineration of the information-bearing medium,
wherein the vesicle encapsulating the carbon dioxide absorbent is included in a layer and the layer is laminated on any one of the plurality of layers.

18. The information-bearing medium according to claim 17, wherein the information-bearing medium is a thermal paper.

19. The information-bearing medium according to claim 18, wherein the vesicle encapsulating the carbon dioxide absorbent is included in a heat-sensitive color-forming layer of the thermal paper.

20. The information-bearing medium according to claim 17, wherein the information-bearing medium is a thermal paper,
the thermal paper includes a lamination of a heat-sensitive color-forming layer on the medium body composed of a paper material, and
the vesicle encapsulating the carbon dioxide absorbent is included in the heat-sensitive color-forming layer.

21. The information-bearing medium according to claim 17, wherein the information-bearing medium includes a lamination of a heat-sensitive color-forming layer on the medium body, the medium body being composed of a plastic material, and
the vesicle encapsulating the carbon dioxide absorbent is included in the heat-sensitive color-forming layer.

22. The information-bearing medium according to claim 17, wherein the information-bearing medium is configured to be usable in a printer.

23. The information-bearing medium according to claim 17, wherein the vesicle encapsulating the carbon dioxide absorbent is particulate.

24. The information-bearing medium according to claim 17, wherein the vesicle encapsulating the carbon dioxide absorbent is nanometer in size.

25. The information-bearing medium according to claim 24, wherein the vesicle encapsulating the carbon dioxide absorbent is about 10 to 100 nm in size.

26. The information-bearing medium according to claim 17, wherein a plurality of vesicles encapsulating carbon dioxide absorbent are uniformly dispersed in said layer.

27. The information-bearing medium according to claim 17, wherein a plurality of vesicles encapsulating carbon dioxide absorbent are included at a mixture ratio of 0.01 weight % or more and 0.10 weight % or less in one layer to which the plurality of vesicles encapsulating carbon dioxide absorbent are added.

28. The information-bearing medium according to claim 17, wherein the carbon dioxide absorbent is a material that reacts with the carbon dioxide generated from the medium body during the incineration so that the carbon dioxide remains in ash formed by the incineration.

29. The information-bearing medium according to claim 28, wherein carbon dioxide generated from the medium body during the incineration is not released into the air.

30. The information-bearing medium according to claim 17, wherein the carbon dioxide absorbent comprises:
a carbon dioxide-absorbing substance;
a dispersion aid that covers a surface of the carbon dioxide-absorbing substance; and
a resin.

31. The information-bearing medium according to claim 17, wherein the vesicle is a liposome that encapsulates the carbon dioxide absorbent.

32. The information-bearing medium according to claim 31, wherein the liposome encapsulates the carbon dioxide absorbent in a phospholipid.

* * * * *